US012684271B2

(12) United States Patent　　　　　　(10) Patent No.:　US 12,684,271 B2
Engelstein et al.　　　　　　　　　　　(45) Date of Patent:　　　Jul. 14, 2026

(54) DEVICES, SYSTEMS AND METHODS FOR PREDICTING FUTURE CONSUMPTION VALUES OF LOAD(S) IN POWER DISTRIBUTION SYSTEMS

(71) Applicant: EI Electronics, LLC, Westbury, NY (US)

(72) Inventors: Elly Engelstein, Great Neck, NY (US); Luna A. Koval, Commack, NY (US); Erran Kagan, Great Neck, NY (US)

(73) Assignee: EI ELECTRONICS LLC, Westbury, NY (US)

( * ) Notice: Subject to any disclaimer, the term of this patent is extended or adjusted under 35 U.S.C. 154(b) by 44 days.

(21) Appl. No.: 18/465,438

(22) Filed: Sep. 12, 2023

(65) Prior Publication Data

US 2024/0012390 A1　　Jan. 11, 2024

Related U.S. Application Data

(63) Continuation of application No. 16/918,650, filed on Jul. 1, 2020, now Pat. No. 11,754,997, which is a (Continued)

(51) Int. Cl.
H04Q 9/02　　　　　(2006.01)
(52) U.S. Cl.
CPC ....... H04Q 9/02 (2013.01); *G05B 2219/2639* (2013.01); *H04Q 2209/60* (2013.01); *H04Q 2213/08* (2013.01)
(58) Field of Classification Search
CPC ........... H04Q 2209/00; H04Q 2209/10; H04Q 2209/40; H04Q 2209/60; H04Q 2209/70;
(Continued)

(56) References Cited

U.S. PATENT DOCUMENTS 2,883,255 A　　4/1959　Anderson
2,987,704 A　　6/1961　Gimpel et al.
(Continued)

FOREIGN PATENT DOCUMENTS

CN　　101799681 A　　8/2010
CN　　111444240 A　　7/2020
(Continued)

OTHER PUBLICATIONS

Xia et al., "Secure Session Key Management Scheme for Meter-Reading System Based on LoRa Technology," IEEE Access, 2018, vol. 6, pp. 75015-75024.
(Continued)

*Primary Examiner* — Franklin D Balseca
(74) *Attorney, Agent, or Firm* — Robinson + Cole LLP

(57)　　　　　　ABSTRACT
Devices, systems and methods for predicting future consumption values of load(s) in power distribution systems are provided. The present disclosure provides for receiving a request for a load prediction for at least one meter; extracting time series data relating to the at least meter; retrieving future weather conditions for a particular location based on the at least one meter; and providing the extracted data and the future weather conditions to a prediction model that predicts load usage for the at least one meter. Additionally, the present disclosure provides for performing at least one action based on the prediction, wherein the action includes outputting at least one of a communication signal and/or at least one control signal to at least one client or at least one meter.

20 Claims, 28 Drawing Sheets

Related U.S. Application Data continuation-in-part of application No. 16/278,760, filed on Feb. 19, 2019, now Pat. No. 11,734,704.

(60) Provisional application No. 62/869,532, filed on Jul. 1, 2019, provisional application No. 62/752,740, filed on Oct. 30, 2018, provisional application No. 62/631,660, filed on Feb. 17, 2018.

(58) Field of Classification Search
CPC .......... H04Q 2209/75; H04Q 2209/80; H04Q 2209/84; H04Q 2209/88; H04Q 9/00; H04Q 9/02; H04Q 2213/08; G05B 2219/2639
See application file for complete search history.

(56) References Cited

U.S. PATENT DOCUMENTS

| | | | |
|---|---|---|---|
| 3,142,820 A | 7/1964 | Daniels | |
| 3,453,540 A | 7/1969 | Dusheck, Jr. | |
| 3,824,441 A | 7/1974 | Heyman et al. | |
| 4,246,623 A | 1/1981 | Sun | |
| 4,466,071 A | 8/1984 | Russell, Jr. | |
| 4,489,386 A | 12/1984 | Breddan | |
| 4,884,021 A | 11/1989 | Hammond et al. | |
| 4,996,646 A | 2/1991 | Farrington | |
| 5,014,229 A | 5/1991 | Mofachern | |
| 5,166,887 A | 11/1992 | Farrington et al. | |
| 5,170,360 A | 12/1992 | Porter et al. | |
| 5,185,705 A | 2/1993 | Farrington | |
| 5,212,441 A | 5/1993 | McEachern et al. | |
| 5,224,054 A | 6/1993 | Wallis | |
| 5,233,538 A | 8/1993 | Wallis | |
| 5,237,511 A | 8/1993 | Caird et al. | |
| 5,298,854 A | 3/1994 | McEachern et al. | |
| 5,298,855 A | 3/1994 | McEachern et al. | |
| 5,298,856 A | 3/1994 | McEachern et al. | |
| 5,298,859 A | 3/1994 | McEachern et al. | |
| 5,298,885 A | 3/1994 | McEachern et al. | |
| 5,298,888 A | 3/1994 | McEachern et al. | |
| 5,300,924 A | 4/1994 | McEachern et al. | |
| 5,301,122 A | 4/1994 | Halpern | |
| 5,302,890 A | 4/1994 | McEachern et al. | |
| 5,307,009 A | 4/1994 | McEachern et al. | |
| 5,315,527 A | 5/1994 | Beckwith | |
| 5,347,464 A | 9/1994 | McEachern et al. | |
| 5,544,064 A | 8/1996 | Beckwith | |
| 5,559,719 A | 9/1996 | Johnson et al. | |
| 5,574,654 A | 11/1996 | Bingham et al. | |
| 5,581,173 A | 12/1996 | Yalla et al. | |
| 5,706,204 A | 1/1998 | Cox et al. | |
| 5,724,556 A | 3/1998 | Souder et al. | |
| 5,764,523 A | 6/1998 | Yoshinaga et al. | |
| 5,774,366 A | 6/1998 | Beckwith | |
| 5,796,977 A | 8/1998 | Sarangdhar et al. | |
| 5,801,643 A | 9/1998 | Williams et al. | |
| 5,819,203 A | 10/1998 | Moore et al. | |
| 5,822,165 A | 10/1998 | Moran | |
| 5,832,210 A | 11/1998 | Akiyama et al. | |
| 5,874,903 A | 2/1999 | Shuey et al. | |
| 5,898,387 A | 4/1999 | Davis et al. | |
| 5,899,960 A | 5/1999 | Moore et al. | |
| 5,986,574 A | 11/1999 | Colton | |
| 6,018,690 A | 1/2000 | Saito et al. | |
| 6,028,857 A | 2/2000 | Poor | |
| 6,038,516 A | 3/2000 | Alexander et al. | |
| 6,073,169 A | 6/2000 | Shuey et al. | |
| 6,098,175 A | 8/2000 | Lee | |
| 6,100,817 A | 8/2000 | Mason, Jr. et al. | |
| 6,121,593 A | 9/2000 | Mansbery et al. | |
| 6,151,653 A | 11/2000 | Lin et al. | |
| 6,157,329 A | 12/2000 | Lee et al. | |
| 6,167,329 A | 12/2000 | Engel et al. | |
| 6,195,614 B1 | 2/2001 | Kochan | |
| 6,279,037 B1 | 8/2001 | Tams et al. | |
| 6,289,267 B1 | 9/2001 | Alexander et al. | |
| 6,343,299 B1 | 1/2002 | Huang et al. | |
| 6,393,458 B1 | 5/2002 | Gigliotti et al. | |
| 6,396,839 B1 | 5/2002 | Ardalan et al. | |
| 6,405,128 B1 | 6/2002 | Bechtolsheim et al. | |
| 6,437,692 B1 | 8/2002 | Petite et al. | |
| 6,487,457 B1 | 11/2002 | Hull et al. | |
| 6,493,644 B1 | 12/2002 | Jonker et al. | |
| 6,496,511 B1 | 12/2002 | Wang et al. | |
| 6,519,537 B1 | 2/2003 | Yang | |
| 6,528,957 B1 | 3/2003 | Luchaco | |
| 6,560,608 B1 | 5/2003 | Tomm et al. | |
| 6,564,332 B1 | 5/2003 | Nguyen et al. | |
| 6,565,608 B1 | 5/2003 | Fein et al. | |
| 6,615,147 B1 | 9/2003 | Jonker et al. | |
| 6,636,030 B1 | 10/2003 | Rose et al. | |
| 6,657,552 B2 | 12/2003 | Belski et al. | |
| 6,671,654 B1 | 12/2003 | Forth et al. | |
| 6,671,802 B1 | 12/2003 | Ott | |
| 6,717,394 B2 | 4/2004 | Elms | |
| 6,735,535 B1 | 5/2004 | Kagan et al. | |
| 6,751,563 B2 | 6/2004 | Spanier et al. | |
| 6,836,737 B2 | 12/2004 | Petite et al. | |
| 6,842,707 B2 | 1/2005 | Raichle et al. | |
| 6,900,738 B2 | 5/2005 | Crichlow | |
| 6,904,385 B1 | 6/2005 | Budike, Jr. | |
| 6,957,158 B1 | 10/2005 | Hancock et al. | |
| 6,972,364 B2 | 12/2005 | Diedrichsen | |
| 6,985,087 B2 | 1/2006 | Soliman | |
| 7,006,934 B2 | 2/2006 | Jonker et al. | |
| 7,010,438 B2 | 3/2006 | Hancock et al. | |
| 7,043,459 B2 | 5/2006 | Peevey | |
| 7,049,975 B2 | 5/2006 | Vanderah et al. | |
| 7,050,808 B2 | 5/2006 | Janusz et al. | |
| 7,072,779 B2 | 7/2006 | Hancock et al. | |
| 7,085,824 B2 | 8/2006 | Forth et al. | |
| 7,085,938 B1 | 8/2006 | Pozzuoli et al. | |
| 7,126,493 B2 | 10/2006 | Junker et al. | |
| 7,129,848 B2 | 10/2006 | Milliot et al. | |
| 7,203,319 B2 | 4/2007 | Ben-Zur et al. | |
| 7,243,050 B2 | 7/2007 | Armstrong | |
| 7,249,265 B2 | 7/2007 | von Carolsfeld et al. | |
| 7,271,996 B2 | 9/2007 | Kagan et al. | |
| 7,299,308 B2 | 11/2007 | Kondo et al. | |
| 7,304,586 B2 | 12/2007 | Wang et al. | |
| 7,337,081 B1 | 2/2008 | Kagan | |
| 7,342,507 B2 | 3/2008 | Jonker et al. | |
| 7,436,687 B2 | 10/2008 | Patel | |
| 7,444,454 B2 | 10/2008 | Yancey et al. | |
| 7,511,468 B2 | 3/2009 | McEachern et al. | |
| 7,514,907 B2 | 4/2009 | Rajda et al. | |
| 7,616,656 B2 | 11/2009 | Wang et al. | |
| 7,668,663 B2 | 2/2010 | Kurnik et al. | |
| 7,701,357 B2 * | 4/2010 | Deaver, Sr. ........... | G06Q 50/06 |
| | | | 340/646 |
| 7,702,779 B1 | 4/2010 | Gupta et al. | |
| 7,739,728 B1 | 6/2010 | Koehler, Jr. et al. | |
| 7,813,822 B1 | 10/2010 | Hoffberg | |
| 7,831,702 B2 * | 11/2010 | Johnson ................ | G01D 4/004 |
| | | | 709/224 |
| 7,899,630 B2 | 3/2011 | Kagan | |
| 7,916,015 B1 | 3/2011 | Evancich et al. | |
| 7,916,060 B2 | 3/2011 | Zhu et al. | |
| 7,921,199 B1 | 4/2011 | Shirriff et al. | |
| 7,961,736 B2 | 6/2011 | Ayyagari | |
| 7,962,298 B2 | 6/2011 | Przydatek et al. | |
| 7,999,696 B2 | 8/2011 | Wang et al. | |
| 8,011,002 B1 * | 8/2011 | Upadhyay ........... | H04L 63/0281 |
| | | | 713/168 |
| 8,019,836 B2 | 9/2011 | Elliott et al. | |
| 8,024,073 B2 | 9/2011 | Imes et al. | |
| 8,078,418 B2 | 12/2011 | Banhegyesi et al. | |
| 8,160,824 B2 | 4/2012 | Spanier et al. | |
| 8,190,381 B2 | 5/2012 | Spanier et al. | |
| 8,193,929 B1 | 6/2012 | Siu et al. | |
| 8,250,246 B2 | 8/2012 | Brockmann et al. | |
| 8,335,936 B2 | 12/2012 | Jonsson et al. | |
| 8,402,267 B1 | 3/2013 | Graham et al. | |
| 8,599,036 B2 | 12/2013 | Wang et al. | |

(56) References Cited

U.S. PATENT DOCUMENTS

| | | | |
|---|---|---|---|
| 8,635,036 | B2 | 1/2014 | Pamulaparthy et al. |
| 8,700,347 | B2 | 4/2014 | Spanier et al. |
| 8,717,007 | B2 | 5/2014 | Banhegyesi |
| 8,812,979 | B2 | 8/2014 | Khanke et al. |
| 8,933,815 | B2 | 1/2015 | Kagan et al. |
| 9,080,894 | B2 | 7/2015 | Spanier et al. |
| 9,094,227 | B2 | 7/2015 | Park |
| 9,161,102 | B2 | 10/2015 | Millstein et al. |
| 9,166,883 | B2* | 10/2015 | Marchese ........... H04L 41/0853 |
| 9,268,552 | B1 | 2/2016 | Kiiskila et al. |
| 9,287,963 | B2* | 3/2016 | Parish ...................... H01Q 1/36 |
| 9,310,792 | B2 | 4/2016 | Lu et al. |
| 9,660,994 | B2 | 5/2017 | McQuillan et al. |
| 10,303,860 | B2 | 5/2019 | Koval et al. |
| 10,408,647 | B2* | 9/2019 | Mackie .................. G01D 4/004 |
| 10,484,869 | B2* | 11/2019 | Bone .................. H04L 63/0281 |
| 10,509,645 | B2* | 12/2019 | Geilfuss ............. G06Q 30/0254 |
| 10,567,225 | B2* | 2/2020 | Naiden ................... H04L 67/52 |
| 10,972,556 | B1 | 4/2021 | Cheng et al. |
| 11,276,395 | B1 | 3/2022 | Jones et al. |
| 2002/0024453 | A1 | 2/2002 | Maeda |
| 2002/0032535 | A1 | 3/2002 | Alexander et al. |
| 2002/0048269 | A1 | 4/2002 | Hong et al. |
| 2002/0052972 | A1 | 5/2002 | Yim |
| 2002/0065872 | A1 | 5/2002 | Genske et al. |
| 2002/0073211 | A1 | 6/2002 | Lin et al. |
| 2002/0105435 | A1 | 8/2002 | Yee et al. |
| 2002/0120723 | A1 | 8/2002 | Forth et al. |
| 2002/0129342 | A1 | 9/2002 | Kil et al. |
| 2002/0133504 | A1 | 9/2002 | Vlahos et al. |
| 2002/0162014 | A1 | 10/2002 | Przydatek et al. |
| 2002/0169570 | A1 | 11/2002 | Spanier et al. |
| 2002/0174223 | A1 | 11/2002 | Childers et al. |
| 2002/0188706 | A1 | 12/2002 | Richards et al. |
| 2003/0005130 | A1 | 1/2003 | Cheng |
| 2003/0014200 | A1 | 1/2003 | Jonker et al. |
| 2003/0065757 | A1 | 4/2003 | Mentze et al. |
| 2003/0084280 | A1 | 5/2003 | Bryan et al. |
| 2003/0093429 | A1 | 5/2003 | Nishikawa et al. |
| 2003/0110380 | A1 | 6/2003 | Carolsfeld et al. |
| 2003/0163508 | A1 | 8/2003 | Goodman |
| 2003/0178982 | A1 | 9/2003 | Elms |
| 2003/0179714 | A1 | 9/2003 | Gilgenbach et al. |
| 2003/0187550 | A1 | 10/2003 | Wilson et al. |
| 2003/0200285 | A1 | 10/2003 | Hansen et al. |
| 2003/0204756 | A1 | 10/2003 | Ransom et al. |
| 2003/0226058 | A1 | 12/2003 | Miller et al. |
| 2004/0078474 | A1 | 4/2004 | Ramaswamy |
| 2004/0088408 | A1 | 5/2004 | Tsyganskiy |
| 2004/0098459 | A1 | 5/2004 | Leukert-Knapp et al. |
| 2004/0107025 | A1 | 6/2004 | Ransom et al. |
| 2004/0122833 | A1 | 6/2004 | Forth et al. |
| 2004/0127775 | A1 | 7/2004 | Miyazaki et al. |
| 2004/0128260 | A1 | 7/2004 | Amedure et al. |
| 2004/0138834 | A1 | 7/2004 | Blackett et al. |
| 2004/0162642 | A1 | 8/2004 | Gasper et al. |
| 2004/0170181 | A1 | 9/2004 | Bogdon et al. |
| 2004/0172207 | A1 | 9/2004 | Hancock et al. |
| 2004/0177062 | A1 | 9/2004 | Urquhart et al. |
| 2004/0187028 | A1 | 9/2004 | Perkins et al. |
| 2004/0193329 | A1 | 9/2004 | Ransom et al. |
| 2004/0208182 | A1 | 10/2004 | Boles et al. |
| 2004/0243735 | A1 | 12/2004 | Rosenbloom et al. |
| 2004/0250059 | A1 | 12/2004 | Ramelson et al. |
| 2005/0027464 | A1 | 2/2005 | Jonker et al. |
| 2005/0033956 | A1 | 2/2005 | Krempl |
| 2005/0060110 | A1 | 3/2005 | Jones et al. |
| 2005/0093571 | A1 | 5/2005 | Suaris et al. |
| 2005/0138421 | A1 | 6/2005 | Fedronic et al. |
| 2005/0138432 | A1 | 6/2005 | Ransom et al. |
| 2005/0144437 | A1 | 6/2005 | Ransom et al. |
| 2005/0169309 | A1 | 8/2005 | Tripathi et al. |
| 2005/0183128 | A1 | 8/2005 | Assayag et al. |
| 2005/0187725 | A1 | 8/2005 | Cox |
| 2005/0202808 | A1 | 9/2005 | Fishman et al. |
| 2005/0234837 | A1 | 10/2005 | Ramachandran et al. |
| 2005/0240540 | A1 | 10/2005 | Borleske et al. |
| 2005/0253682 | A1 | 11/2005 | Kato et al. |
| 2005/0273280 | A1 | 12/2005 | Cox |
| 2005/0273281 | A1 | 12/2005 | Wall et al. |
| 2006/0020788 | A1 | 1/2006 | Han et al. |
| 2006/0047787 | A1 | 3/2006 | Agarwal et al. |
| 2006/0052958 | A1 | 3/2006 | Hancock et al. |
| 2006/0066456 | A1 | 3/2006 | Jonker et al. |
| 2006/0066903 | A1 | 3/2006 | Shiimori |
| 2006/0083260 | A1 | 4/2006 | Wang et al. |
| 2006/0085419 | A1 | 4/2006 | Rosen |
| 2006/0089932 | A1 | 4/2006 | Buehler et al. |
| 2006/0145890 | A1 | 7/2006 | Junker et al. |
| 2006/0155422 | A1 | 7/2006 | Uy et al. |
| 2006/0155442 | A1 | 7/2006 | Luo et al. |
| 2006/0161360 | A1 | 7/2006 | Yao et al. |
| 2006/0161400 | A1 | 7/2006 | Kagan |
| 2006/0200599 | A1 | 9/2006 | Manchester et al. |
| 2006/0206433 | A1 | 9/2006 | Scoggins |
| 2006/0265720 | A1 | 11/2006 | Cai et al. |
| 2006/0267560 | A1 | 11/2006 | Rajda et al. |
| 2006/0274899 | A1 | 12/2006 | Zhu et al. |
| 2007/0047735 | A1 | 3/2007 | Celli et al. |
| 2007/0058634 | A1 | 3/2007 | Gupta et al. |
| 2007/0061786 | A1 | 3/2007 | Zhou et al. |
| 2007/0067119 | A1 | 3/2007 | Loewen et al. |
| 2007/0067121 | A1 | 3/2007 | Przydatek et al. |
| 2007/0096765 | A1 | 5/2007 | Kagan |
| 2007/0096942 | A1 | 5/2007 | Kagan et al. |
| 2007/0106618 | A1 | 5/2007 | Wu et al. |
| 2007/0114987 | A1 | 5/2007 | Kagan |
| 2007/0120705 | A1 | 5/2007 | Kiiskila et al. |
| 2007/0136236 | A1 | 6/2007 | Kussmaul et al. |
| 2007/0152058 | A1 | 7/2007 | Yeakley et al. |
| 2007/0186111 | A1 | 8/2007 | Durand |
| 2007/0240159 | A1 | 10/2007 | Sugiyama |
| 2007/0255861 | A1 | 11/2007 | Kain et al. |
| 2007/0263643 | A1 | 11/2007 | Wadhawan |
| 2007/0266004 | A1 | 11/2007 | Wall et al. |
| 2008/0028395 | A1 | 1/2008 | Motta et al. |
| 2008/0033786 | A1 | 2/2008 | Boaz et al. |
| 2008/0033920 | A1 | 2/2008 | Colclasure et al. |
| 2008/0046205 | A1 | 2/2008 | Gilbert et al. |
| 2008/0052384 | A1 | 2/2008 | Marl et al. |
| 2008/0071482 | A1 | 3/2008 | Zweigle et al. |
| 2008/0074285 | A1 | 3/2008 | Guthrie |
| 2008/0077806 | A1 | 3/2008 | Cui et al. |
| 2008/0086222 | A1 | 4/2008 | Kagan |
| 2008/0103631 | A1 | 5/2008 | Koliwad et al. |
| 2008/0104149 | A1 | 5/2008 | Vishniac et al. |
| 2008/0130639 | A1 | 6/2008 | Costa-Requena et al. |
| 2008/0147334 | A1 | 6/2008 | Kagan |
| 2008/0168434 | A1 | 7/2008 | Gee et al. |
| 2008/0172192 | A1 | 7/2008 | Banhegyesi |
| 2008/0187116 | A1 | 8/2008 | Reeves et al. |
| 2008/0195562 | A1 | 8/2008 | Worth et al. |
| 2008/0195794 | A1 | 8/2008 | Banker |
| 2008/0201723 | A1 | 8/2008 | Bottaro et al. |
| 2008/0215264 | A1 | 9/2008 | Spanier et al. |
| 2008/0228830 | A1 | 9/2008 | Hawtin |
| 2008/0234957 | A1 | 9/2008 | Banhegyesi et al. |
| 2008/0235355 | A1 | 9/2008 | Spanier et al. |
| 2008/0238406 | A1 | 10/2008 | Banhegyesi |
| 2008/0238713 | A1 | 10/2008 | Banhegyesi et al. |
| 2008/0243404 | A1 | 10/2008 | Banhegyesi |
| 2008/0262376 | A1* | 10/2008 | Price ...................... A61B 5/444 600/547 |
| 2008/0291054 | A1 | 11/2008 | Groft |
| 2009/0012728 | A1 | 1/2009 | Spanier et al. |
| 2009/0037163 | A1 | 2/2009 | Kong et al. |
| 2009/0055912 | A1 | 2/2009 | Choi et al. |
| 2009/0070168 | A1 | 3/2009 | Thompson et al. |
| 2009/0070447 | A1 | 3/2009 | Jubinville et al. |
| 2009/0082879 | A1 | 3/2009 | Dooley et al. |
| 2009/0082980 | A1 | 3/2009 | Thurmond et al. |
| 2009/0094317 | A1 | 4/2009 | Venkitaraman |
| 2009/0096654 | A1 | 4/2009 | Zhu et al. |
| 2009/0115626 | A1 | 5/2009 | Vaswani et al. |

(56) References Cited

U.S. PATENT DOCUMENTS

| | | |
|---|---|---|
| 2009/0119476 A1 | 5/2009 | Jernigan et al. |
| 2009/0172519 A1 | 7/2009 | Xu et al. |
| 2009/0190486 A1 | 7/2009 | Lavigne et al. |
| 2009/0196187 A1 | 8/2009 | Ooba et al. |
| 2009/0196206 A1 | 8/2009 | Weaver et al. |
| 2009/0228224 A1 | 9/2009 | Spanier et al. |
| 2009/0235075 A1 | 9/2009 | Cho et al. |
| 2009/0235090 A1 | 9/2009 | Chang |
| 2009/0276102 A1 | 11/2009 | Smith et al. |
| 2009/0292894 A1 | 11/2009 | Henry et al. |
| 2009/0300165 A1 | 12/2009 | Tuckey et al. |
| 2009/0307178 A1 | 12/2009 | Kuhns et al. |
| 2009/0327483 A1 | 12/2009 | Thompson et al. |
| 2010/0004350 A1 | 1/2010 | Zalich et al. |
| 2010/0030734 A1 | 2/2010 | Chunilal |
| 2010/0031076 A1 | 2/2010 | Wan et al. |
| 2010/0054276 A1 | 3/2010 | Wang et al. |
| 2010/0057387 A1 | 3/2010 | Kagan et al. |
| 2010/0057628 A1 | 3/2010 | Trinidad et al. |
| 2010/0058355 A1 | 3/2010 | Gernaey |
| 2010/0073192 A1 | 3/2010 | Goldfisher et al. |
| 2010/0094851 A1 | 4/2010 | Bent et al. |
| 2010/0121996 A1 | 5/2010 | Schmidt et al. |
| 2010/0169709 A1 | 7/2010 | Chiu et al. |
| 2010/0169876 A1 | 7/2010 | Mann |
| 2010/0175062 A1 | 7/2010 | Kim |
| 2010/0217871 A1 | 8/2010 | Gammon |
| 2010/0238003 A1 | 9/2010 | Chan et al. |
| 2010/0278187 A1 | 11/2010 | Hart et al. |
| 2010/0299441 A1 | 11/2010 | Hughes et al. |
| 2010/0324845 A1 | 12/2010 | Spanier et al. |
| 2011/0004350 A1 | 1/2011 | Cheifetz et al. |
| 2011/0004426 A1 | 1/2011 | Wright et al. |
| 2011/0015961 A1 | 1/2011 | Chan |
| 2011/0016021 A1 | 1/2011 | Manning |
| 2011/0029461 A1 | 2/2011 | Hardin, Jr. |
| 2011/0040809 A1 | 2/2011 | Spanier et al. |
| 2011/0069709 A1 | 3/2011 | Morris et al. |
| 2011/0072423 A1 | 3/2011 | Fukata |
| 2011/0078305 A1 | 3/2011 | Varela |
| 2011/0093843 A1 | 4/2011 | Endo et al. |
| 2011/0106589 A1 | 5/2011 | Blomberg et al. |
| 2011/0107357 A1 | 5/2011 | Cullimore |
| 2011/0157837 A1 | 6/2011 | Balgard et al. |
| 2011/0178651 A1 | 7/2011 | Choi et al. |
| 2011/0184671 A1 | 7/2011 | Abiprojo et al. |
| 2011/0282508 A1 | 11/2011 | Goutard et al. |
| 2011/0296496 A1 | 12/2011 | O'Donnell et al. |
| 2012/0041696 A1 | 2/2012 | Sanderford, Jr. et al. |
| 2012/0059932 A1 | 3/2012 | Messer et al. |
| 2012/0078547 A1 | 3/2012 | Murdoch |
| 2012/0079471 A1 | 3/2012 | Vidal et al. |
| 2012/0099478 A1 | 4/2012 | Fu et al. |
| 2012/0109999 A1 | 5/2012 | Futty et al. |
| 2012/0126995 A1 | 5/2012 | Sobotka et al. |
| 2012/0173032 A1 | 7/2012 | Pamulaparthy et al. |
| 2012/0209057 A1 | 8/2012 | Siess et al. |
| 2012/0216244 A1 | 8/2012 | Kumar et al. |
| 2012/0245595 A1 | 9/2012 | Kesavadas et al. |
| 2012/0265357 A1 | 10/2012 | Song et al. |
| 2012/0299744 A1 | 11/2012 | Sfaelos |
| 2013/0031201 A1 | 1/2013 | Kagan et al. |
| 2013/0055389 A1 | 2/2013 | Alvarez et al. |
| 2013/0066965 A1 | 3/2013 | Foti |
| 2013/0073059 A1 | 3/2013 | Brian et al. |
| 2013/0073374 A1 | 3/2013 | Heath |
| 2013/0084882 A1 | 4/2013 | Khorashadi et al. |
| 2013/0103657 A1 | 4/2013 | Ikawa et al. |
| 2013/0151849 A1 | 6/2013 | Graham et al. |
| 2013/0158918 A1 | 6/2013 | Spanier et al. |
| 2013/0198245 A1* | 8/2013 | Kagan ..................... H04L 67/06 |
| | | 707/812 |
| 2013/0198507 A1 | 8/2013 | Kasuya |
| 2013/0200702 A1 | 8/2013 | Schöppner |
| 2013/0204450 A1 | 8/2013 | Kagan et al. |

| | | |
|---|---|---|
| 2013/0293390 A1 | 11/2013 | Le Buhan et al. |
| 2013/0318627 A1 | 11/2013 | Lundkvist et al. |
| 2014/0025321 A1 | 1/2014 | Spanier |
| 2014/0058572 A1 | 2/2014 | Stein et al. |
| 2014/0094194 A1 | 4/2014 | Schwent et al. |
| 2014/0149836 A1 | 5/2014 | Bedard et al. |
| 2014/0172885 A1 | 6/2014 | Sekharan |
| 2014/0236371 A1 | 8/2014 | Ishihara et al. |
| 2014/0277788 A1 | 9/2014 | Forbes, Jr. |
| 2014/0281620 A1 | 9/2014 | Rallo et al. |
| 2014/0325679 A1 | 10/2014 | Heo et al. |
| 2015/0039279 A1 | 2/2015 | Volovoi |
| 2015/0089061 A1 | 3/2015 | Li et al. |
| 2015/0143108 A1 | 5/2015 | Demeter et al. |
| 2015/0178865 A1 | 6/2015 | Anderson et al. |
| 2015/0185748 A1 | 7/2015 | Ishchenko et al. |
| 2015/0286394 A1 | 10/2015 | Koval |
| 2015/0294013 A1 | 10/2015 | Ozer |
| 2015/0316907 A1 | 11/2015 | Elbsat et al. |
| 2015/0317151 A1 | 11/2015 | Falcy et al. |
| 2015/0317589 A1 | 11/2015 | Anderson et al. |
| 2015/0324896 A1 | 11/2015 | Marson et al. |
| 2015/0341969 A1 | 11/2015 | Brochu et al. |
| 2016/0011616 A1 | 1/2016 | Janous et al. |
| 2016/0034437 A1 | 2/2016 | Yong et al. |
| 2016/0156184 A1 | 6/2016 | Sharma et al. |
| 2016/0283256 A1 | 9/2016 | Standley et al. |
| 2016/0294953 A1 | 10/2016 | Prabhakar et al. |
| 2016/0359684 A1 | 12/2016 | Rizqi et al. |
| 2016/0364648 A1 | 12/2016 | Du et al. |
| 2017/0011320 A1 | 1/2017 | Anderson et al. |
| 2017/0039372 A1 | 2/2017 | Koval et al. |
| 2017/0063566 A1 | 3/2017 | Seminario et al. |
| 2017/0078455 A1 | 3/2017 | Fisher et al. |
| 2017/0140149 A1 | 5/2017 | Dumas et al. |
| 2017/0147329 A1 | 5/2017 | Shutt et al. |
| 2017/0162320 A1 | 6/2017 | Rumrill |
| 2017/0180137 A1 | 6/2017 | Spanier et al. |
| 2017/0185056 A1 | 6/2017 | Satou |
| 2017/0238805 A1 | 8/2017 | Addison et al. |
| 2017/0270414 A1 | 9/2017 | Ignatova et al. |
| 2017/0285114 A1 | 10/2017 | Bickel et al. |
| 2017/0317495 A1 | 11/2017 | Pavlovski et al. |
| 2017/0323208 A1 | 11/2017 | Al-Mohssen et al. |
| 2017/0373500 A1 | 12/2017 | Shafi et al. |
| 2018/0025423 A1 | 1/2018 | Utsumi et al. |
| 2018/0066860 A1 | 3/2018 | Carlson et al. |
| 2018/0260695 A1 | 9/2018 | Majumdar et al. |
| 2018/0260920 A1 | 9/2018 | Saratsis et al. |
| 2018/0275898 A1 | 9/2018 | Bhansali et al. |
| 2019/0086891 A1 | 3/2019 | Kawamoto et al. |
| 2019/0102411 A1 | 4/2019 | Hung et al. |
| 2019/0138964 A1 | 5/2019 | Morita et al. |
| 2019/0205116 A1 | 7/2019 | Chen et al. |
| 2019/0260204 A1 | 8/2019 | Koval et al. |
| 2019/0340545 A1 | 11/2019 | Minegishi et al. |
| 2019/0349733 A1 | 11/2019 | Nolan et al. |
| 2020/0143522 A1 | 5/2020 | Vogels et al. |
| 2020/0266628 A1 | 8/2020 | Kato et al. |

FOREIGN PATENT DOCUMENTS

| | | |
|---|---|---|
| JP | 2001-312712 A | 11/2001 |
| JP | 2009-225629 A | 10/2009 |
| KR | 10-1522175 B1 | 5/2015 |
| WO | 2008/099035 A1 | 8/2008 |
| WO | 2009/044369 A2 | 4/2009 |
| WO | 2009/044369 A3 | 4/2009 |

OTHER PUBLICATIONS

Yu et al., "Deep Convolutional Neural Networks with Layer-wise Context Expansion and Attention," Sep. 2016. (5 pages).

Yum, "Secured Remote Data," Manual Page, 2012, retrieved from yum.baseurl.org/wiki/securedRemoteData on Apr. 18, 2019. (2 pages).

Zeinalipour-Yazti et al, "MicroHash: An Efficient Index Structure for Flash-Based Sensor Devices," Proceedings of the 4th Confer-

(56)                   References Cited

OTHER PUBLICATIONS ence on USENIX Conference on File and Storage Technologies, Dec. 2005, vol. 4. (14 pages).

Zhang et al., "On supporting containment queries in relational database management systems," ACM SIGMOD Record, 2001, vol. 30. No. 2, pp. 425-436.

Allard et al., "Jini meets UPnP: an architecture for Jini/UPnP interoperability," Proceedings of the 2003 Symposium on Applications and the Internet, Institute of Electrical and Electronics Engineers, 2003. (8 pages).

Andersen et al., "Btrdb: Optimizing storage system design for timeseries processing," Proceedings of the 14th USENIX Conference on File and Storage Technologies (FAST '16), 2006, pp. 39-52.

Braden, R., "Requirements for Internet Hosts—Application and Support," Request for Comments: 1123, Oct. 1989. (97 pages).

Chima, Chikodi, "How Social Media Will Make the smart Energy Grid More Efficient," mashable.com, Feb. 8, 2011. (4 pages).

Codingfreak, "iptables—Rate-limit incoming connections," https://web.archive.org/web/20100426123449/http://codingfreak.blogspot.com/2010/01/iptables-rate-limitincoming.htm, Apr. 26, 2010. (3 pages).

Communicator EXT 3.0: User Manual Revision 1.32, Electro Industries/Gauge Tech, Aug. 27, 2007. (558 pages).

Crockford, Douglas, "What jsmin Does," https://web.archive.org/web/20030621080211/http://www.crockford.com/javascript/jsmin.html, Oct. 28, 2002. (2 pages).

"The Debian New Maintainer's Guide," Debian.org, 2011, Chapters 1, 6, and B, retrieved from https://lweb.archive.org/web/2011051401193B/http://www.debian.org/doc/manuals/maint-guide/start.en.html on Apr. 28, 2021. (16 pages).

Deutsch et al., "How to Use Anonymous FTP," RFC1635, May 1994. (14 pages).

Duncan et al., "Protection, metering, monitoring, and control of medium-voltage power systems," IEEE Transactions on Industry Applications, Jan./Feb. 2004, vol. 40, No. 1, pp. 33-40.

"Electromagnetic compatibility (EMC) Part 4: Testing and measuring techniques, Section 15: Flickermeter-Functional and design specifications (IEC 61000-4-15)," European Committee for Electrotechnical Standardization, Apr. 1998. (25 pages).

"File Transfer Protocol," Wikipedia, https://web.archive.org/web/20051216071210/http:en.wikipedia.org/wiki/File_Transfer_Protocol, Dec. 16, 2005. (9 pages).

Futura+Series, "Advanced Power Monitoring and Analysis for the 21st Century," Electro Industries/Gauge Tech, Specification, Apr. 13, 2000. (8 pages).

"User's Installation & Operation and User's Programming Manual," The Futura Series, Electro Industries/Gaugetech, 1995. (34 pages).

Gonzales et al., "Passive Scanning in Modbus Networks," IFIP International Federation for Information Processing, 2008, vol. 253, Critical Infrastructure Protection, pp. 175-187.

Horowitz et al., "FTP Security Extensions," RFC 2228, 1997, retrieved from https://tools.ietf.org/html/rfc2228, Apr. 18, 2019. (18 pages).

Hubbert, "What is flat file?", WhatIs.com, http://searchsqlserver.techtarget.com/definition/flat-file, Jul. 2006. (1 page).

"HW Virtual Serial Port," HW server, http://www.trcontrolsolutions.com/pdfs/hw_vsp_v104_en.pdf, Jul. 2003. (4 pages).

"ION7550/ION7650 PowerLogic power-monitoring units: Technical data sheets," Schneider Electric, 2006. (12 pages).

"7500 ION: High Visibility 3-Phase Energy & Power Quality Meter, Power Measurement, specification," ION Technology, revision date Mar. 21, 2000. (8 pages).

"7500 ION 7600 ION: High Visibility Energy & Power Quality Compliance Meters, Power Measurement, specification," ION Technology, revision date Nov. 30, 2000. (8 pages).

"7700 ION: 3-Phase Power Meter, Analyzer and Controller: Power Measurement, specification," ION Technology, revision date Dec. 8, 1998. (10 pages).

Janetzko et al., "Anomaly detection for visual analytics of power consumption data," Computers & Graphics, 2014, vol. 38, pp. 27-37.

Kezunovic, Mladen, "Smart Fault Location for Smart Grids," IEEE Transactions on Smart Grid, Mar. 2011, vol. 2, No. 1, pp. 11-22.

Khan et al., "Approach for smart meter load profiling in Monte Carlo simulation applications," The Institute of Engineering and Technology, 2017, vol. 11, No. 7, pp. 1856-1864.

Computer Dictionary, Microsoft, 2002, 5th Edition; pp. 174, 215, and 276 (excerpt includes table of contents and front matter).

Definition of JavaScript, Computer Dictionary, Microsoft, 2002, 5th Edition. (3 pages).

"Using DNS Servers with DHCP," Microsoft TechNet, Jan. 21, 2005, accessed from https://technet.microsoft.com/en-us/library/cc787034 on Jun. 9, 2015. (4 pages).

Milanovic et al., "The Influence of Fault Distribution on Stochastic Prediction of Voltage Sags," IEEE Transactions on Power Delivery, Jan. 2005, vol. 20, No. 1, pp. 278-285.

Natarajan, Ramesh, "4 Easy Steps to Upgrade Linksys Wireless Router," Thegeekstuff.com, https://www.thegeekstuff.com/2009/06/how-to-upgrade-linksys-wireless-router-firmware, Jun. 8, 2009. (3 pages).

"Nexus 1250: Installation and Operation Manual Revision 1.20," Electro Industries/Gauge Tech, Nov. 8, 2000. (50 pages).

"Nexus 1250: Performance Power Meter & Data Acquisition Node," Electro Industries/Gauge Tech, specification, Dec. 14, 2000. (8 pages).

"Nexus 1250: Precision Power Meter & Data Acquisition Node," Accumeasure Technology, Electro Industries/Gauge Tech, specification, Nov. 1999. (16 pages).

"Introduction to Code Obfuscation," Paladion, https://www.paladion.net/blogs/introduction-to-code-obfuscation, 2004. (52 pages).

Pan et al., "LiftingNet: A Novel Deep Learning Network With Layerwise Feature Learning From Noisy Mechanical Data for Fault Classification," IEEE Transactions on Industrial Electronics, 2017, vol. 65, No. 6, pp. 4973-4982.

Postel et al., "File Transfer Protocol (FTP)", RFC 959, Oct. 1985. (66 pages).

"PowerLogic Series 4000 Circuit Monitors," Schneider Electric, Document # 3020HO0601, Jan. 2006. (4 pages).

Speirs, Ryan, "What is binary file?", WhatIs.com, http://whatis.techtarget.com/definition/binary-file, Apr. 2005. (1 page).

The Study Genius, "What is NIC (Network Interface Card)? How NIC works?", https://web.archive.org/web/20201117135313/https://www.thestudygenius.com/what-is-nic-network-interface-card/, Nov. 17, 2020. (9 pages).

Trunov et al., "Legacy Applications Model Integration to Support Scientific Experiment," Institute of Electrical and Electronics Engineers, Mar. 2018. (7 pages).

Tufekci, Pinar, "Prediction of full load electrical power output of a base load operated combined cycle power plant using machine learning methods," International Journal of Electrical Power & Energy Systems, 2014, vol. 60, pp. 126-140.

"Universal Plug and Play," Wikipedia, https://web.archive.org/web/2001014015536/http://en.wikipedia.org/wiki/Universal_Plug_and_Play, Oct. 14, 2007. (14 pages).

"UPnP Device Architecture 1.0," UPnP Forum, revised Apr. 24, 2008. (80 pages).

"Use Excel as a Web Browser," https://www.youtube.com/watch?v=A7LukCXev78, 2010.

"What is a Network Interface Card?", WhatIs.com, https://www.techtarget.com/searchnetworking/definition/network-interface-card?_gl=1 *13qjdky*_ga*NzA 1 MzE3NjAyLjE2MzI3NzU5NjA.*_ga_TQKE4GS5P9*MTYzMjk1 MDkzNC4yLjEuMTYzMjk1 MTY3Ny4w&_ga=2.164813883.525309060.1632950935-705317602.1632775960, Sep. 27, 2021. (5 pages).

White, Russ, "Working with IP addresses," The Internet Protocol Journal, Cisco Systems, Inc., vol. 9, No. 1, 1992-2006, http://web.archive.org/web/20060508172602/http://www.cisco.com/web/about/ac123/ac147/archived_issues/ipj_9-1/ip_addresses.tml, May 8, 2008. (8 pages).

"Burst Mode (computing)," Wikipedia, https://web.archive.org/web/20081018044345/http://en.wikipedia.org/wiki/Burst_mode_(computing), Oct. 18, 2008. (1 page).

(56)           References Cited

OTHER PUBLICATIONS

"Dojo Toolkit," Wikipedia, https://web.archive.org/web/
20130201004903/http://en.wikipedia.org/wiki/Dojo_Toolkit, Feb. 1,
2023.
"User Datagram Protocol," Wikipedia, https://web.archive.org/web/
20050823032448/https://en.wikipedia.org/wiki/User_Datagram_
Protocol, Aug. 23, 2005. (2 pages).
Wils et al., "Device discovery via residential gateways," IEEE
Transactions on Consumer Electronics, Aug. 2002, vol. 48, No. 3,
pp. 478-483.

* cited by examiner

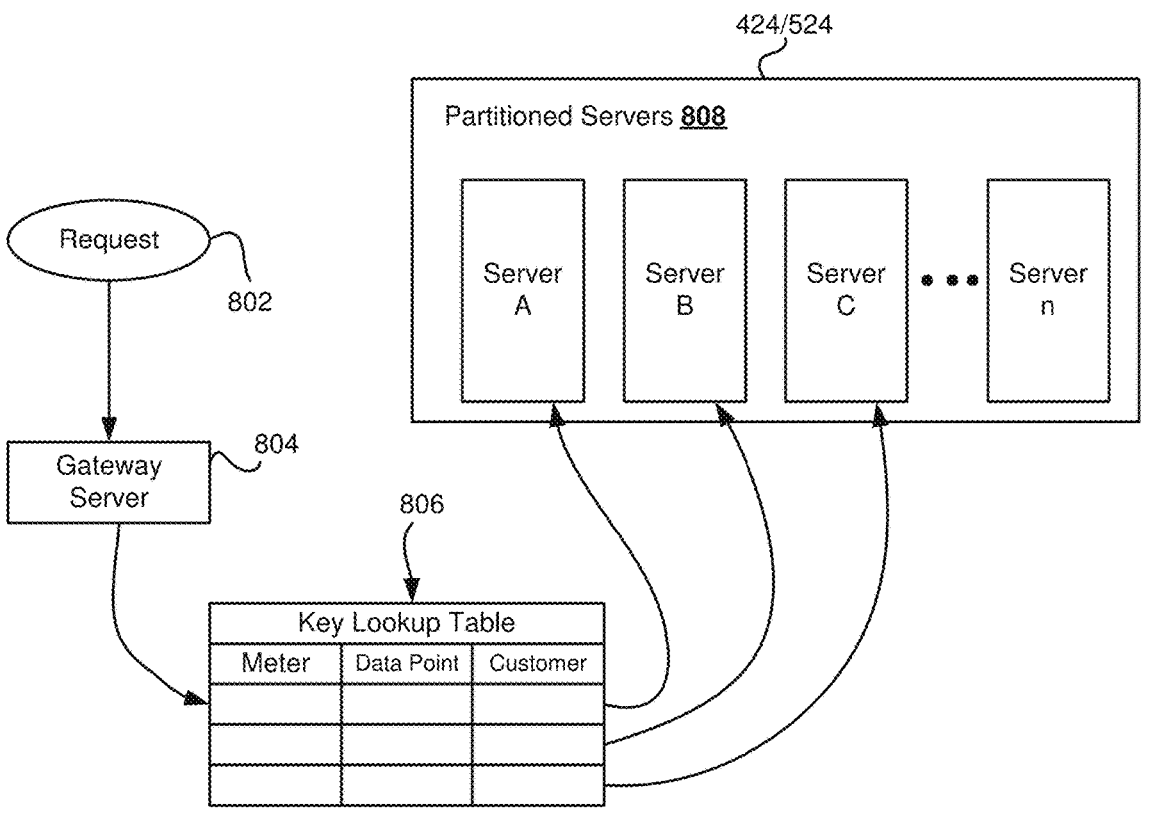
FIG. 12A    Partitioned Servers based on key
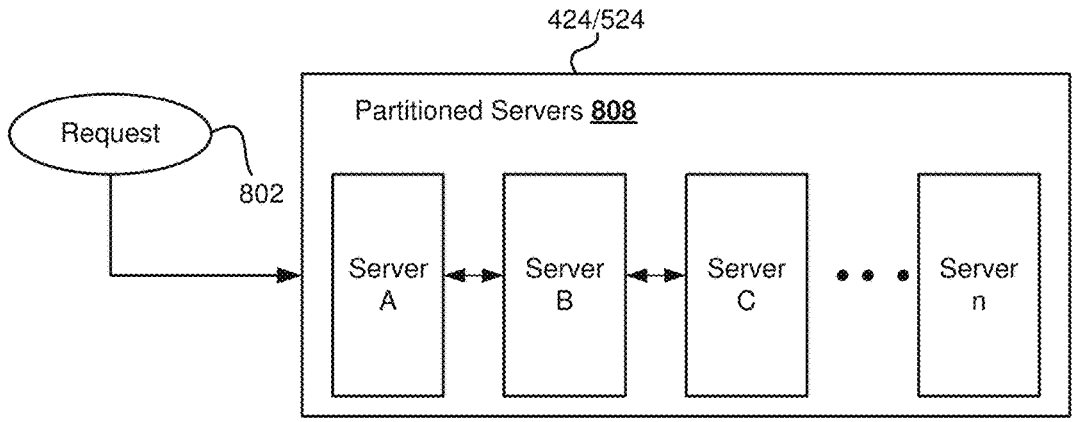
FIG. 12B    Load Balancing - sync servers to store duplicate Load Balancing based on location Dynamic Load balancing

424/524

1100

1104

DATA LIBRARY

1102

MACHINE LEARNING MODULE

ACTION MODULE

1106

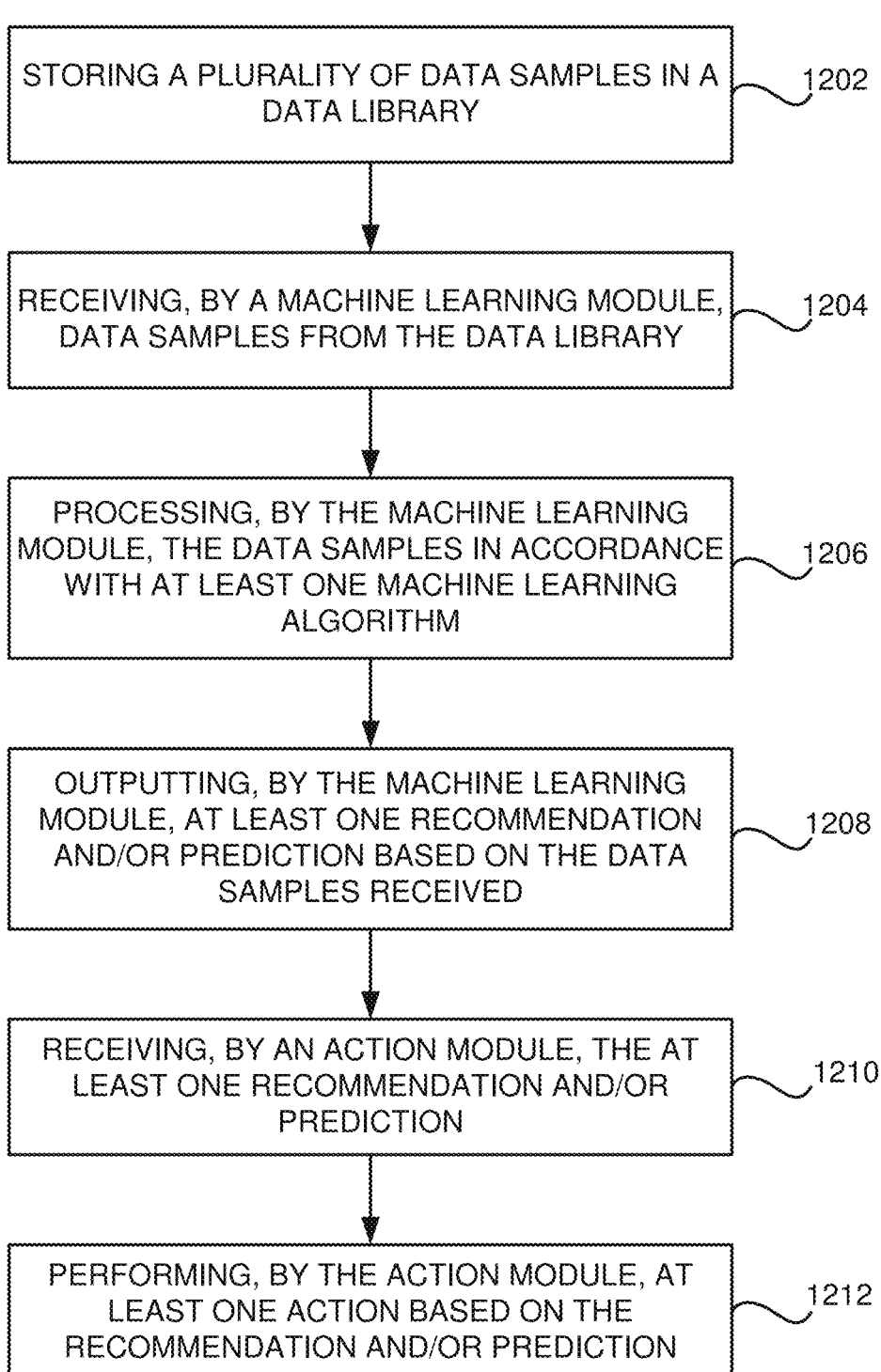

STORING A PLURALITY OF DATA SAMPLES IN A DATA LIBRARY ⟩1202

RECEIVING, BY A MACHINE LEARNING MODULE, DATA SAMPLES FROM THE DATA LIBRARY ⟩1204

PROCESSING, BY THE MACHINE LEARNING MODULE, THE DATA SAMPLES IN ACCORDANCE WITH AT LEAST ONE MACHINE LEARNING ALGORITHM ⟩1206

OUTPUTTING, BY THE MACHINE LEARNING MODULE, AT LEAST ONE RECOMMENDATION AND/OR PREDICTION BASED ON THE DATA SAMPLES RECEIVED ⟩1208

RECEIVING, BY AN ACTION MODULE, THE AT LEAST ONE RECOMMENDATION AND/OR PREDICTION ⟩1210

PERFORMING, BY THE ACTION MODULE, AT LEAST ONE ACTION BASED ON THE RECOMMENDATION AND/OR PREDICTION ⟩1212

FIG. 15

Prediction components

Prediction request sequence
(No model exists)

Prediction request sequence

FIG. 24A

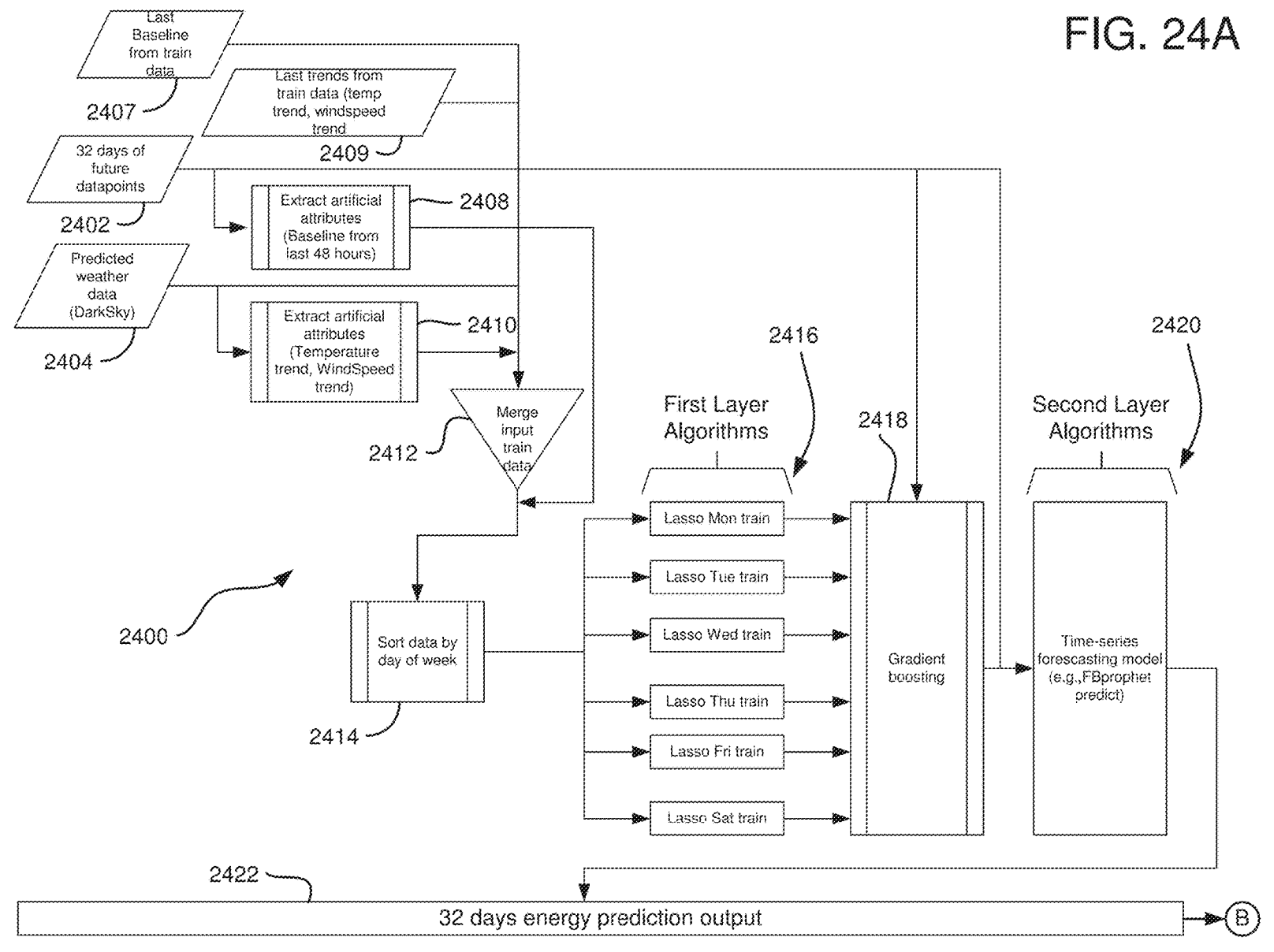

2420 Second Layer Algorithms

Time-series forecasting model (e.g., FBprophet predict)

2418 Gradient boosting

2416 First Layer Algorithms

Lasso Mon train
Lasso Tue train
Lasso Wed train
Lasso Thu train
Lasso Fri train
Lasso Sat train 2407 Last Baseline from train data 2409 Last trends from train data (temp trend, windspeed trend)

2402 32 days of future datapoints

2404 Predicted weather data (DarkSky)

2408 Extract artificial attributes (Baseline from last 48 hours)

2410 Extract artificial attributes (Temperature trend, WindSpeed trend)

2412 Merge input train data

2414 Sort data by day of week

2400

2422 32 days energy prediction output

B

DEVICES, SYSTEMS AND METHODS FOR PREDICTING FUTURE CONSUMPTION VALUES OF LOAD(S) IN POWER DISTRIBUTION SYSTEMS

PRIORITY

This application is a continuation of U.S. patent application Ser. No. 16/918,650, filed Jul. 1, 2020, which is a continuation-in-part application to U.S. patent application Ser. No. 16/278,760, filed Feb. 19, 2019, which claims priority to U.S. Provisional Patent Application Serial Nos. 62/631,660, filed Feb. 17, 2018, and 62/752,740, filed Oct. 30, 2018, the contents of which are hereby incorporated by reference in their entireties.

This application also claims priority to U.S. Provisional Patent Application Ser. No. 62/869,532, filed Jul. 1, 2019, the contents of which are hereby incorporated by reference in its entirety.

BACKGROUND

Field. The present disclosure relates generally to intelligent electronic devices (IEDs) and utility metering systems, and more particularly, to devices, systems and methods for the collection of meter data in a common, globally accessible, group of servers, to provide simpler configuration, collection, viewing, and analysis of the meter data.

DESCRIPTION OF THE RELATED ART

Meter Data—the collection, storage, and viewing of it—is quickly becoming a major issue in the Power Industry, as more and more devices are commissioned. Meters have hundreds of channels, with years of data, and customers have thousands of meters, resulting in trillions of data points. Additionally, as the data for multiple meters at a location are often interconnected, it is important to be able access that data in parallel, preventing it from being stored separately.

Not only do users expect to be able to access each of these data points from anywhere, with increasing emphasis on security in corporate networks, many users are losing the ability to install client software to perform specialized meter data viewing. Additionally, many networks restrict the network traffic that is allowed in and out, making it difficult for data collection software to query meter data from meters.

Another problem encountered in networks, especially when traversing public networks such as the Internet, is that data can be intercepted and changed by malicious hosts. While it may be desirous for benign hosts, such as firewalls, to access this data, malicious hosts should be prevented. Additionally, malicious hosts can emulate data servers and meters, causing traffic to go to unintended destinations, or changing the data before it gets to the server.

SUMMARY

According to one aspect of the present disclosure, management of meter data is implemented by storing that data in a central data server, accessible from anywhere in the world. Such a server, also referred to as Meter Data Cloud, may store the data from all configured meters worldwide, providing both a consistent location for data to be queried from, but also simplifying the management of the meter data for the user. Such a Meter Data Cloud, being accessible from the public Internet, facilitates user access, as no client software would be required, and the meter data may be presented through a public webpage.

In another aspect, the management of meter data is implemented by creating tiers of data, wherein over time older data is analyzed and replaced with lower resolution summary data. Such tiers may also change the location the data is stored, placing the most recent data in the fastest locations, and moving the older tiers to slower backup locations.

In one aspect of the present disclosure, the restriction of traffic may be alleviated by enabling the meters to push their own data up to the Meter Data Cloud. Such a push would be outbound from a private network, often open through firewalls, and may use common protocols, which may easily be allowed by firewall management. Additionally, such traffic may be routed through secure protocols, such as HTTPS and VPNs, among others, to ensure privacy.

Another implementation to alleviate the restriction of traffic is to provide an intermediary data collector, within the private network, that would collect the meters data, and provide the upload service to the Meter Data Cloud. Such an intermediary data collector, being a single node in the network, is easier to configure to allow outbound data access.

In one aspect, the number of meters is resolved by enabling the meters to register themselves with the Meter Data Cloud.

Another solution to the number of meters is for meters to use arbitrary local only Internet addresses, and only interact with the outside world through the Meter Data Cloud. Such a meter would require either local access to configure, or commands left on the server, sometimes called a Command and Control (CNC) Server.

In one aspect of the present disclosure, a machine learning system for use with a power distribution system is provided including a data library configured to store a plurality of data samples, wherein at least a portion of the data samples are associated with one or more intelligent electronic devices (IEDs); a machine learning module configured to execute at least one machine learning algorithm or function and receive data samples from the data library, the machine learning module configured to process the data samples in accordance with the at least one machine learning algorithm and output at least one recommendation and/or prediction based on the data samples received; and an action module configured to receive the at least one recommendation and/or prediction from the machine learning module and perform at least one action based on the recommendation and/or prediction, wherein the action includes outputting at least one of a communication signal and/or at least one control signal to at least one client or at least one of the one or more IEDs.

In another aspect, the machine learning system further includes a server including at least one memory and at least one processor, the data library stored in the at least one memory and the machine learning module and action module executed by the at least one processor.

In one aspect, the at least one machine learning algorithm includes at least one of an Artificial Neural Network, a Backpropagation, Deep Learning, a Convolutional Neural Network, a Recurrent Neural Network, and/or an Evolution Algorithm.

In a further aspect, the plurality of data samples include at least one of voltage, current, and frequency values measured by the one or more IEDs, the recommendation and/or prediction includes a prediction of energy usage in a predetermined future time interval, and the action performed by the action module includes outputting the communication signal to the at least one client indicating the predicted energy usage.

In yet another aspect, the plurality of data samples include at least one of voltage, current, and frequency values measured by the one or more IEDs, the recommendation and/or prediction includes a prediction of energy usage in a predetermined future time interval, and the action performed by the action module includes outputting the control signal to the at least one client to shut off one or more loads if the predicted energy usage is above a predetermined threshold.

In one aspect, the predetermined threshold is determined by the machine learning module based on load shedding parameters including at least one of time of day, designation of equipment as essential or non-essential, and/or real-time pricing issued by a utility.

In a further aspect, the plurality of data samples include at least one of voltage, current, and frequency values measured by the one or more IEDs, the recommendation and/or prediction includes a prediction of energy usage in a predetermined future time interval, and the action performed by the action module includes outputting the communication signal to the at least one client indicating additional energy may be consumed by a load if the predicted energy usage is below a predetermined threshold.

In still another aspect, the plurality of data samples include a first trained set based on historical readings by the one or more IEDs, a second trained set based on live readings of the one or more IEDs, and environmental information, the recommendation and/or prediction includes a prediction of energy usage for a predetermined future time interval, the action performed by the action module includes outputting a communication signal to the at least one client indicating the predicted energy usage.

In a further aspect, the plurality of data samples further includes pricing information, the machine learning module predicts pricing costs for the predetermined future time interval, and the action module sends a communication signal to the at least one client including the predicting pricing costs for the predetermined future time interval.

In one aspect, the machine learning module generates a recommendation as to which periods within the predetermined future time interval to lower and increase energy usage to reduce costs and the action module sends a communication signal to the at least one client including the recommendation.

In another aspect, the machine learning module generates a recommendation as to when ideal periods within the predetermined future time interval to lower and increase energy usage to reduce costs and the action module sends a control signal to the at least one client to turn on or off loads to increase or decrease energy usage in a way that lowers costs.

In a further aspect, the plurality of data samples include waveform signatures of faults measured by the one or more IEDs occurring on the power distribution system, and the recommendation/prediction includes a prediction of at least one type of fault and a number of predicted future occurrences of the predicted at least one type of fault.

In another aspect, the at least one type of fault includes at least one of transients, interruption of supply voltage or load current, undervoltage, overvoltage, waveform distortion, and/or voltage fluctuations.

In another aspect, a machine learning load predicter is provided that allows a user to know what a particular load will be over a predetermined period of time, e.g., the next 30 days, to try and predict a way to help them save money. The load predictor looks at historical usage and allocates a weather factor. The load predictor predicts on what day a new maximum demand will be reached so that the user may be alerted in advance (e.g., by e-mail, text message, etc.) to reduce load and avoid the new peak demand from ever happening. In one embodiment, an Elastic Net regression is employed, which is a regularized regression technique employed in machine learning (ML).

BRIEF DESCRIPTION OF THE DRAWINGS

These and other objects, features and advantages of the present disclosure will be apparent from a consideration of the following Detailed Description considered in conjunction with the drawing Figures, in which:

FIG. 12A illustrates a partitioned server for distributed functionality in accordance with an embodiment of the present disclosure.

FIG. 12B illustrates a partitioned server for storing duplicate copies of data in accordance with an embodiment of the present disclosure.

FIG. 15 is a method for using the machine learning and analysis system of FIG. 14 in accordance with an embodiment of the present disclosure.

FIGS. 24A-B illustrate a method for prediction energy usage in accordance with an embodiment of the present disclosure.

DETAILED DESCRIPTION

Embodiments of the present disclosure will be described herein below with reference to the accompanying drawings. In the following description, well-known functions or constructions are not described in detail to avoid obscuring the present disclosure in unnecessary detail. The word "exemplary" is used herein to mean "serving as an example, instance, or illustration." Any configuration or design described herein as "exemplary" is not necessarily to be construed as preferred or advantageous over other configurations or designs. Herein, the phrase "coupled" is defined to mean directly connected to or indirectly connected with through one or more intermediate components. Such intermediate components may include both hardware and software based components.

It is further noted that, unless indicated otherwise, all functions described herein may be performed in either hardware or software, or some combination thereof. In one embodiment, however, the functions are performed by at least one processor, such as a computer or an electronic data processor, digital signal processor or embedded microcontroller, in accordance with code, such as computer program code, software, and/or integrated circuits that are coded to perform such functions, unless indicated otherwise.

It should be appreciated that the present disclosure can be implemented in numerous ways, including as a process, an apparatus, a system, a device, a method, or a computer readable medium such as a computer readable storage medium or a computer network where program instructions are sent over optical or electronic communication links.

Embodiments of the present disclosure will be described herein below with reference to the accompanying drawings.

As used herein, intelligent electronic devices ("IEDs") can be any device that senses electrical parameters and computes data including, but not limited to, Programmable Logic Controllers ("PLC's"), Remote Terminal Units ("RTU's"), electric power meters, panel meters, protective relays, fault recorders, phase measurement units, serial switches, smart input/output devices and other devices which are coupled with power distribution networks to manage and control the distribution and consumption of electrical power. A meter is a device that records and measures power events, power quality, current, voltage waveforms, harmonics, transients and other power disturbances. Revenue accurate meters ("revenue meter") relate to revenue accuracy electrical power metering devices with the ability to detect, monitor, report, quantify and communicate power quality information about the power that they are metering.

Figure 1:
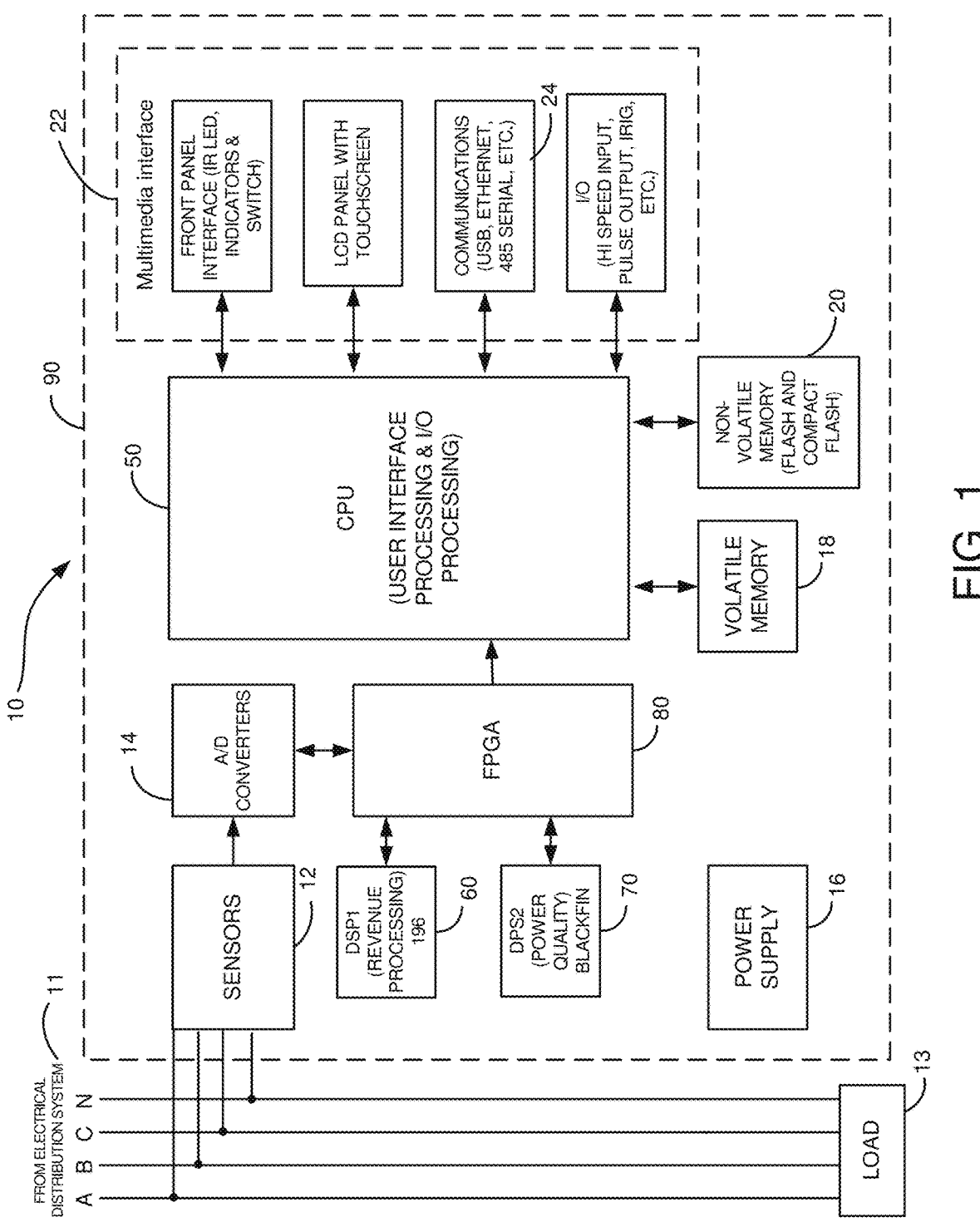
FIG. 1 is a block diagram of an intelligent electronic device (IED), according to an embodiment of the present disclosure.

FIG. 1 is a block diagram of an intelligent electronic device (IED) 10 for monitoring and determining power usage and power quality for any metered point within a power distribution system and for providing a data transfer system for faster and more accurate processing of revenue and waveform analysis.

The IED 10 of FIG. 1 includes a plurality of sensors 12 coupled to various phases A, B, C and neutral N of an electrical distribution system 11, a plurality of analog-to-digital (A/D) converters 14, including inputs coupled to the sensor 12 outputs, a power supply 16, a volatile memory 18, an non-volatile memory 20, a multimedia user interface 20, and a processing system that includes at least one central processing unit (CPU) 50 (or host processor) and/or one or more digital signal processors, two of which are shown, i.e., DSP1 60 and DSP2 70. The IED 10 also includes a Field Programmable Gate Array 80 which performs a number of functions, including, but not limited to, acting as a communications gateway for routing data between the various processors 50, 60, 70, receiving data from the A/D converters 14, performing transient detection and capture and performing memory decoding for CPU 50 and the DSP processor 60. In one embodiment, the FPGA 80 is internally comprised of two dual port memories to facilitate the various functions. It is to be appreciated that the various components shown in FIG. 1 are contained within housing 90. Exemplary housings will be described below in relation to FIGS. 2A-2H.

The plurality of sensors 12 sense electrical parameters, e.g., voltage and current, on incoming lines, (i.e., phase A, phase B, phase C, neutral N), from an electrical power distribution system 11, e.g., an electrical circuit, that are coupled to at least one load 13 that consumes the power provided. In one embodiment, the sensors 12 will include current transformers and potential transformers, wherein one current transformer and one voltage transformer will be coupled to each phase of the incoming power lines. A primary winding of each transformer will be coupled to the incoming power lines and a secondary winding of each transformer will output a voltage representative of the sensed voltage and current. The output of each transformer will be coupled to the A/D converters 14 configured to convert the analog output voltage from the transformer to a digital signal that can be processed by the CPU 50, DSP1 60, DSP2 70, FPGA 80 or any combination thereof.

A/D converters 14 are respectively configured to convert an analog voltage output to a digital signal that is transmitted to a gate array, such as Field Programmable Gate Array (FPGA) 80. The digital signal is then transmitted from the FPGA 80 to the CPU 50 and/or one or more DSP processors 60, 70 to be processed in a manner to be described below.

The CPU 50 and/or DSP Processors 60, 70 are configured to operatively receive digital signals from the A/D converters 14 (see FIG. 1) to perform calculations necessary to determine power usage and to control the overall operations of the IED 10. In some embodiments, CPU 50, DSP1 60 and DSP2 70 may be combined into a single processor, serving the functions of each component. In some embodiments, it is contemplated to use an Erasable Programmable Logic Device (EPLD) or a Complex Programmable Logic Device (CPLD) or any other programmable logic device in place of the FPGA 80. In some embodiments, the digital samples, which are output from the A/D converters 14 are sent directly to the CPU 50 or DSP processors 60, 70, effectively bypassing the FPGA 80 as a communications gateway.

The power supply 16 provides power to each component of the IED 10. In one embodiment, the power supply 16 is a transformer with its primary windings coupled to the incoming power distribution lines and having windings to provide a nominal voltage, e.g., 5 VDC, +12 VDC and –12 VDC, at its secondary windings. In other embodiments, power may be supplied from an independent power source to the power supply 16. For example, power may be supplied from a different electrical circuit or an uninterruptible power supply (UPS).

In one embodiment, the power supply 16 can be a switch mode power supply in which the primary AC signal will be converted to a form of DC signal and then switched at high frequency, such as, for example, 100 Khz, and then brought through a transformer to step the primary voltage down to, for example, 5 Volts AC. A rectifier and a regulating circuit would then be used to regulate the voltage and provide a stable DC low voltage output. Other embodiments, such as, but not limited to, linear power supplies or capacitor divid-ing power supplies are also contemplated.

The multimedia user interface 22 is shown coupled to the CPU 50 in FIG. 1 for interacting with a user and for communicating events, such as alarms and instructions to the user. The multimedia user interface 22 may include a display for providing visual indications to the user. The display may be embodied as a touch screen, a liquid crystal display (LCD), a plurality of LED number segments, indi-vidual light bulbs or any combination. The display may provide information to the user in the form of alpha-numeric lines, computer-generated graphics, videos, animations, etc. The multimedia user interface 22 further includes a speaker or audible output means for audibly producing instructions, alarms, data, etc. The speaker is coupled to the CPU 50 via a digital-to-analog converter (D/A) for converting digital audio files stored in a memory 18 or non-volatile memory 20 to analog signals playable by the speaker. An exemplary interface is disclosed and described in commonly owned U.S. Pat. No. 8,442,660, entitled "POWER METER HAV-ING AUDIBLE AND VISUAL INTERFACE", which claims priority to expired U.S. Provisional Patent Appl. No. 60/731,006, filed Oct. 28, 2005, the contents of which are hereby incorporated by reference.

The IED 10 will support various file types including but not limited to Microsoft Windows Media Video files (.wmv), Microsoft Photo Story files (.asf), Microsoft Windows Media Audio files (.wma), MP3 audio files (.mp3), JPEG image files (.jpg, .jpeg, .jpe, .jfif), MPEG movie files (.mpeg, .mpg, .mpe, .m1v, .mp2v.mpeg2), Microsoft Recorded TV Show files (.dvr-ms), Microsoft Windows Video files (.avi) and Microsoft Windows Audio files (.wav).

The IED 10 further comprises a volatile memory 18 and a non-volatile memory 20. In addition to storing audio and/or video files, volatile memory 18 will store the sensed and generated data for further processing and for retrieval when called upon to be displayed at the IED 10 or from a remote location. The volatile memory 18 includes internal storage memory, e.g., random access memory (RAM), and the non-volatile memory 20 includes removable memory such as magnetic storage memory; optical storage memory, e.g., the various types of CD and DVD media; solid-state storage memory, e.g., a CompactFlash card, a Memory Stick, SmartMedia card, MultiMediaCard (MMC), SD (Se-cure Digital) memory; or any other memory storage that exists currently or will exist in the future. By utilizing removable memory, an IED can be easily upgraded as needed. Such memory will be used for storing historical trends, waveform captures, event logs including time-stamps and stored digital samples for later downloading to a client application, web-server or PC application.

In a further embodiment, the IED 10 will include a communication device 24, also known as a network inter-face, for enabling communications between the IED or meter, and a remote terminal unit, programmable logic controller and other computing devices, microprocessors, a desktop computer, laptop computer, a server, other meter modules, etc. The communication device 24 may be a modem, network interface card (NIC), wireless transceiver, etc. The communication device 24 will perform its func-tionality by hardwired and/or wireless connectivity. The hardwire connection may include but is not limited to hard wire cabling e.g., parallel or serial cables, RS232, RS485, USB cable, Firewire (1394 connectivity) cables, Ethernet, and the appropriate communication port configuration. The wireless connection will operate under any of the various wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), satellite trans-mission or any other type of communication protocols, communication architecture or systems currently existing or to be developed for wirelessly transmitting data including spread spectrum 900 MHz, or other frequencies, Zigbee, WiFi, or any mesh enabled wireless communication.

The IED 10 may communicate to a server or other computing device via the communication device 24. The IED 10 may be connected to a communications network, e.g., the Internet, by any means, for example, a hardwired or wireless connection, such as dial-up, hardwired, cable, DSL, satellite, cellular, PCS, wireless transmission (e.g., 802.11a/ b/g), etc. It is to be appreciated that the network may be a local area network (LAN), wide area network (WAN), the Internet or any network that couples a plurality of computers to enable various modes of communication via network messages. Furthermore, the server will communicate using various protocols such as Transmission Control Protocol/ Internet Protocol (TCP/IP), File Transfer Protocol (FTP), Hypertext Transfer Protocol (HTTP), etc. and secure proto-cols such as Hypertext Transfer Protocol Secure (HTTPS), Internet Protocol Security Protocol (IPSec), Point-to-Point Tunneling Protocol (PPTP), Secure Sockets Layer (SSL) Protocol, etc.

In an additional embodiment, the IED 10 will also have the capability of not only digitizing waveforms, but storing the waveform and transferring that data upstream to a central computer, e.g., a remote server, when an event occurs such as a voltage surge or sag or a current short circuit. This data will be triggered and captured on an event, stored to memory, e.g., non-volatile RAM, and additionally trans-ferred to a host computer within the existing communication infrastructure either immediately, in response to a request from a remote device or computer to receive said data, and/or in response to a polled request. The digitized waveform will also allow the CPU 50 to compute other electrical parameters such as harmonics, magnitudes, symmetrical components and phasor analysis. Using the harmonics, the IED 10 will also calculate dangerous heating conditions and can provide harmonic transformer derating based on harmonics found in the current waveform.

In a further embodiment, the IED 10 will execute an e-mail client and will send e-mails to the utility or to the customer direct on an occasion that a power quality event occurs. This allows utility companies to dispatch crews to repair the condition. The data generated by the meters are used to diagnose the cause of the condition. The data may be transferred through the infrastructure created by the electrical power distribution system. The email client will utilize a POP3 or other standard mail protocol. A user will program the outgoing mail server and email address into the meter. An exemplary embodiment of said metering is available in U.S. Pat. No. 6,751,563, which all contents thereof are incorporated by reference herein.

The techniques of the present disclosure can be used to automatically maintain program data and provide field wide updates upon which IED firmware and/or software can be upgraded. An event command can be issued by a user, on a schedule or by digital communication that will trigger the IED 10 to access a remote server and obtain the new program code. This will ensure that program data will also be maintained allowing the user to be assured that all information is displayed identically on all units.

It is to be understood that the present disclosure may be implemented in various forms of hardware, software, firmware, special purpose processors, or a combination thereof. The IED 10 also includes an operating system and micro instruction code. The various processes and functions described herein may either be part of the micro instruction code or part of an application program (or a combination thereof) which is executed via the operating system.

It is to be further understood that because some of the constituent system components and method steps depicted in the accompanying figures may be implemented in software, or firmware, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figures 2A, 2B, 2C, 2D:
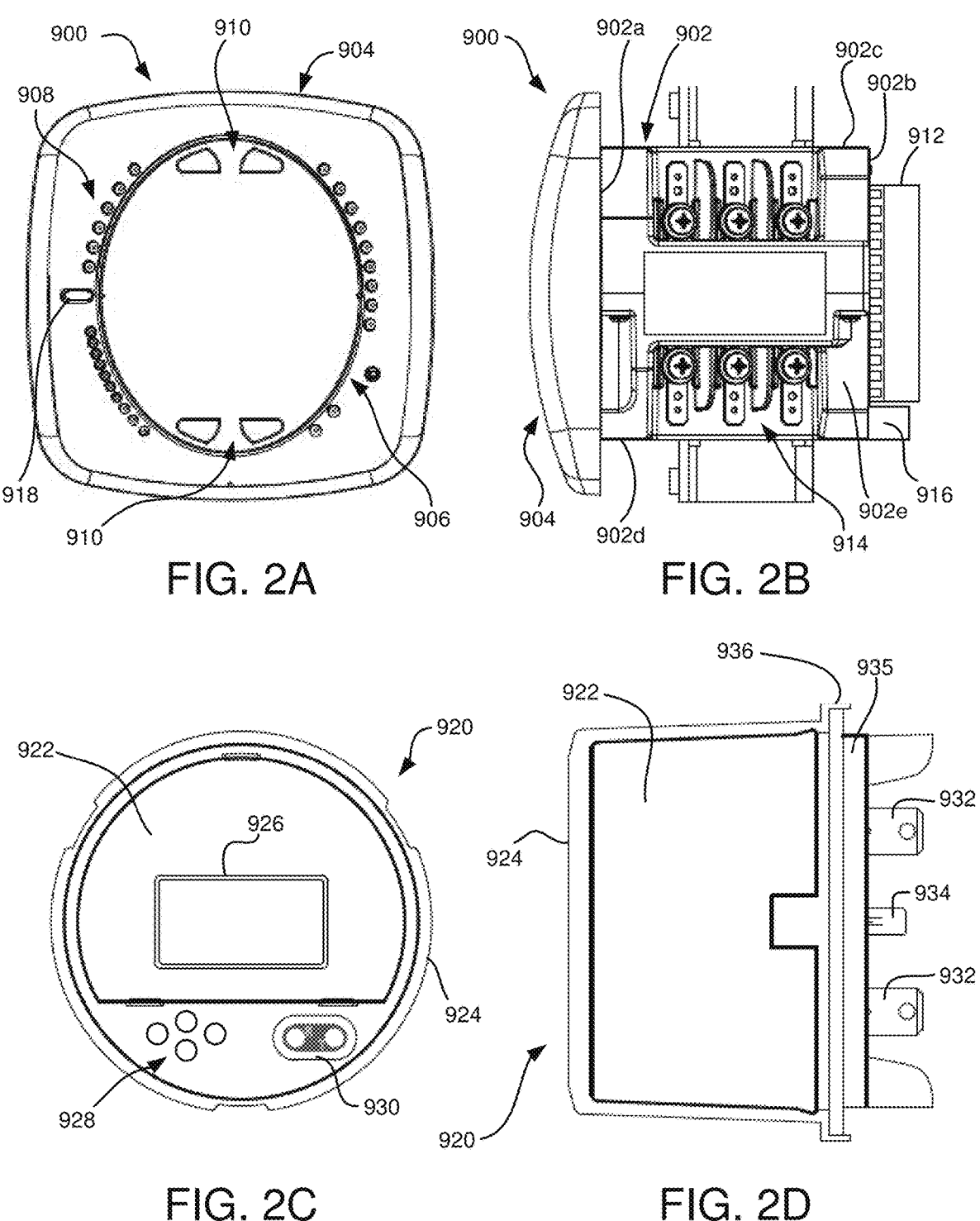
FIGS. 2A-2H illustrate exemplary form factors for an intelligent electronic device (IED) in accordance with an embodiment of the present disclosure.

Furthermore, it is to be appreciated that the components and devices of the IED 10 of FIG. 1 may be disposed in various housings depending on the application or environment. For example, the IED 10 may be configured as a panel meter 900 as shown in FIG. 2A an 2B. The panel meter 900 of FIGS. 2A and 2B is described in more detail in commonly owned U.S. Pat. No. 7,271,996, the contents of which are hereby orated by reference. As seen in FIGS. 2A and 2B, the IED 900 includes a housing 902 defining a front surface 902*a*, a rear surface 902*b*, a top surface 902*c*, a bottom surface 902*d*, a right side surface 902*e*, and a left side surface (not shown). Electrical device 900 includes a face plate 904 operatively connected to front surface 902*a* of housing 902. Face plate 904 includes displays 906, indicators 908 (e.g., LEDs and the like), buttons 910, and the like providing a user with an interface for visualization and operation of electrical device 100. For example, as seen in FIG. 2A, face plate 904 of electrical device 900 includes analog and/or digital displays 906 capable of producing alphanumeric characters. Face plate 904 includes a plurality of indicators 908 which, when illuminated, indicate to the user the "type of reading", the "% of load bar", the "parameter designation" which indicates the reading which is being displayed on displays 906, a "scale selector" (e.g., Kilo or Mega multiplier of Displayed Readings), etc. Face plate 904 includes a plurality of buttons 910 (e.g., a "menu" button, an "enter" button, a "down" button, a "right" button, etc.) for performing a plurality of functions, including and not limited to: viewing of meter information; enter display modes; configuring parameters; performing re-sets; performing LED checks; changing settings; viewing parameter values; scrolling parameter values; and viewing limit states. The housing 902 includes voltage connections or inputs 912 provided on rear surface 902*b* thereof, and current inputs 914 provided along right side surface 902*e* thereof. The IED 900 may include a first interface or communication port 916 for connection to a master and/or slave device. Desirably, first communication port 916 is situated in rear surface 902*b* of housing 902. IED 900 may also include a second interface or communication port 918 situated on face plate 904.

In another embodiment, the IED 10 may be configured as a socket meter 920, also known as a S-base type meter or type S meter, as shown in FIG. 2C an 2D. The socket meter 920 of FIGS. 2C and 2D is described in more detail in commonly owned application Ser. No. 12/578,062 (U.S. Publication No. 2010/0090680), the contents of which are hereby incorporated by reference. Referring to FIGS. 2C and 2D, the meter 920 includes a main housing 922 surrounded by a cover 924. The cover 924 is preferably made of a clear material to expose a display 926 disposed on the main body 922. An interface 928 to access the display and a communication port 930 is also provided and accessible through the cover 924. The meter 920 further includes a plurality of current terminals 932 and voltage terminals 934 disposed on backside of the meter extending through a base 935. The terminals 932, 934 are designed to mate with matching jaws of a detachable meter-mounting device, such as a revenue meter socket. The socket is hard wired to the electrical circuit and is not meant to be removed. To install an S-base meter, the utility need only plug in the meter into the socket. Once installed, a socket-sealing ring 936 is used as a seal between the meter 920 and/or cover 924 and the meter socket to prevent removal of the meter and to indicate tampering with the meter.

Figures 2E, 2F, 2G, 2H:
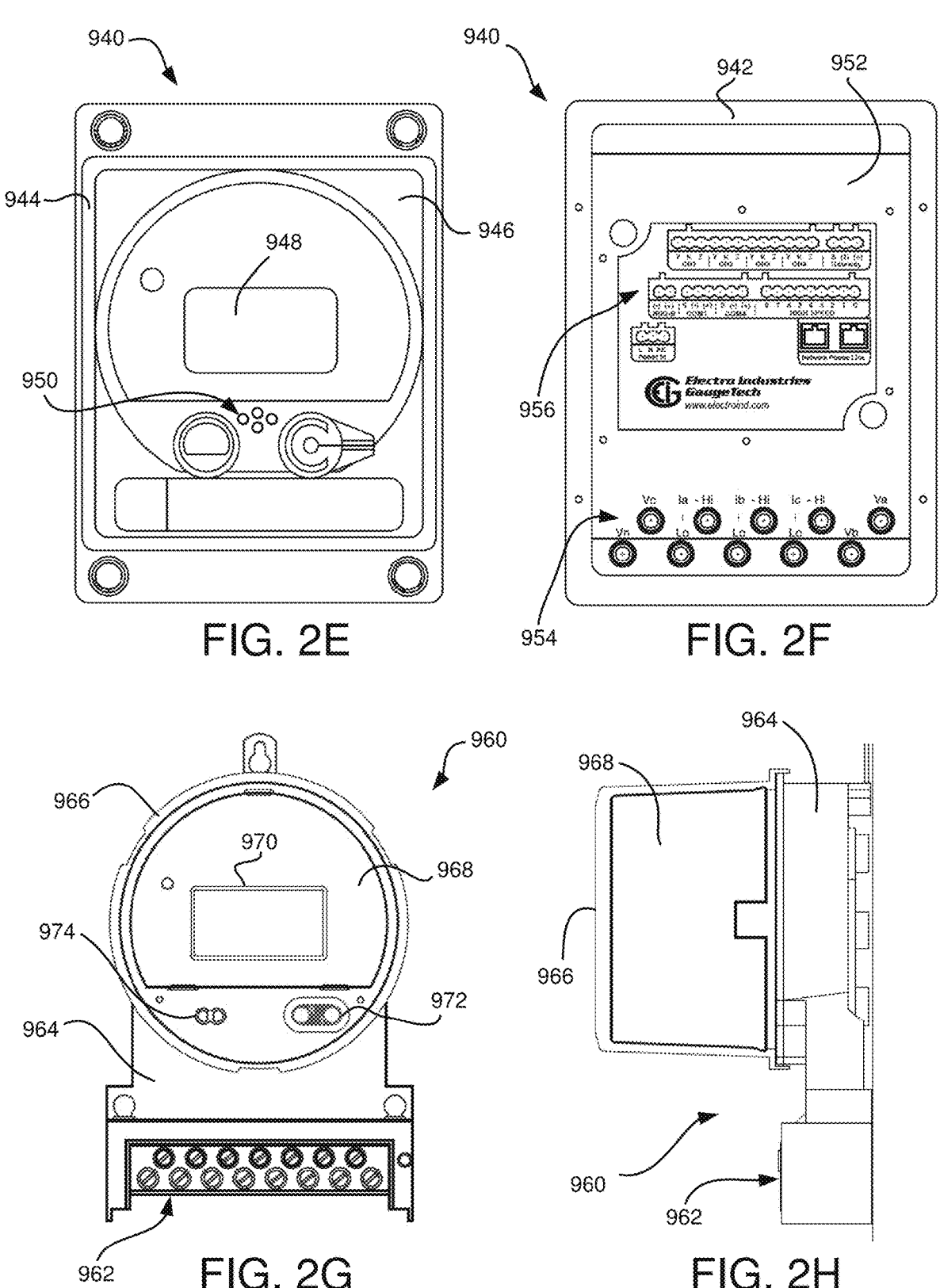

In a further embodiment, the IED 10 of FIG. 1 may be disposed in a switchboard or draw-out type housing 940 as shown in FIGS. 2E and 2F, where FIG. 2E is a front view and FIG. 2F is a rear view. The switchboard enclosure 942 usually features a cover 944 with a transparent face 946 to allow the meter display 948 to be read and the user interface 950 to be interacted with by the user. The cover 944 also has a sealing mechanism (not shown) to prevent unauthorized access to the meter. A rear surface 952 of the switchboard enclosure 942 provides connections for voltage and current inputs 954 and for various communication interfaces 956. Although not shown, the meter disposed in the switchboard enclosure 942 may be mounted on a draw-out chassis which is removable from the switchboard enclosure 942. The draw-out chassis interconnects the meter electronics with the electrical circuit. The draw-out chassis contains electrical connections which mate with matching connectors 954, 956 disposed on the rear surface 952 of the enclosure 942 when the chassis is slid into place.

In yet another embodiment, the IED 10 of FIG. 1 may be disposed in an A-base or type A housing as shown in FIGS. 2G and 2H. A-base meters 960 feature bottom connected terminals 962 on the bottom side of the meter housing 964. These terminals 962 are typically screw terminals for receiving the conductors of the electric circuit (not shown). A-base meters 960 further include a meter cover 966, meter body 968, a display 970 and input/output means 972. Further, the meter cover 966 includes an input/output interface 974. The cover 966 encloses the meter electronics 968 and the display 970. The cover 966 has a sealing mechanism (not shown) which prevents unauthorized tampering with the meter electronics.

It is to be appreciated that other housings and mounting schemes, e.g., circuit breaker mounted, are contemplated to be within the scope of the present disclosure.

Figure 3:
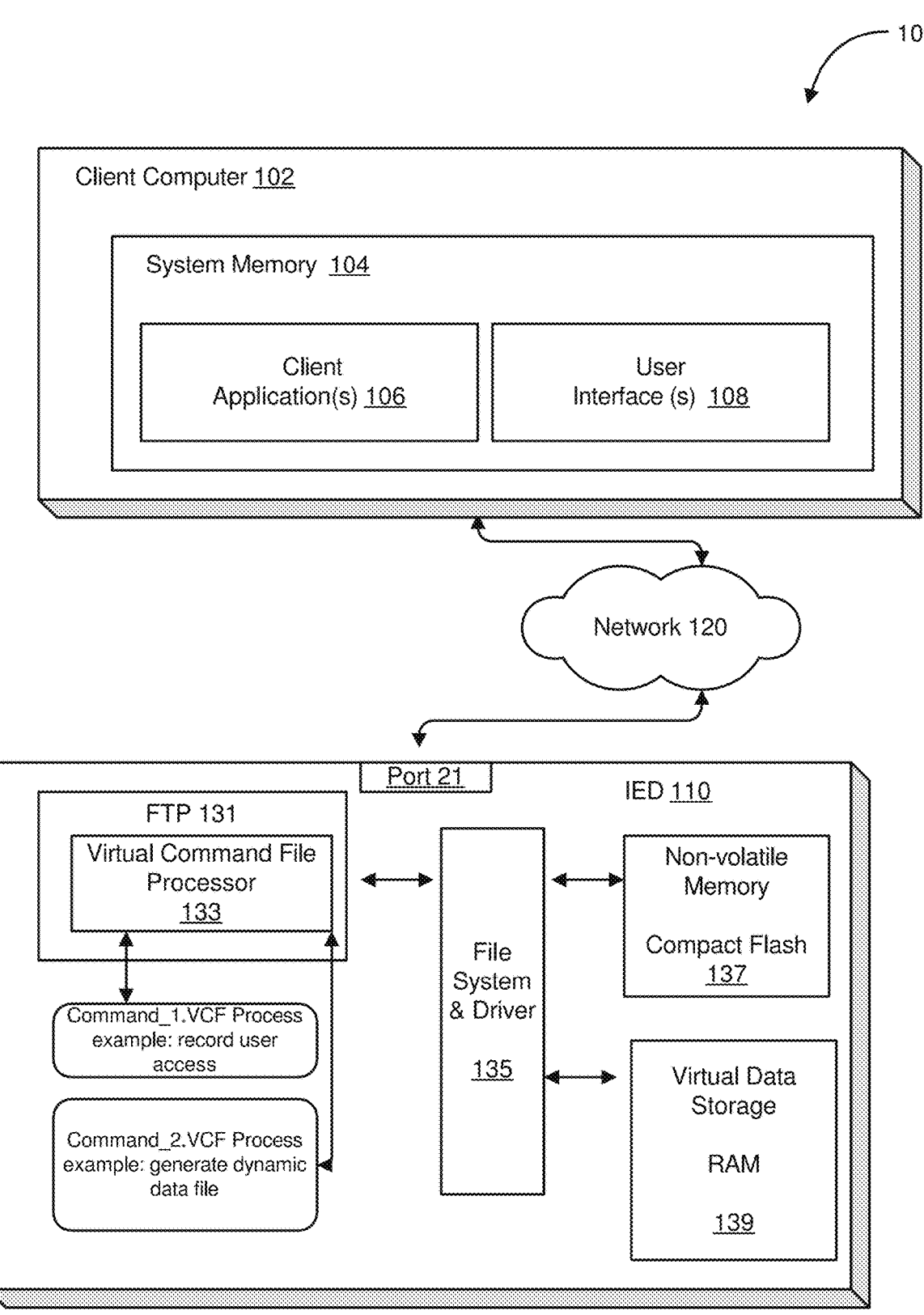
FIG. 3 illustrates an environment in which the present disclosure may be utilized.

FIG. 3 illustrates an exemplary environment 100 in which the present disclosure may be practiced. The network 120 may be the Internet, a public or private intranet, an extranet, wide area network (WAN), local area network (LAN) or any other network configuration to enable transfer of data and commands. An example network configuration uses the Transport Control Protocol/Internet Protocol ("TCP/IP") network protocol suite, however, other Internet Protocol based networks are contemplated by the present disclosure. Communications may also include IP tunneling protocols such as those that allow virtual private networks coupling multiple intranets or extranets together via the Internet. The network 120 may support existing or envisioned application protocols, such as, for example, telnet, POP3, Mime, HTTP, HTTPS, PPP, TCP/IP, SMTP, proprietary protocols, or any other network protocols. During operation, the IED 110 may communicate using the network 120 as will be hereinafter discussed.

It is to be appreciated that are at least two basic types of networks, based on the communication patterns between the machines: client/server networks and peer-to-peer networks. On a client/server network, every computer, device or IED has a distinct role: that of either a client or a server. A server is designed to share its resources among the client computers on the network. A dedicated server computer often has faster processors, more memory, and more storage space than a client because it might have to service dozens or even hundreds of users at the same time. High-performance servers typically use from two to eight processors (and that's not counting multi-core CPUs), have many gigabytes of memory installed, and have one or more server-optimized network interface cards (NICs), RAID (Redundant Array of Independent Drives) storage consisting of multiple drives, and redundant power supplies. Servers often run a special network OS-such as Windows Server, Linux, or UNIX—that is designed solely to facilitate the sharing of its resources. These resources can reside on a single server or on a group of servers. When more than one server is used, each server can "specialize" in a particular task (file server, print server, fax server, email server, and so on) or provide redundancy (duplicate servers) in case of server failure. For demanding computing tasks, several servers can act as a single unit through the use of parallel processing. A client device typically communicates only with servers, not with other clients. A client system may be a standard PC that is running an OS such as Windows. Current OSes contain client software that enables the client computers to access the resources that servers share. Older OSes, such as Windows 3.x and DOS, required add-on network client software to join a network. By contrast, on a peer-to-peer network, every computer or device is equal and can communicate with any other computer or device on the network to which it has been granted access rights. Essentially, every computer or device on a peer-to-peer network can function as both a server and a client; any computer or device on a peer-to-peer network is considered a server if it shares a printer, a folder, a drive, or some other resource with the rest of the network. Note that the actual networking hardware (interface cards, cables, and so on) is the same in client/server versus peer-to-peer networks, it is only the logical organization, management and control of the network that varies.

The PC client 102 may comprise any computing device, such as a server, mainframe, workstation, personal computer, hand held computer, laptop telephony device, network appliance, other IED, Programmable Logic Controller, Power Meter, Protective Relay etc. The PC client 102 includes system memory 104, which may be implemented in volatile and/or non-volatile devices. One or more client applications 106 which may execute in the system memory 104 is provided. Such client applications may include, for example, FTP client applications. File Transfer Protocol (FTP) is an application for transfer of files between computers attached to Transmission Control Protocol/Internet Protocol (TCP/IP) networks, including the Internet. FTP is a "client/server" application, such that a user runs a program on one computer system, the "client", which communicates with a program running on another computer system, the "server". Additionally, user interfaces 108 may be included for displaying system configuration, retrieved data and diagnostics associated with the IED 110.

The intelligent electronic device (IED) 110, in one embodiment, is comprised of at least an FTP Server 131 including a Virtual Command File Processor 133, a File System and Driver 135, a non-volatile memory 137 and a virtual data store 139. Of course, the IED 110 may contain other hardware/software for performing functions associated with the IED, however, these functions are not relevant to the present application and will therefore not be further discussed.

IED 110 runs the FTP Server 131 as an independent process in the operating system, allowing it to function independently of the other running processes. Additionally, it allows for multiple connections, using the port/socket architecture of TCP/IP.

By running the FTP Server 131 as an independent process, this means that other systems, such as a Modbus TCP handler, can run on IED 110 concurrently with the FTP Server 131. This also means that multiple FTP connections can be made with the only limitation being the system's available resources.

The FTP Server 131 provides access to the file system 135 of the IED 110 on the standard FTP port (port 21). When a connection is made, PC client 102 sends a FTP logon sequence, which includes a USER command and a PASS command. The PC client 102 then interacts with the IED 110, requesting information and writing files, ending in a logout.

The FTP Server 131 uses two ports for all actions. The first port 21, is a clear ASCII telnet channel, and is called the command channel. The second port, which can have a different port number in different applications, is initiated whenever it is necessary to transfer data in clear binary, and is called the data channel.

The virtual data store 139 is an ideal storage medium for files that are written to very frequently, such as, for example, status information, diagnostics, and virtual command files. In contrast to these types of files are files which require more long term storage, such as, for example, Logs, settings, and configuration, a more suitable to be stored using a compact flash drive.

The File Transfer Protocol (FTP) (Port 21) is a network protocol used to transfer data from one computer to another through a network, such as over the Internet. FTP is a commonly used protocol for exchanging files over any TCP/IP based network to manipulate files on another computer on that network regardless of which operating systems are involved (if the computers permit FTP access). There are many existing FTP client and server programs. FTP servers can be set up anywhere between game servers, voice servers, internet hosts, and other physical servers.

FTP runs exclusively over TCP. FTP servers by default listen on port 21 for incoming connections from FTP clients. A connection to this port from the FTP Client forms the control stream on which commands are passed to the FTP server from the FTP client and on occasion from the FTP server to the FTP client. FTP uses out-of-band control, which means it uses a separate connection for control and data. Thus, for the actual file transfer to take place, a different connection is required which is called the data stream. Depending on the transfer mode, the process of setting up the data stream is different.

In active mode, the FTP client opens a dynamic port (49152-65535), sends the FTP server the dynamic port number on which it is listening over the control stream and waits for a connection from the FTP server. When the FTP server initiates the data connection to the FTP client it binds the source port to port 20 on the FTP server.

To use active mode, the client sends a PORT command, with the IP and port as argument. The format for the IP and port is "h1,h2,h3,h4,p1,p2". Each field is a decimal representation of 8 bits of the host IP, followed by the chosen data port. For example, a client with an IP of 192.168.0.1, listening on port 49154 for the data connection will send the command "PORT 192,168,0,1,192,2". The port fields should be interpreted as $p1 \times 256 + p2 =$ port, or, in this example, $192 \times 256 + 2 = 49154$.

In passive mode, the FTP server opens a dynamic port (49152-65535), sends the FTP client the servers IP address to connect to and the port on which it is listening (a 16 bit value broken into a high and low byte, like explained before) over the control stream and waits for a connection from the FTP client. In this case the FTP client binds the source port of the connection to a dynamic port between 49152 and 65535.

To use passive mode, the client sends the PASV command to which the server would reply with something similar to "227 Entering Passive Mode (127,0,0,1,192,52)". The syntax of the IP address and port are the same as for the argument to the PORT command.

In extended passive mode, the FTP server operates exactly the same as passive mode, however it only transmits the port number (not broken into high and low bytes) and the client is to assume that it connects to the same IP address that was originally connected to.

The objectives of FTP are to promote sharing of files (computer programs and/or data), to encourage indirect or implicit use of remote computers, to shield a user from variations in file storage systems among different hosts and to transfer data reliably, and efficiently.

In one embodiment of the present disclosure, the IED 110 has the ability to provide an external PC client 102 with an improved data transfer rate when making data download requests of data stored within an IED. This is achieved by configuring the IED 110 to include an FTP server 131 including a Virtual Command File Processor 133. An improved data transfer rate from the IED 110 may be realized by the external PC client 102 issuing virtual commands to the IED 110. In response, the IED 110 processes the received virtual commands in the Virtual Command File processor 133 to construct FTP commands therefrom to be applied to a novel file system 135 of the IED 110, coupled to the FTP server 131, wherein the novel file system 135 is configured as a PC file structure amenable to receiving and responding to the constructed FTP commands. The Virtual command files and the novel file system 135 are discussed in greater detail in co-pending application Ser. No. 12/061, 979.

While FTP file transfer comprises one embodiment for encapsulating files to improve a data transfer rate from an IED to external PC clients, the present disclosure contemplates the use of other file transfer protocols, such as the Ethernet protocol such as HTTP or TCP/IP for example. Of course, other Ethernet protocols are contemplated for use by the present disclosure. For example, for the purpose of security and firewall access, it may be preferable to utilize HTTP file encapsulation as opposed to sending the data via FTP. In other embodiments, data can be attached as an email and sent via SMTP, for example. Such a system is described in a co-owned U.S. Pat. No. 6,751,563, titled "Electronic Energy meter", the contents of which are incorporated herein by reference. In the U.S. Pat. No. 6,751,563, at least one processor of the IED or meter is configured to collect the at least one parameter and generate data from the sampled at least one parameter, wherein the at least one processor is configured to act as a server for the IED or meter and is further configured for presenting the collected and generated data in the form of web pages.

Figure 4:
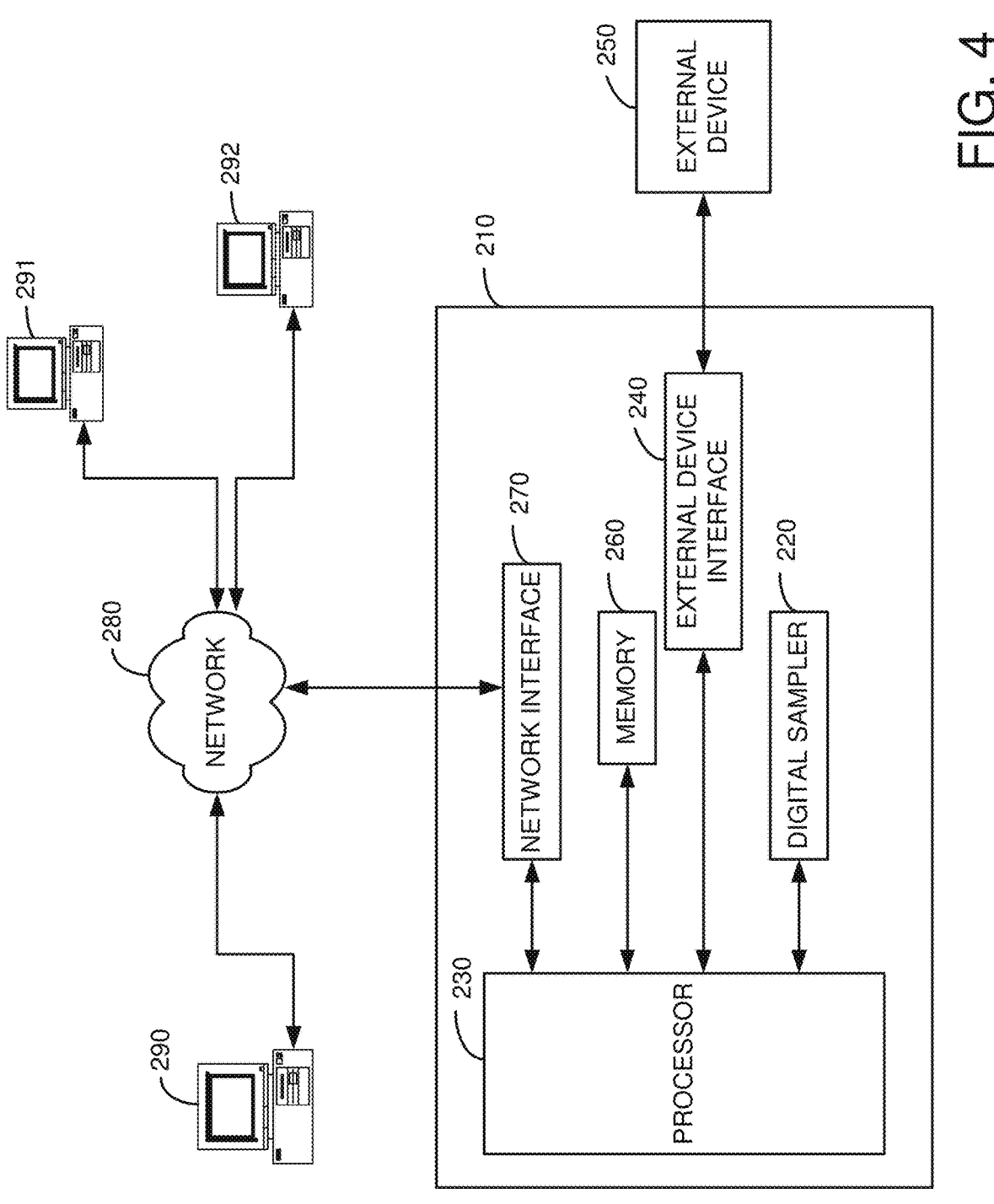
FIG. 4 is a block diagram of a web server power quality and revenue meter, according to an embodiment of the present disclosure.

Portions of U.S. Pat. No. 6,751,563 will be reproduced here. FIG. 4 is a block diagram of a web server power quality and revenue meter 210. The meter is connected to monitor electric distribution power lines (not shown), to monitor voltage and current at the point of connection. Included therein is digital sampler 220 for digitally sampling the voltage and current of the power being supplied to a customer or monitored at the point of the series connection in the power grid. Digital sampler 220 digitally samples the voltage and current and performs substantially similar to the A/D converters 14 described above in relation to FIG. 1. The digital samples are then forwarded to processor 230 for processing. It is to be appreciated that the processor may be a single processing unit or a processing assembly including at least one CPU 50, DSP1 60, DSP2 70 and FPGA 80, or any combination thereof. Also connected to processor 230 is external device interface 240 for providing an interface for external devices 250 to connect to meter 210. These external devices might include other power meters, sub-station control circuitry, on/off switches, etc. Processor 230 receives data packets from digital sampler 220 and external devices 250, and processes the data packets according to user defined or predefined requirements. A memory 260 is connected to processor 230 for storing data packets and program algorithms or functions, and to assist in processing functions of processor 230. These processing functions include the power quality data and revenue calculations, as well as formatting data into different protocols which will be described later in detail. Processor 130 provides processed data to network 280 through network interface 270. Network 280 can be the Internet, the World Wide Web (WWW), an intranet, a wide area network (WAN), or local area network (LAN), among others. In one embodiment, the network interface converts the data to an Ethernet TCP/IP format. The use of the Ethernet TCP/IP format allows multiple users to access the power meter simultaneously. In a like fashion, network interface 270 might be comprised of a modem, cable connection, or other devices that provide formatting functions. Computers 290-292 are shown connected to network 280.

A web server program (web server) is contained in memory 260, and accessed through network interface 270. The web server provides real time data through any known web server interface format. For example, popular web server interface formats consist of HTML and XML (Extensible Markup Language) formats. The actual format of the programming language used is not essential to the present disclosure, in that any web server format can be incorporated herein. The web server provides a user friendly interface for the user to interact with the meter 210. The user can have various access levels to enter limits for e-mail alarms. Additionally, the user can be provided the data in a multiple of formats including raw data, bar graph, charts, etc. The currently used HTML or XML programming languages provide for easy programming and user friendly user interfaces.

The processor 230 formats the processed data into various network protocols and formats. The protocols and formats can, for example, consist of the web server HTML or XML formats, Modbus TCP, RS-485, FTP or e-mail. Dynamic Host Configuration Protocol (DHCP) can also be used to assign IP addresses. The network formatted data is now available to users at computers 290-292 through network 280, that connects to meter 210 at the network interface 270. In one embodiment, network interface 270 is an Ethernet interface that supports, for example, 100 base-T or 10 base-T communications. This type of network interface can send and receive data packets between WAN connections and/or LAN connections and the meter 210. This type of network interface allows for situations, for example, where the web server may be accessed by one user while another user is communicating via the Modbus TCP, and a third user may be downloading a stored data file via FTP. The ability to provide access to the meter by multiple users, simultaneously, is a great advantage over the prior art. This can allow for a utility company's customer service personnel, a customer and maintenance personnel to simultaneously and interactively monitor and diagnose possible problems with the power service.

Figure 5:
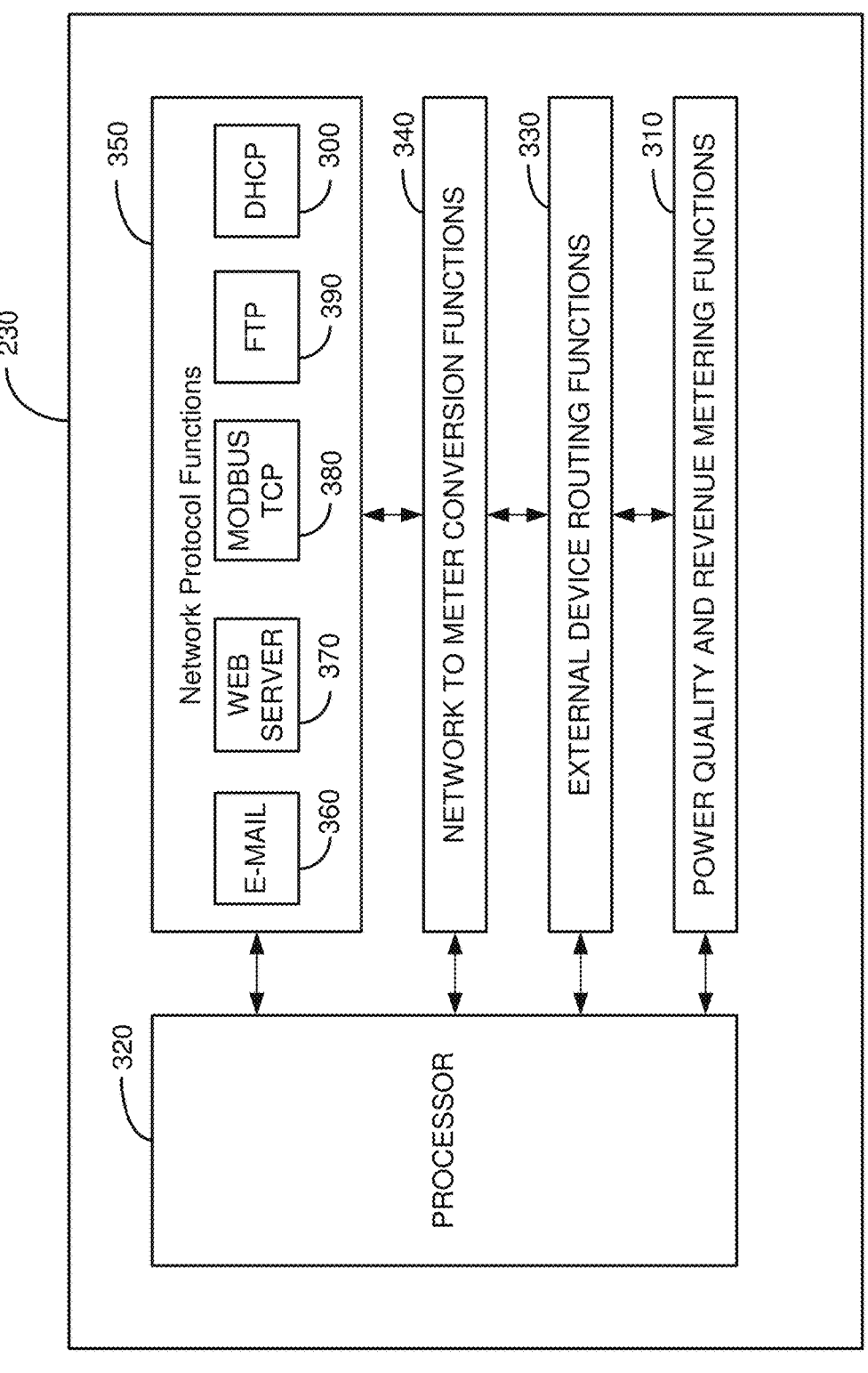
FIG. 5 is a functional block diagram of the processor of the web server power quality and revenue meter system shown in FIG. 4, according to the embodiment of the present disclosure.

FIG. 5 is a functional block diagram of processor 230 of the web server power quality and revenue meter system according to the embodiment of the present disclosure. Processor 230 is shown containing four main processing functions. The functions shown are illustrative and not meant to be inclusive of all possible functions performed by processor 230. Power Quality and Revenue Metering functions (metering functions) 310 consists of a complete set of functions which are needed for power quality and revenue metering. Packet data collected by digital sampler 220 is transmitted to processor 230. Processor 230 calculates, for example, power reactive power, apparent power, and power factor. The metering function 310 responds to commands via the network or other interfaces supported by the meter. External Device Routing Functions 330 handle the interfacing between the external device 250 and meter 210. Raw data from external device 250 is fed into meter 210. The external device 250 is assigned a particular address. If more than one external device is connected to meter 210, each device will be assigned a unique particular address. The Network Protocol Functions 350 of meter 210 are executed by processor 230 which executes multiple networking tasks that are running concurrently. As shown in FIG. 5, these include, but are not limited to, the following network tasks included in network protocol functions 350: e-mail 360, web server 370, Modbus TCP 380, FTP 390, and DHCP 300. The e-mail 360 network protocol function can be utilized to send e-mail messages via the network 280 to a user to, for example, notify the user of an emergency situation or if the power consumption reaches a user-set or pre-set high level threshold. As the processor receives packets of data it identifies the network processing necessary for the packet by the port number associated with the packet. The processor allocates the packet to a task as a function of the port number. Since each task is running independently the meter 210 can accept different types of requests concurrently and process them transparently from each other. For example, the web server may be accessed by one user while another user is communicating via Modbus TCP and at the same time a third user may download a log file via FTP. The Network to Meter Protocol Conversion Function 340 is used to format and protocol convert the different network protocol messages to a common format understood by the other functional sections of meter 210. After the basic network processing of the packet of data, any "commands" or data which are to be passed to other functional sections of meter 210 are formatted and protocol converted to a common format for processing by the Network to Meter Protocol Conversion Function 340. Similarly, commands or data coming from the meter for transfer over the network are pre-processed by this function into the proper format before being sent to the appropriate network task for transmission over the network. In addition this function first protocol converts and then routes data and commands between the meter and external devices.

Although the above described embodiments enable users outside of the network the IED or meter is residing on to access the internal memory or server of the IED or meter, IT departments commonly block this access through a firewall to avoid access by dangerous threats into corporate networks. A firewall is a system designed to prevent unauthorized access to or from a private network, e.g., an internal network of a building, a corporate network, etc. Firewalls can be implemented in both hardware and software, or a combination of both. Firewalls are frequently used to prevent unauthorized Internet users from accessing private networks connected to the Internet, especially intranets. All messages entering or leaving the intranet pass through the firewall, which examines each message and blocks those that do not meet the specified security criteria. A firewall may employ one or more of the following techniques to control the flow of traffic in and of the network it is protecting: 1) packet filtering: looks at each packet entering or leaving the network and accepts or rejects it based on user-defined rules; 2) Application gateway: applies security mechanisms to specific applications, such as FTP and Telnet servers; 3) Circuit-level gateway: applies security mechanisms when a TCP or UDP connection is established, once the connection has been made, packets can flow between the hosts without further checking; 4) Proxy server: intercepts all messages entering and leaving the network, effectively hides the true network addresses; and 5) Stateful inspection: doesn't examine the contents of each packet but instead compares certain key parts of the packet to a database of trusted information, if the comparison yields a reasonable match, the information is allowed through, otherwise it is discarded. Other techniques and to be developed techniques are contemplated to be within the scope of the present disclosure.

In one embodiment, the present disclosure provides for overcoming the problem of not being allowed firewall access to an IED or meter installed within a facility, i.e., the meter is residing on a private network, by enabling an IED to initiate one way communication through the firewall. In this embodiment, the IED or meter posts the monitored and generated data on an Internet site, e.g., hosted on a server or the Meter Data Cloud, external to the corporate or private network, i.e., on the other side of a firewall. The benefit is that any user would be able to view the data on any computer or web enabled smart device without having to pierce or bypass the firewall. Additionally, there is a business opportunity to host this data on a web server and charge a user a monthly fee for hosting the data. The features of this embodiment can be incorporated into any telemetry application including vending, energy metering, telephone systems, medical devices and any application that requires remotely collecting data and posting it on to a public Internet web site.

Figure 6:
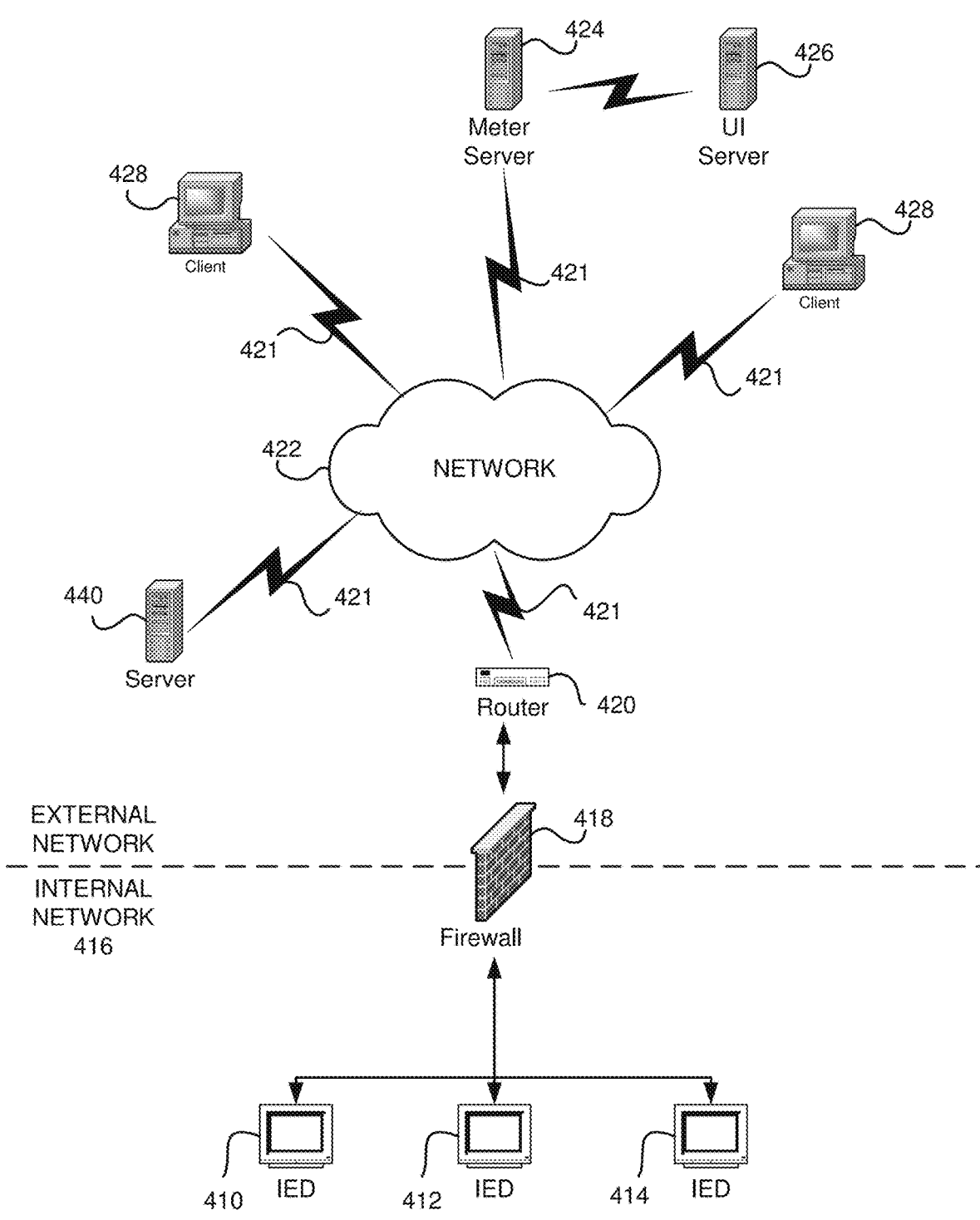
FIG. 6 illustrates another environment in which the present disclosure may be utilized.

In one embodiment, the IED or metering device will communicate through the firewall using a protocol such as HTTP via a port that is open through the firewall. Referring to FIG. 6, IEDs or meters 410, 412 414 reside on an internal network 416, e.g., an intranet, private network, corporate network, etc. The internal network 416 is coupled to an external network 422, e.g., the Internet, via a router 420 or similar device over any known hardwire or wireless connection 421. A firewall 418 is disposed between the internal network 416 and external network 422 to prevent unauthorized access from outside the internal network 416 to the IEDs or meters 410, 412, 414. Although the firewall 418 is shown between the internal network 416 and the router 420 it is to be appreciated that other configurations are possible, for example, the firewall 418 being disposed between the router 420 and external network 422. In other embodiments, the firewall 418 and router 420 may be configured as a single device. In another embodiment, a firewall 418 may be located between network 422 and server 424. It is further to be appreciated that firewall 418 can be implemented in both hardware and software, or a combination of both.

The communication device or network interface of the meter (as described above in relation to FIG. 1) will communicate through the firewall 418 and read a web site server 424. It is to be appreciated that the one way communication from the IED through the firewall may be enabled by various techniques, for example, by enabling outbound traffic to the IP address or domain name of the server 424 or by using a protocol that has been configured, via the firewall settings, to pass through the firewall such as HTTP (Hyper Text Transfer Protocol), IP (Internet Protocol), TCP (Transmission Control Protocol), FTP (File Transfer Protocol), UDP (User Datagram Protocol), ICMP (Internet Control Message Protocol), SMTP (Simple Mail Transport Protocol), SNMP (Simple Network Management Protocol), Telnet, etc. Alternatively, the IED may have exclusive access to a particular port on the firewall, which is unknown to other users on either the internal or external network. Other methods or techniques are contemplated, for example, e-mail, HTTP tunneling, SNTP trap, MSN, messenger, IRQ, Twitter™, Bulletin Board System (BBS), forums, Universal Plug and Play (UPnP), User Datagram Protocol (UDP) broadcast, UDP unicast, Virtual Private Networks (VPN), etc.

The server 424 will provide instructions in computer and/or human readable format to the IED or meter. For instance, the web server 424 might have XML tags that state in computer readable format to provide data for the last hour on energy consumption by 15 minute intervals. The meter 410, 412, 414 will then read those instructions on that web server 424 and then post that data up on the server 424. In this manner, the IED or meter initiates communication in one direction, e.g., an outbound direction, to the server 424.

Another server (or can be in one server) will read the data that the meter 410, 412, 414 posts and will format the meter data into data that can be viewed for humans on a web site or a software application, i.e., UI Server 426. Servers 424, 426 can also store the data in a database or perform or execute various control commands on the data. Clients 428 may access the IED data stored or posted on servers 424, 426 via a connection to the network 422.

Since the meters are only communicating in an outbound direction only, the meters 410, 412, 414 can read data or instructions from an external network application (e.g., server 424), the external network application cannot request information directly from the meter. The server 424 posts the data or instructions on the web site and waits for the meter to check the site to see if there has been a new post, i.e., new instructions for the meter. The meter can be programmed at the user's discretion as to frequency for which the meter 410, 412, 414 exits out to the external network to view the postings.

The meter instruction server 424 will post instructions in a directory programmed/located on the server or into XML or in any fashion that the meter is configured to understand and then the meter will post whatever data it is instructed to do. The meter can also be configured to accomplish control commands. In addition to the meter instruction server 424, a user interface (UI) server 426 is provided that can be used to enable a user interface to the user. The user can provide input on the UI server 426 that might trigger the meter instruction server 424 to produce a message to control the energy next time the meter reads that server.

Figure 7:
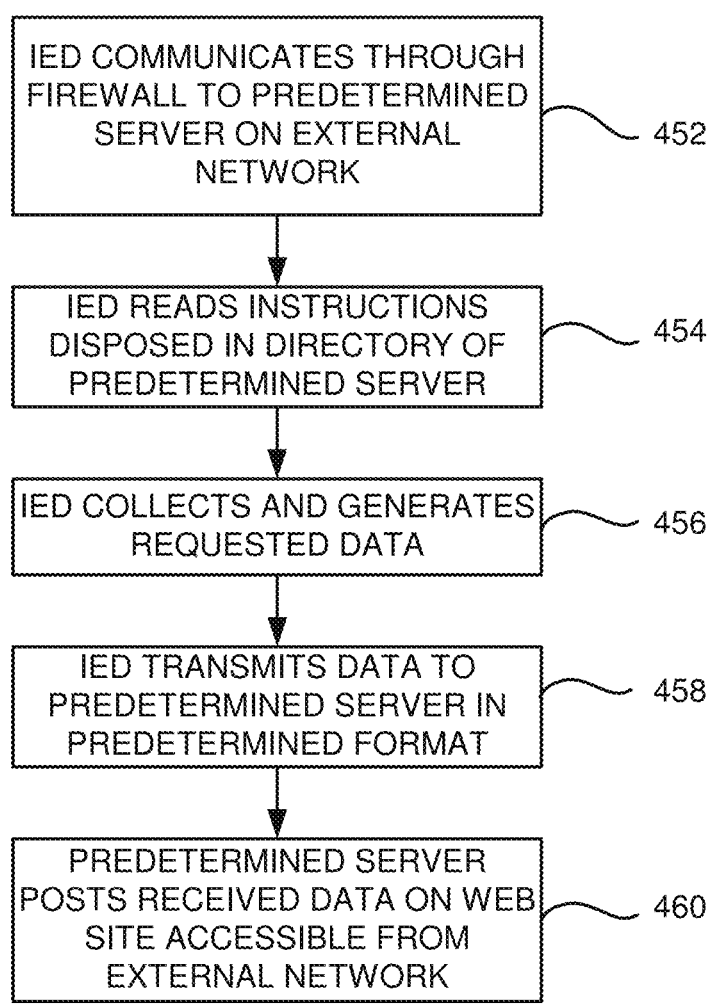
FIG. 7 is a flow chart illustrating a method for communicating data from an IED on an internal network to a server on an external network through a firewall.

Referring to FIG. 7, a method for communicating data from an IED on an internal network to a server on an external network through a firewall is illustrated. In step 452, the IED 410 communicates through the firewall 418 to a predetermined server 424 on an external network 422. The IED 410 may be programmed to periodically communicate to the server at predefined intervals. During this communication session, the IED 410 reads instructions disposed in a directory or folder on the predetermined server 424, step 454. Next, in step 456, the IED 410 collects data from its internal memory or generates data based on the read instructions. The IED 410 then transmits the data to the server 424 in a predetermined format, e.g., XML, CSV, etc., step 458. In step 460, the predetermined server 424 posts the received data on a web site accessible from the external network 422. The data may be posted on the server 424 or a UI (user interface) server 426 configured to provided data for end users, e.g., clients 428. It is to be appreciated that the UI server 426 may be configured to post data from several locations in one convenient interface for, for example, an organization managing the several locations. A provider of the servers 424, 426 may charge a fee to the end user for the hosting of the web site and providing the data in a convenient and accessible format.

Figure 8:
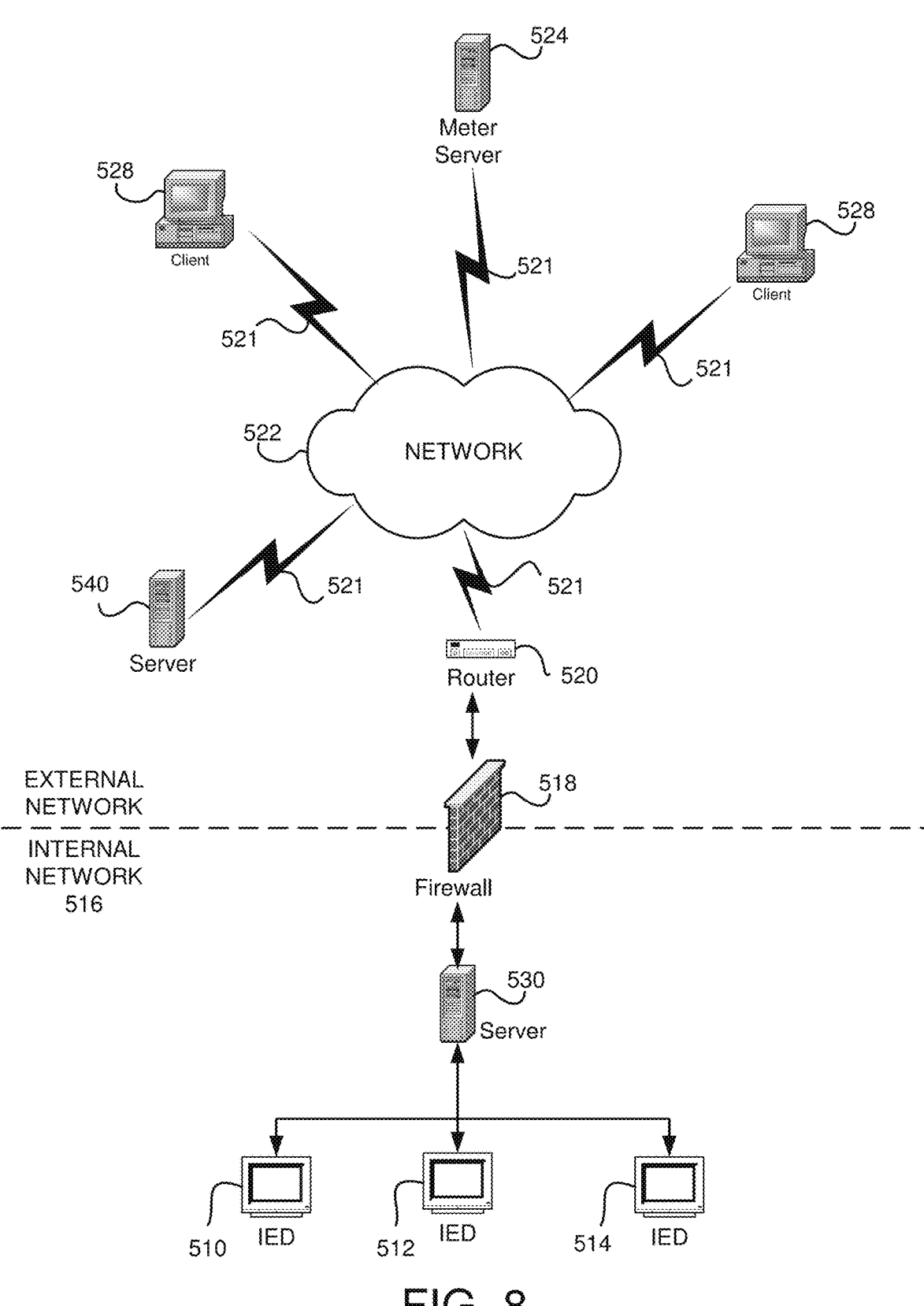
FIG. 8 illustrates yet another environment in which the present disclosure may be utilized.

In another embodiment, the IED or metering device will communicate through the firewall using a server 530 disposed on an internal network protected by a firewall. Referring to FIG. 8, IEDs or meters 510, 512 514 reside on an internal network 516, e.g., an intranet, private network, corporate network, etc. The internal network 516 is coupled to an external network 522, e.g., the Internet, via a router 520 or similar device over any known hardwire or wireless connection 521. A firewall 518 is disposed between the internal network 516 and external network 522 to prevent unauthorized access from outside the internal network 516 to the IEDs or meters 510, 512, 514. Although the firewall 518 is shown between the internal network 516 and the router 520 it is to be appreciated that other configurations are possible, for example, the firewall 518 being disposed between the router 520 and external network 522. In other embodiments, the firewall 518 and router 520 may be configured as a single device. In another embodiment, a firewall 418 may be located between network 422 and server 424. It is further to be appreciated that firewall 518 can be implemented in both hardware and software, or a combination of both.

In this embodiment, server 530 aggregates data from the various IEDs 510, 512, 514 coupled to the internal or private network 516. Since the server 530 and the IEDs 510, 512, 514 are all on the same side of the firewall 518, generally communications and data transfers among the server 530 and the IEDs 510, 512, 514 is unrestricted. Server 530 then communicates or transfers the data from the IEDs to server 524 on the external network on the other side of the firewall 518. The communication between server 530 and 524 may be accomplished by any one of the communication means or protocols described in the present disclosure. The server 524 then posts the data from the IEDs 510, 512, 514 making the data accessible to clients 528 on external networks, as described above.

Figure 9:
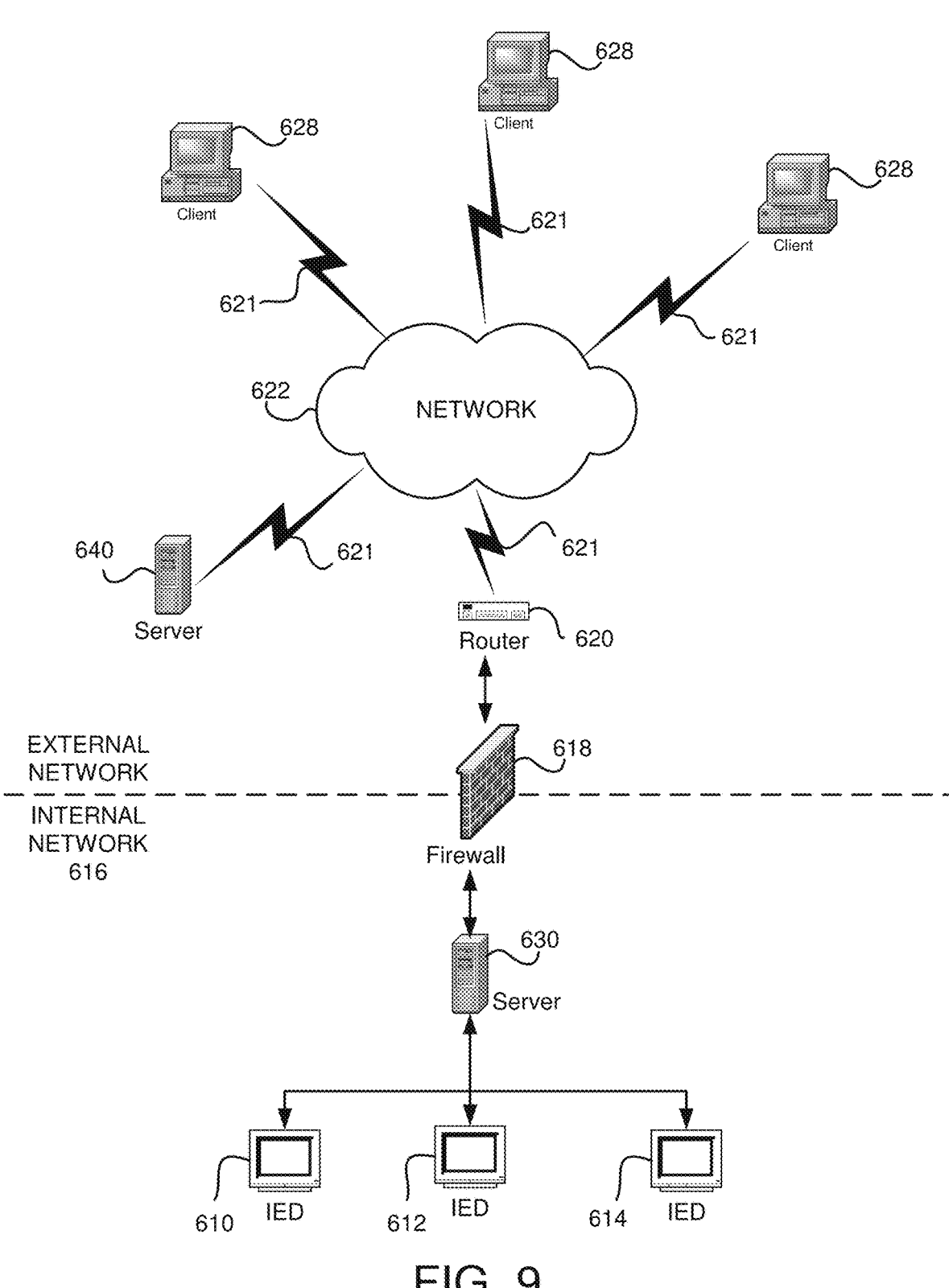
FIG. 9 illustrates a further environment in which the present disclosure may be utilized.

In a further embodiment, the IED or metering device will communicate through the firewall using a server 630 disposed on an internal network protected by a firewall. Referring to FIG. 9, IEDs or meters 610, 612 614 reside on an internal network 616, e.g., an intranet, private network, corporate network, etc. The internal network 616 is coupled to an external network 622, e.g., the Internet, via a router 620 or similar device over any known hardwire or wireless connection 621. A firewall 618 is disposed between the internal network 516 and external network 622 to prevent unauthorized access from outside the internal network 616 to the IEDs or meters 610, 612, 614. Although the firewall 618 is shown between the internal network 616 and the router 620 it is to be appreciated that other configurations are possible, for example, the firewall 618 being disposed between the router 620 and external network 622. In other embodiments, the firewall 618 and router 620 may be configured as a single device. In another embodiment, a firewall 418 may be located between network 422 and server 424. It is further to be appreciated that firewall 618 can be implemented in both hardware and software, or a combination of both.

In this embodiment, server 630 aggregates data from the various IEDs 610, 612, 614 coupled to the internal or private network 616. Since the server 630 and the IEDs 610, 612, 614 are all on the same side of the firewall 618, generally communications and data transfers among the server 630 and the IEDs 610, 612, 614 is unrestricted. Server 630 then communicates or transfers the data from the IEDs to clients 628 on the external network on the other side of the firewall 618. The communication between server 630 and clients 628 may be accomplished by any one of the communication means or protocols described in the present disclosure.

In another embodiment, each IED 610, 612, 614 may be configured to act as a server to perform the functionality described above obviating the need for server 630.

Furthermore, in another embodiment, each IED 610, 612, 614 and each client device 628 may be configured as a server to create a peer-to-peer network, token ring or a combination of any such topology.

The systems and methods of the present disclosure may utilize one or more protocols and/or communication techniques including, but not limited to, e-mail, File Transfer Protocol (FTP), HTTP tunneling, SNTP trap, MSN, messenger, IRO, Twitter™, Bulletin Board System (BBS), forums, Universal Plug and Play (UPnP), User Datagram Protocol (UDP) broadcast, UDP unicast, Virtual Private Networks (VPN), etc.

In one non-limiting embodiment, each IED sends data to a recipient via electronic mail, also known as email or e-mail. An Internet email message consists of three components, the message envelope, the message header, and the message body. The message header contains control information, including, minimally, an originator's email address and one or more recipient addresses. Usually descriptive information is also added, such as a subject header field and a message submission date/time stamp. Network-based email was initially exchanged on the ARPANET in extensions to the File Transfer Protocol (FTP), but is now carried by the Simple Mail Transfer Protocol (SMTP), first published as Internet standard 10 (RFC 821) in 1982. In the process of transporting email messages between systems, SMTP communicates delivery parameters using a message envelope separate from the message (header and body) itself. Messages are exchanged between hosts using the Simple Mail Transfer Protocol with software programs called mail transfer agents (MTAs); and delivered to a mail store by programs called mail delivery agents (MDAs, also sometimes called local delivery agents, LDAs). Users can retrieve their messages from servers using standard protocols such as POP or IMAP, or, as is more likely in a large corporate environment, with a proprietary protocol specific to Novell Groupwise, Lotus Notes or Microsoft Exchange Servers. Webmail interfaces allow users to access their mail with any standard web browser, from any computer, rather than relying on an email client. Programs used by users for retrieving, reading, and managing email are called mail user agents (MUAs). Mail can be stored on the client, on the server side, or in both places. Standard formats for mailboxes include Maildir and mbox. Several prominent email clients use their own proprietary format and require conversion software to transfer email between them. Server-side storage is often in a proprietary format but since access is through a standard protocol such as IMAP, moving email from one server to another can be done with any MUA supporting the protocol.

In one embodiment, the IED composes a message using a mail user agent (MUA). The IED enters the email address of a recipient and sends the message. The MUA formats the message in email format and uses the Submission Protocol (a profile of the Simple Mail Transfer Protocol (SMTP), see RFC 6409) to send the message to the local mail submission agent (MSA), for example, run by the IED's internet service provider (ISP). The MSA looks at the destination address provided in the SMTP protocol (not from the message header). An Internet email address is a string of the form recipient@meter. The part before the @ sign is the local part of the address, often the username of the recipient, and the part after the @ sign is a domain name or a fully qualified domain name. The MSA resolves a domain name to determine the fully qualified domain name of the mail exchange server in the Domain Name System (DNS). The DNS server for the domain responds with any MX records listing the mail exchange servers for that domain, for example, a message transfer agent (MTA) server run by the recipient's ISP. The MSA sends the message to MTA using SMTP. This server may need to forward the message to other MTAs before the message reaches the final message delivery agent (MDA). The MDA delivers it to the mailbox of the recipient.

The recipient retrieves the message using either the Post Office Protocol (POP3) or the Internet Message Access Protocol (IMAP4).

Other types of e-mail systems may also be employed, for example, web-based email, POP3 (Post Office Protocol 3) email services, IMAP (Internet Message Protocol) e-mail servers, and MAPI (Messaging Application Programming Interface) email servers to name a few.

In a further embodiment, File Transfer Protocol (FTP) may be employed. Techniques for transferring data from an IED to a device is described in commonly owned pending U.S. patent application Ser. No. 12/061,979, the contents of which are incorporated by reference.

In one embodiment, IEDs employ Universal Plug and Play (UPnP) protocol, which is a set of networking protocols that permits networked devices to discover each others presence, and notify clients of services available on these devices. UPnP takes the form of UDP broadcast messages, which are sent across a local network, to notify other devices of available services, and http requests to query the details of those devices and services.

In one embodiment, UPnP is employed to allow the network addresses of devices, such as meters, to automatically be discovered by a client. This enables the client software to display a list of all devices which are available. In addition, this could also allow the client software to enable the user to connect to these devices, without having to configure the network address of that device. In addition, the UPnP notify may be used to indicate the health status of the device, including starting up, running, errors in configuration, and resetting.

In another embodiment, UPnP is employed to allow devices, such as meters, to notify the clients of what services they support, such as modbus, Distributed Network Protocol (DNP), web, FTP, log download, and data streaming. This could be extended by including information particular to that service or protocol, such as to allow the client to interface with that service with no user input. This could enable the client software to display the device such that the user can focus on the details of the device, rather then worrying about the minutiae of connection information.

In another embodiment, an automated server is configured to perform actions related to these automatically discovered services, such as retrieving real time information, downloading logs, or registering for notification of events. For example, as shown in FIG. 8, a server 530 could be on a network 516 to collect log information from meters 510, 512, 514, and whenever a meter broadcast that it provided log data, the server 530 could automatically collect that data from the meter. As another example, the server 530 could automatically poll and log the realtime readings of all meters on the network, automatically including them as they become available on the network. As described above, the server 530 may then post the data to server 524.

In one embodiment, HTTP tunneling is employed to send a message (including the IED's or meters data) to a server, which listens for such messages, and parses out the IED's or meter's data. This could be performed by embedding the meter's data in a HTTP message, which could be sent to the server, for example, server 424 as shown in FIG. 6. The HTTP wrapper would allow this data to pass through firewalls which only allow web traffic. For example, in the architecture of FIG. 6, IED 410 may send a HTTP message containing measured or calculated data through firewall 418 to server 424 or server 430. In another example as shown in FIG. 8, server 530 may collect data from the various IEDs 510, 512, 514 and forward the collected data in a HTTP message through firewall 518 to server 524.

It is to be appreciated that HTTP tunneling applies to system architectures where a server is provided as the receiver of the IED or meter data, as the clients would be unable to process such information. Referring to FIG. 9, server 630 is the destination (and collects) the messages generated from the various IEDs 610, 612, 614, but device 628 is a client, and without server software, would be unable to receive the messages. However, by programming device 628 with server software, the client device 628 becomes a server and can receive the messages.

It is further to be appreciated that the HTTP message can be sent based on various triggers including, but not limited to, time-based trigger, event-based trigger, storage capacity-based trigger, etc.

In another embodiment, the IEDs can communicate through to devices using a Simple Network Management Protocol (SNMP) trap. SNMP traps enable an agent, e.g., an agent running on an IED, to notify a management station, e.g., a server, of significant events by way of an unsolicited SNMP message. Upon occurrence of an event, an agent that sends an unsolicited or asynchronous trap to the network management system (NMS), also known as a manager. After the manager receives the event, the manager displays it and can choose to take an action based on the event. For instance, the manager can poll the agent or IED directly, or poll other associated device agents to get a better understanding of the event. For the management system to understand a trap sent to it by an agent, the management system must know what the object identifier (OID) of the trap or message defines. Therefore, the management system or server must have the Management Information Base (MIB) for that trap loaded. This provides the correct OID information so that the network management system can understand the traps sent to it. Additionally, a device does not send a trap to a network management system unless it is configured to do so. A device must know that it should send a trap. The trap destination is usually defined by an IP address, but can be a host name, if the device is set up to query a Domain Name System (DNS) server.

Common chat protocols, such as MSN, AIM, IRO, IRC, and Skype, could be used to send a message, containing the meters data, to a public chat server, e.g., server 440, 540, 640, which could then route that message to any desired client and/or server, e.g., servers 424, 524. Another possible implementation could be to have a special client that listens for these messages, parses the data contents, and presents them in another manner. In one embodiment, the messages are proprietary format Ethernet messages, typically sent over TCP. It is to be appreciated that the actual format depends on the specific chat protocol.

A public social server that supports a common web interface for posting information, such as Twitter™, Facebook™, BBS's, could be used to post a status, containing the meter's data, to a user on the public social server for that service, e.g., server 440, 540, 640. This post could then be viewed by the clients to see the meters data, read by another server for further parsing and presentation or sent to servers 424, 524. The data could be formatted as human readable text (e.g., "The voltage is 120.2v"), as machine parsable text (e.g., "voltage.an=120.2"), hex representing binary data (e.g., "0152BF5E"). The HTTP interface could be used, which would work the same way as a user updating it from their browser (HTTP push). Some of these servers also provide a proprietary format Ethernet message, typically sent over TCP.

In one non-limiting example, a public social server such as the system employed by Facebook may be utilized to post the IEDs data so the data is accessible on the external network outside of the firewall. Facebook uses a variety of services, tools and programming languages to make up its infrastructure which may be employed in the systems and methods of the present disclosure to implement the technique described herein. In the front end, the servers run a LAMP (Linux, Apache, MySQL and PHP) stack with Memcache. Linux is a Unix-like operating system kernel. It is open source, highly customizable, and good for security. Facebook's server runs the Linux operating system Apache HTTP server. For the database, Facebook uses MySQL for its speed and reliability. MySQL is used primarily as a key store of value when the data are randomly distributed among a large number of cases logical. These logical instances extend across physical nodes and load balancing is done at physical node. Facebook uses PHP, since it is a good web programming language and is good for rapid iteration. PHP is a dynamically typed language/interpreter. Memcache is a caching system that is used to accelerate dynamic web sites with databases (like Facebook) by caching data and objects in RAM to reduce reading time. Memcache is the main form of caching on Facebook and helps relieve the burden of database. Having a caching system allows Facebook to be as fast as it is to remember information. Furthermore, Facebook backend services are written in a variety of different programming languages like C++, Java, Python, and Erlang. Additionally, it employs the following services: 1.) Thrift—a lightweight remote procedure call framework for scalable cross-language services development, which supports C++, PHP, Python, Perl, Java, Ruby, Erlang, and others; 2.) Escribano (server logs)—a server for aggregating log data streamed in real time on many other servers, it is a scalable framework useful for recording a wide range of data; 3.) Cassandra (database)—a database designed to handle large amounts of data spread out across many servers; 4.) HipHop for PHP—a transformer of source code for PHP script code and was created to save server resources, HipHop transforms PHP source code in C++ optimized, among others. It is to be appreciated that any of the above systems, devices and/or services may be implemented in the various architectures disclosed in the present disclosure to achieve the teaching and techniques described herein.

A public web site, e.g., hosting on server 440, 540, 640, which allows the posting of information, such as a Forum, could be used to post a message, containing the meter's data, to a group, thread, or other location. This post would take place by a HTTP POST to the web site's server, where by the server would store that information, and present it on the web site. This message could then be viewed by the clients to see the meter's data, or read by another server for further parsing and presentation. The data could be formatted as human readable text (e.g., "The voltage is 120.2v"), as machine parsable text (e.g., "voltage.an=120.2"), hex representing binary data (e.g., "0152BF5E"). The HTTP interface could be used, which would work the same way as a user updating it from their browser (HTTP push).

User Datagram Protocol (UDP) messages could be used to send a message from the IEDs or meters to a server, which listens for such messages, and parses out the meter's data. When employing UDP broadcasts, messages could be sent from the IEDs or meters to a server, e.g., servers 530, 630, since UDP broadcasts do not work across networks. The messages containing the IED's or meter's data can then be sent to external networks via any of the described (or to be developed) communication methods. Alternatively, a UDP unicast could support sending to any server, e.g., server 424, 524.

A Virtual Private Network (VPN) could be created such that each meter on the internal network is part of the same virtual private network as each of the clients. A Virtual Private Network (VPN) is a technology for using the Internet or another intermediate network to connect computers to isolated remote computer networks that would otherwise be inaccessible. A VPN provides security so that traffic sent through the VPN connection stays isolated from other computers on the intermediate network. VPNs can connect individual IEDs or meters to a remote network or connect multiple networks together. Through VPNs, users are able to access resources on remote networks, such as files, printers, databases, or internal websites. VPN remote users get the impression of being directly connected to the central network via a point-to-point link. Any of the other described (or to be developed) protocols could then be used to push data to another server or clients on the VPN.

Hosted data services, such as a hosted database, cloud data storage, Drop-Box, or web service hosting, could be used as an external server to store the meters data, called Hosting. Each of these Hosts, e.g., servers 440, 540, 640, could then be accessed by the clients to query the Hosted Data. Many of these hosted data services support HTTP Push messages to upload the data, or direct SQL messages. As many web service and cloud hosts allow their users to use their own software, a hosted data service could be further extended by placing proprietary software on them, thus allowing them to act as the external meter server for any of the previously mentioned methods (e.g., servers 424, 524).

In another embodiment, the IEDs can communicate to devices using Generic Object Oriented Substation Event (GOOSE) messages, as defined by the IEC-61850 standard, the content of which are herein incorporated by reference. A GOOSE message is a user-defined set of data that is "published" on detection of a change in any of the contained data items sensed or calculated by the IED. Any IED or device on the LAN or network that is interested in the published data can "subscribe" to the publisher's GOOSE message and subsequently use any of the data items in the message as desired. As such, GOOSE is known as a Publish-Subscribe message. With binary values, change detect is a False-to-True or True-to-False transition. With analog measurements, IEC61850 defines a "deadband" whereby if the analog value changes greater than the deadband value, a GOOSE message with the changed analog value is sent. In situation where changes of state are infrequent, a "keep alive" message is periodically sent by the publisher to detect a potential failure. In the keepalive message, there is a data item that indicates "The NEXT GOOSE will be sent in XX Seconds" (where XX is a userdefinable time). If the subscriber fails to receive a message in the specified time frame, it can set an alarm to indicate either a failure of the publisher or the communication network.

The GOOSE message obtains high-performance by creating a mapping of the transmitted information directly onto an Ethernet data frame. There is no Internet Protocol (IP) address and no Transmission Control Protocol (TCP). For delivery of the GOOSE message, an Ethernet address known as a Multicast address is used. A Multicast address is normally delivered to all devices on a Local Area Network (LAN). Many times, the message is only meant for a few devices and doesn't need to be delivered to all devices on the LAN. To minimize Ethernet traffic, the concept of a "Virtual" LAN or VLAN is employed. To meet the reliability criteria of the IEC-61850, the GOOSE protocol automatically repeats messages several times without being asked. As such, if the first GOOSE message gets lost (corrupted), there is a very high probability that the next message or the next or the next will be properly received.

It is to be appreciated that the above-described one-way communication embodiments may apply to systems other than for energy metering. For example, the present disclosure may be applied to a vending machine or system, wherein the vending machine located in a building or structure having a private or corporate network. The vending machine will include, among other data collecting components, at least a communication device or network interface as described above. The communication device or network interface will coupled the vending machine to the internal network which may be further coupled to the Internet via a firewall. The vending machine may vend or dispense a plurality of items, such as soda cans, candy bars, etc., similar to the vending machine described in U.S. Pat. No. 3,178, 055, the contents of which are incorporated by reference. In accordance with the present disclosure, the vending machine will monitor and collect data related to the items sold. Such data may include quantities of items sold, a re-stock limit that has been reached, total revenue generated by the vending machine, etc. In one embodiment, the vending machine will post to a web site, residing on a server outside of the internal network such as the Internet, quantities of specific items sold by the vending machine that are required to fill the vending machine. In this manner, an operator that maintains the vending machine can check the web site before going to the location of the vending machine and know exactly how many items are required to fill the vending machine before going to the location to refill the vending machine.

In another embodiment, the teachings of the present disclosure may be applied to a medical device, for example, a medical monitoring device configured to be worn on a patient. In this embodiment, the medical monitoring device will include at least a communication device or network interface as described above and monitor a certain parameter relating to a patient, e.g., a heartbeat. In one embodiment, the at least a communication device or network interface operates on a wireless connection and coupled the medical monitoring device to internal network (e.g., a home network) which may be further coupled to the Internet via a firewall, e.g., a router provided by the Internet Service Provider. At predetermined intervals, the medical monitoring device will communicate to and post the monitored data on a remote website. A user such as a doctor may then view the data of the patient by accessing the web site and not directly connecting to the medical monitoring device.

Other embodiments may include security systems such as fire alarm systems, security alarm systems, etc., which need to report data. Also envisioned are manufacturing sensing equipment, traffic sensing equipment, scientific instrumentation or other types of reporting instrumentation.

Based on the sensitivity of the data being communicated and posted through the firewall to various external networks, various data security techniques are employed by the IEDs (e.g., meters, vending machines, medical monitoring device, etc.) contemplated by the present disclosure, some of which are described below.

The original FTP specification is an inherently insecure method of transferring files because there is no method specified for transferring data in an encrypted fashion. This means that under most network configurations, user names, passwords, FTP commands and transferred files can be "sniffed" or viewed by anyone on the same network using a packet sniffer. This is a problem common to many Internet protocol specifications written prior to the creation of SSL such as HTTP, SMTP and Telnet. The common solution to this problem is to use simple password protection or simple encryption schemes, or more sophisticated approaches using either SFTP (Secure Shell (SSH) File Transfer Protocol), or FTPS (FTP over SSL), which adds SSL or TLS (Transport Layer Security) encryption to FTP as specified in RFC 4217. The inventors have contemplated the use of each of these schemes in the IEDs described above.

In one embodiment, the FTP server 131 in the IED 110 shown in FIG. 3 uses a set of username and passwords which are programmed through Modbus. These username and passwords can only be programmed when a user performs a logon with administrative rights. Each programmed user account can be given differing permissions, which grant or restrict access to different roles within the file system. Each role controls read and write access to specific files and directories within the file system through FTP. These roles can be combined to customize the access a specific user is given. When passwords are disabled by the user, a default user account is used, with full permissions, and a username and password of "anonymous".

Password protection schemes are measured in terms of their password strength which may be defined as the amount of resiliency a password provides against password attacks. Password strength can be measured in bits of entropy. Password strength is an important component of an overall security posture, but as with any component of security, it is not sufficient in itself. Strong passwords can still be exploited by insider attacks, phishing, keystroke login, social engineering, dumpster diving, or systems with vulnerabilities that allow attackers in without passwords. To overcome these drawbacks it is contemplated to use some form of password encryption scheme (e.g., 8-bit, 10-bit, 16-bit) in concert with the password protection system to facilitate secure communication between an external device, such as PC client 102 and the FTP server 131. However, there are drawbacks associated even with these schemes. For example, a username and password may be encoded as a sequence of base-64 characters. For example, the user name Aladdin and password open sesame would be combined as Aladdin:open sesame which is equivalent to QWxhZGRpbjpvcGVulHNlc2FtZQ==when encoded in base-64. Little effort is required to translate the encoded string back into the user name and password, and many popular security tools will decode the strings "on the fly", so an encrypted connection should always be used to prevent interception.

In another embodiment, an encrypted connection scheme is used. In particular, the FTP server 131 in the IED 110 uses some form of FTP security encryption, such as, for example, FTPS (FTP over SSL), Secure FTP (sometimes referred to as FTP over SSH, i.e., FTP over Secure Shell encryption (SSH)), Simple File Transfer Protocol (SFTP), or SSH file transfer protocol (SFTP). These FTP security encryption protocols provide a level of security unattainable with the previously described password encryption schemes.

FTP over SSH refers to the practice of tunneling a normal FTP session over an SSH connection. Because FTP uses multiple TCP connections, it is particularly difficult to tunnel over SSH. With many SSH clients, attempting to set up a tunnel for the control channel (the initial client-to-server connection on port 21) will protect only that channel; when data is transferred, the FTP software at either end will set up new TCP connections (data channels) which will bypass the SSH connection, and thus have no confidentiality, integrity protection, etc. If the FTP client, e.g., PC client 102, is configured to use passive mode and to connect to a SOCKS server interface that many SSH clients can present for tunneling, it is possible to run all the FTP channels over the SSH connection. Otherwise, it is necessary for the SSH client software to have specific knowledge of the FTP protocol, and monitor and rewrite FTP control channel messages and autonomously open new forwardings for FTP data channels.

In further embodiments, the networks may be configured to adhere to various cyber security standards to minimize the number of successful cyber security attacks. The cyber security standards apply to devices, IEDs, computers and computer networks. The objective of cyber security standards includes protection of information and property from theft, corruption, or natural disaster, while allowing the information and property to remain accessible and productive to its intended users. The term cyber security standards means the collective processes and mechanisms by which sensitive and valuable information and services are protected from publication, tampering or collapse by unauthorized activities or untrustworthy individuals and unplanned events respectively. In the various embodiments and implementations of the present disclosure, the systems, devices and methods may be configured to be in accordance with, for example, the Standard of Good Practice (SoGP) as defined by the Information Security Forum, Critical Infrastructure Protection (CIP) standards as defined by the North American Electric Reliability Corporation (NERC), and the ISA-99 standard as defined by the International Society for Automation (ISA), the contents of each being incorporated by reference herein. It is to be appreciated that this lists of cyber security standards is merely an exemplary list and is not meant to be exhaustive.

It is to be appreciated that the above-described devices and systems may be employed to implement the various devices, systems and methods described below.

An increasing emphasis on security in corporate networks has made accessing networked devices, such as meters, for the purposes of configuration and data retrieval, difficult. While networks may be configured to permit these services on individual devices, this is a time consuming process when there are many devices. Additionally, security exceptions are often discouraged or prohibited, as they bypass the networks security policy.

Another problem encountered in networks, especially when traversing public networks such as the Internet, is that data can be intercepted and changed by malicious hosts. While it may be desirous for benign hosts, such as firewalls, to access this data, malicious hosts should be prevented. Additionally, malicious hosts can emulate data servers and meters, causing traffic to go to unintended destinations, or changing the data before it gets to the server.

Another problem encountered with a multitude of networked devices is the volume of data transferred to servers. While network speeds have increased, the number of devices transferring data, and the amount of data they transferred, have increased as well.

One solution to restricted security in networks is for networked devices, such as meters or IEDs, to push their data out from the secured network. An exemplary system is described above in relation to FIG. 6, where IEDs, or meters, 410, 412, 414 push data out of a secure network 416 to a server 424. In such a system, clients, e.g., clients 428, would not have to query networked devices to access their information, reducing the need for special configurations on the part of the secured network. It is to be appreciated that the description below also applies to the system described in FIGS. 8 and 9.

In one embodiment, an exemplary push system may include, but not be limited to, Application Programming Interface (API) methods (e.g., executed on an IED, such as any of the IEDs described above, or on a server, e.g., such as server 530, which aggregates data from each IED) to push data points up to the server (e.g., server 424, 524, etc.), query data points from the server (e.g., server 424, 524, etc.), query the list of data points on the server (e.g., server 424, 524, etc.), query information about the data points on the server (e.g., server 424, 524, etc.), register new data points on the server (e.g., server 424, 524, etc.), register new meters on the server (e.g., server 424, 524, etc.), remove data points from the server (e.g., server 424, 524, etc.), remove meters from the server (e.g., server 424, 524, etc.), configure settings of meters on the server (e.g., server 424, 524, etc.), query settings of meters on the server (e.g., server 424, 524, etc.), enable or disable access to meters and their data by users, add and remove users from the server (e.g., server 424, 524, etc.), login and logout as a user, create/configure/remove customers from the server (e.g., server 424, 524, etc.), and view the security and action audit log for the server (e.g., server 424, 524, etc.). These exemplary systems may employ HTTP, simple Uniform Resource Locator (URL) based API, Representational State Transfer (REST), JavaScript Object Notation (JSON), Simple Object Access Protocol (SOAP), XML body, etc., where the use of same is described in commonly owned pending U.S. application Ser. No. 14/742,302, the contents of which are hereby incorporated by reference.

As described above, JSON files may be employed for the communication between IEDs, e.g., IED 410, 412, 414, and servers, e.g., servers 424, 524. In one embodiment, the overhead size of JSON files and JSON bodies sent by IEDs and/or servers across networks 422, 522, 622, described above, may be improved by reducing the size of the data transferred by encoding the data in two separate fields, one of which contains the list of all values, the other of which describes each of the values. One example may be to represent a set of historical data, wherein the header contains the JSON array ["timestamp", "voltage" ], which describes the format of the body, and the body contains the JSON array [[1509451200000,120.1], [1509452100000,120.2]], which contains the actual values. Another example may be to represent a sequence of limit events, wherein the header contains the JSON array ["index", "channel", "type", "duration", "excursion_value" ], and the body contains the JSON array [[1,"voltage an","above",24.3,153.3],[2,"voltage cn", "below",12.7,67.4]]. It should be appreciated that such an array may represent other combinations of values as well, such as more channels in the historical array, or other logs.

Such an arrangement may be further improved by allowing the order of the columns to be determined by the header, such that a consumer of the data relied on the headers order, rather than being hard coded. One example may be to represent the columns as ["voltage", "timestamp" ].

Such an arrangement may be further improved by representing the fields in the header section with JSON objects, rather than strings. This would allow more information to be encoded about the column's values. One example may be that, instead of a header value of "voltage", it may be {"name": "voltage an", "type": "voltage"}, which would inform the consumer to process the values in that column of the array as voltage. Another example may be to include information about where the value came from, such as {"name": "voltage an", "meter": "0012345678" }.

Such an arrangement may be further improved by including analysis information in the JSON object in the header. One example may be to include a max and min value for the column, such as {"name": "voltage an", "max": 127.3, "min": 119.5, "avg": 122.7}. Another example may be to include a first and last value for the column, such as {"name": "timestamp", "time.first": 1509451200000, "time.last": 1509452100000}.

It should be appreciated that other data formats may be used with such an approach, such as SOAP, or XML.

In one embodiment, data access by malicious hosts may be prevented encapsulating the traffic to and from the meter, e.g., IEDs 410, 412, 414, in a secure tunnel protocol, such as TLS, or SSL. One example may be to use HTTPS instead of HTTP, where HTTPS is a protocol that wraps HTTP within a connection encrypted with TLS. Another example may be to use secure versions of FTP, such as FTPS, FTP over SSL, or SFTP, which wrap the FTP protocol within a SSL tunnel. Another example may be to use Secure Copy Protocol (SCP), a protocol for copying files over an SSH connection, which is a secure connection between two network devices.

Another implementation to prevent data access by malicious hosts may be to encrypt the data being transferred. One example may be to encrypt the body with an encryption algorithm, such as AES-128.

In another embodiment to prevent data access by malicious hosts, a secure end to end connection between the meter, e.g., IED 410, 412, 414, etc., and the server 424 may be established, such as a VPN (Virtual Private Network) tunnel. Such a VPN tunnel may be initiated by the meter, e.g., IED 410, when the meter needs to communicate to the server 424. It is envisioned that once the VPN connection is established, any protocol may be used by the IED, e.g., 410, to communicate to the server, e.g., 424.

One solution to malicious hosts emulating meters may be to give meters a unique key, which a processor or communication module of the meter may present along with the push data to the server. Such a key is often called an API Key. For example, each meter may get a unique key (stored in a memory of the meter), which uniquely identifies that meter to the server. As another example, each meter for a specific location may be given the same key (stored in a memory of each meter), which would tie those meters to that location.

In another embodiment, an embedded username/password may be included in single push request from the meter to the server.

One solution to the problem of data transfer is to have multiple levels of data that can be transferred or uploaded to the server. Such levels may have successively increasing quantity of data, to refine the data they cover, expand the data they cover.

One implementation of levels may be for log data to be uploaded by each IED 410, 412, 414 to the server 424, to cover only a specific range of historical data, here called Blocks. One example may be for historical channel data, such as Voltage A-N data stored every 15 minutes, to be uploaded by a processor or communication module IED to the server, where such data is data stored in the month of May. In another example, for limits events data the processor or communication module of the IED to only upload the data for the events which occurred on a specific day. It should be appreciated that any set of data indexed by time may be broken into such blocks by the processor or communication module of the IED. It is envisioned that such blocks may then be uploaded by the processor or communication module of the IED successively, covering a larger range of data.

Another implementation of blocks may include where the processor or communication module of the IED breaks up the data to be uploaded on other parameters. For example, historical channel data may be broken up by channels, such as Voltage A-N, Current A, and Watts Received. As another example, Power Quality events may be broken up by the processor or communication module of the IED by event type, such as Surges and Sags. It is envisioned that any such common parameter within the set of data may be used the processor or communication module of the IED for separating blocks.

Another implementation of blocks may where the processor or communication module of the IED breaks up the data to be uploaded into only the most recent data. For example, if the last upload of historical channel data was a week ago, then a block containing only the last week of data may be generated and uploaded to the server 424 by the processor or communication module of the IED, e.g., IEDs 410, 412, 414. Only uploading the most recent data may be improved by the server 424 providing a method for the processor or communication module of the IED to query what data the server 424 already has, such that the processor or communication module of the IED would not have to keep track of what data has already been uploaded to the server 424. One example may be for the server 424 to provide a web service, that when queried, returned the last time the meter uploaded data. Another example may be for the server 424 to provide a web service, that when queried, returns the newest date of data the server 424 stored for that meter. Such examples may be further improved by the web service only returning information for the specific set of data it requested, such as, but not limited to, historical channel data, power quality events, limits events, or specific channels, such as, but not limited to, Voltage A-N, Current A, or Watts Received.

Another implementation of uploading levels of data may be the processor or communication module of each IED to upload each data point to the server 424 as it occurs or is stored, here called Streaming. One example may be for the processor or communication module of the IED (e.g., processors 50, 60, 70 and communication device 24 as shown in FIG. 1) to upload a limit event (e.g., a voltage exceeding a predetermined threshold) when the limit event begins or ends, rather than waiting for some scheduled upload time. Another example may be for the processor or communication module of the IED to upload each 15 minute historical channel data point, as the IED stores that log value. It is envisioned that such streaming of recorded points may be applied to any data point.

Such streaming may be improved by configuring the processor or communication module of the IED uploading data points to the server, e.g., server 424 or server 426, which are not directly stored, here called Live Streaming. One example may be for the processor or communication module of the IED (e.g., processors 50, 60, 70 and communication device 24 as shown in FIG. 1) to stream the current Voltage A-N value to the server every second, without relying on the Voltage A-N data point being stored in a log. Another example may be for the processor or communication module of the IED to upload its current operational status, such as uptime, security status, and internal health checks, to the server every minute, such that the server can keep track of the health of the IED. It is envisioned that any value the IED monitors may be live streamed in such a fashion. It is to be appreciated that the live streaming data may be streamed to server 424 which then provides the data to UI server 426 for display, or alternatively, the live streaming data may be steamed directly to the UI server 426 for display since such data may not be stored.

In a further embodiment, the problem of data transfer may be alleviated by allowing the data points that are uploaded to the server by the processor or communication module of the IED to be configurable, such that the user may refine the upload to only the information that they are directly interested in. One example may be a user interested in the current meter conditions, that configures the meter to only upload Live Streaming Voltage and Current data points. Another example may be a user interested in billing, that configures the meter to only upload Live Streaming Energy data points every 15 minutes. Another example may be a user interested in live power quality events, that configures the meter to upload Streaming Power Quality and Waveform events, and upload historical blocks on a schedule, of power quality related data points, such as voltage, current, frequency, and harmonics. Another example may be a user interested in everything, that configures the meter to upload historical blocks of all data points on a schedule.

Configurable uploads may be improved by providing each meter or IED with a default configuration template that the processor or communication module of the IED automatically uses, and that the user can use as a base for modification. It is envisioned that such a default template may provide a balance between common usage scenarios and restricting the quantity of uploads to the server.

In certain embodiments, such templates may provide the user with a list of such templates, tailored for various usage scenarios the user might use the meter in. One example of such a template may be one that focuses on the current meter conditions, that configures the processor or communication module of the IED to only upload Live Streaming Voltage and Current data points. Another example of such a template may be one that focuses on billing, that configures the processor or communication module of the IED to only upload Live Streaming Energy data points every 15 minutes. Another example of such a template may be one that focuses on power quality events, that configures the processor or communication module of the IED to upload Streaming Power Quality and Waveform events, and upload historical blocks on a schedule, of power quality related data points, such as voltage, current, frequency, and harmonics. Another example of such a template may be one that balances everything, that configures the processor or communication module of the IED to upload historical blocks of all data points on a schedule.

In one embodiment, configurable uploads may enable arbitrary channels, e.g., voltage channels, current channels, etc., to be included as a data point in the upload. Such arbitrary data points would be known to the IED, but need not be known to the server ahead of time. One example may be where the processor or communication module of the IED (e.g., processors 50, 60, 70 and communication device 24 as shown in FIG. 1) adds a new data point when the software is upgraded, where this new data point is not known ahead of time to the server. One possible implementation of arbitrary channels may be that the channels uploaded to the server are identified by a unique string key, determined by the meter, and associated with a display name, which may or may not be unique.

Network Devices, e.g., IEDs 410, 412, 414, pushing data to the server may be improved by making the format of the query be the same as the format of the push, here called Symmetric Formats. One example of such a format may be to use an array of data values, representing multiple data values over time. In such a format, the information to determine presentation as well as parsing would be included, such as, but not limited to, the display name, the channel key, the channel type, and the data type.

Symmetric Formats may be improved by allowing clients to query data from meters or IEDs using the same format as the push. One example may be a client that queries the Power Quality logs from the meter using an HTTP GET request, and the processor or communication module of the IED returns the values in the same format as the IED would push to the server. Another example may be an intermediate server, e.g., server 530, which collects the data from all the meters, e.g., IEDs 510, 512, 514, on its network, e.g., network 516, and forwards the data directly to another server, e.g., server 524, as shown in FIG. 8. In such an example, the intermediate server would have to do minimal work to arrange the data to be pushed up to the server.

With an increasing number of networked devices, e.g., IEDs, meters, etc., being commissioned and deployed within users' networks, adding configurable options increases the burden on the configuring user, as well as increasing the likelihood of configuration error. While a software may be created that configures common parameters of multiple devices simultaneously, such interfaces can be cumbersome and error prone, as they often must deal with various special cases. Additionally, such interfaces must know about the devices beforehand, which is a configuration task in and of itself.

Figure 10:
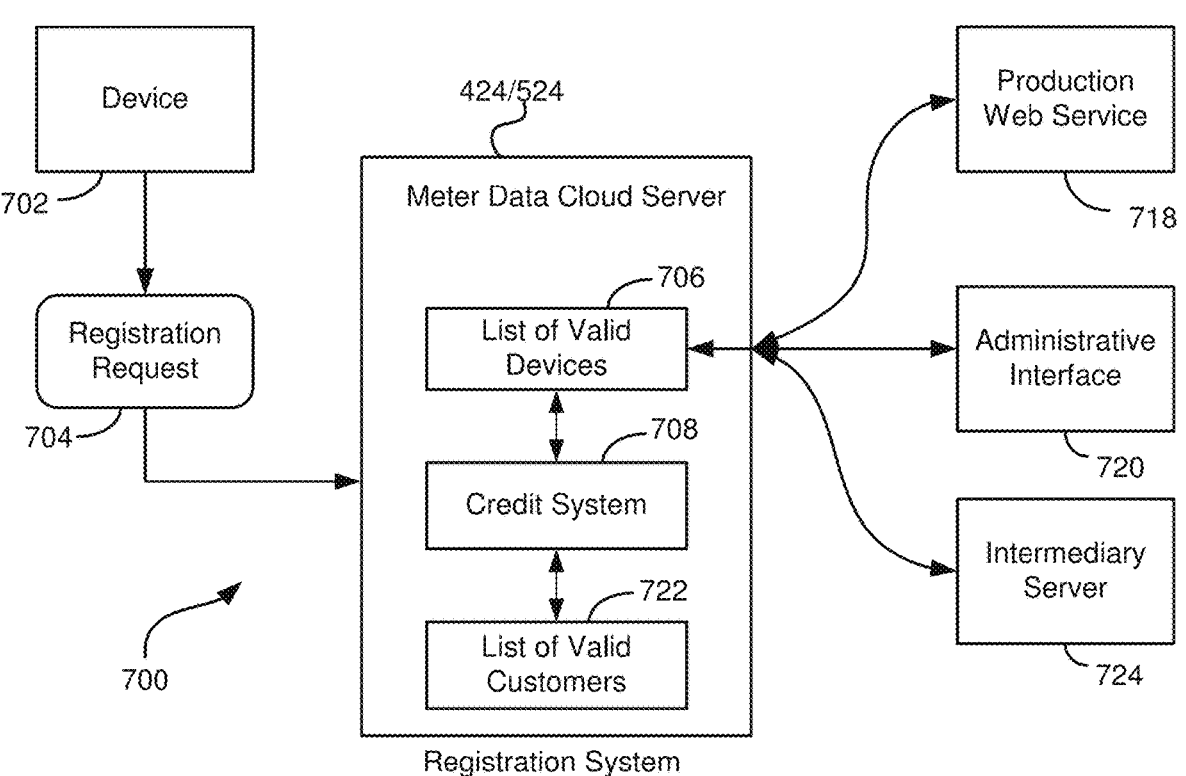
FIG. 10 illustrates a device registration system in accordance with an embodiment of the present disclosure.

One solution to the onus of configuration is for meters to automatically register themselves with the Meter Data Cloud server, e.g., servers 424, 426, 524. For example, referring to FIG. 10 an automatic registration system 700 is shown in accordance with an embodiment of the present disclosure. The system of FIG. 10 includes a Meter Data Cloud Server, which may represent any of servers 424, 524, 530, 630, etc., for communicating with and receiving data from a plurality of devices 702 e.g., IEDs 410, 412, 414, 410, 512, 514, 610, 612, 614. In one implementation, when meter or IED 702 is first installed in the user's network, the meter 702 attempts to register itself with the Meter Data Cloud server 424/524, by sending a registration request 704. Such a request may contain the meter's identification information, including, but not limited to, a unique identifier, the type of device, and the list of data points that the meter supports. It is to be appreciated that the registration request 704 may be sent to the Meter Data Cloud 424/524 based on a known address (e.g., IP address, URL, etc.) of the Meter Data Cloud 424/524. For example, the address of the Meter Data Cloud 424/524 may be preprogrammed in the meter 702 at the time of manufacture so as soon as the meter 702 is placed into service, a registration request is generated and sent.

In another implementation of automatic registration, after the meter settings are first configured by the user, the meter 702 may automatically attempt to register itself with the Meter Data Cloud server 424/524, by sending a registration request 704. The address of the Meter Data Cloud 424/524 may be entered into the meter 702 by the user after the meter 702 is placed into service, e.g., via an input means on the meter 702, for example, a touchscreen, buttons, etc., or via a software program executing on a computing device coupled to the meter 702. In such an implementation, the user may configure the meter 702 with location specific information before registering, such as, but not limited to, physical location, cloud server location, and cloud server access keys.

In another implementation of automatic registration, a processor or communication module of the meter 702 may implement a command in a communication protocol to trigger an attempt to register itself with the Meter Data Cloud server 424/524, by sending a registration request 704. In such an implementation, a meter 702 may be ensured to be configured correctly before being triggered to register itself with the server. It is envisioned that any protocol may be used for such a command, including, but not limited to, Modbus, HTTP, DNP, or custom protocols over TCP or UDP.

Such a command trigger may be improved by using a command protocol which supports targeting multiple devices on a network simultaneously, often called broadcasting. In such an implementation, each device which received the command would attempt to register itself with the Meter Data Cloud server 424/524. One example may be to use UDP broadcasts or any casts, which is a form of UDP which any device on the local network can receive. Another example may be to use UPnP broadcasts to any network device which registers to listen to such a command. It is envisioned that other such broadcast protocols may be used.

Another solution to the onus of configuration is for meters 702 to automatically upload their data points to the Meter Data Cloud server 424/524. In one implementation, the meter 702 may begin uploading data points automatically after first registering with the cloud server. In another implementation, the meter 702 may begin uploading data points automatically after the cloud configuration changes. In another implementation, the meter 702 may begin uploading data points automatically after receiving a command in a communications protocol.

Another solution to the onus of configuration is for the Meter Data Cloud server 424/524 to give the user the ability to enable or disable access to the data of each meter 702. In such an implementation, when access to the data of a meter 702 is disabled, the data nor the meter 702 is not actually removed from the server 424/524, but instead only the ability of the user to access that data is disabled. Additionally, in this implementation, the meter 702 would still have the ability to upload data to the server 424/524, even though access to that data is disabled. It is envisioned that such a solution would reduce the need for meter 702 to be re-configured or re-registered in the event that they are re-enabled. It is also envisioned that in such a solution, a user may still explicitly delete the meter 702 from the cloud server 424/524 if they wished.

In one implementation of disabling access to meter 702 data, the Meter Data Cloud server 424/524 may block access to the data query commands from a user or client, based on information stored about that meter 702. One example may be for the Meter Data Cloud server 424/524 to store an enabled setting for each meter 702, and when the historical channel data is queried, such as with a HTTP REST request, the server 424/524 may return an error message, such as "Disabled" (e.g., to a UI displayed on a client device or to any other device), for meters 702 that have been disabled. Another example may be for the Meter Data Cloud server 424/524 to return an error message for all requests related to a meter 702 that has been disabled, such as, but not limited to, data queries, meter 702 information, meter 702 lists, or meter 702 settings.

In another implementation of disabling access to meter 702 data, the meter 702 may be removed from a list of active meters 706 stored in server 424/524. In such a system, only meters 702 in the active list 706 would be accessible by non-administrative users. One example may be a system where a customer has 3 meters 702 in a location, one of which they want to disable. In such an example, the disabled meter 702 would be removed from the list of meters 706, and would no longer be accessible by the user.

Such an embodiment of disabling meters 702 may be improved by only charging users for the meters 702 that are enabled. One example may be a customer with 100 meters 702, of which only 50 meters 702 are enabled. In such an example, the customer would only be charged for the 50 enabled meters 702, and not for the other 50 disabled meters 702. Additionally, in such an example, it is envisioned that the user would not have access to the disabled meters 702, except to re-enable them (e.g., by sending a request to the server 424/524 to activate the meter and update list 706), at which time they would again have to pay for such re-enabled meters 702.

Additionally, an embodiment of disabling meters 702 may be improved by using server 424/524 to automatically disable meters 702 for users which have not paid for access to those meters 702. One example may be a user that has 100 enabled meters 702, and during automatic subscription renewal, if the credit card on file is rejected, all the meters 702 are disabled by server 424/524 until the payment is amended. Another example may be a user that cancels automatic subscription renewal, at which time all of their meters 702 are disabled until subscription is renewed. Another example may be a user which never entered billing information and has no access to meter data. In such an example, data for meters 702 may be collected, but the user would only have access to that data once they enter billing information.

Figure 11:
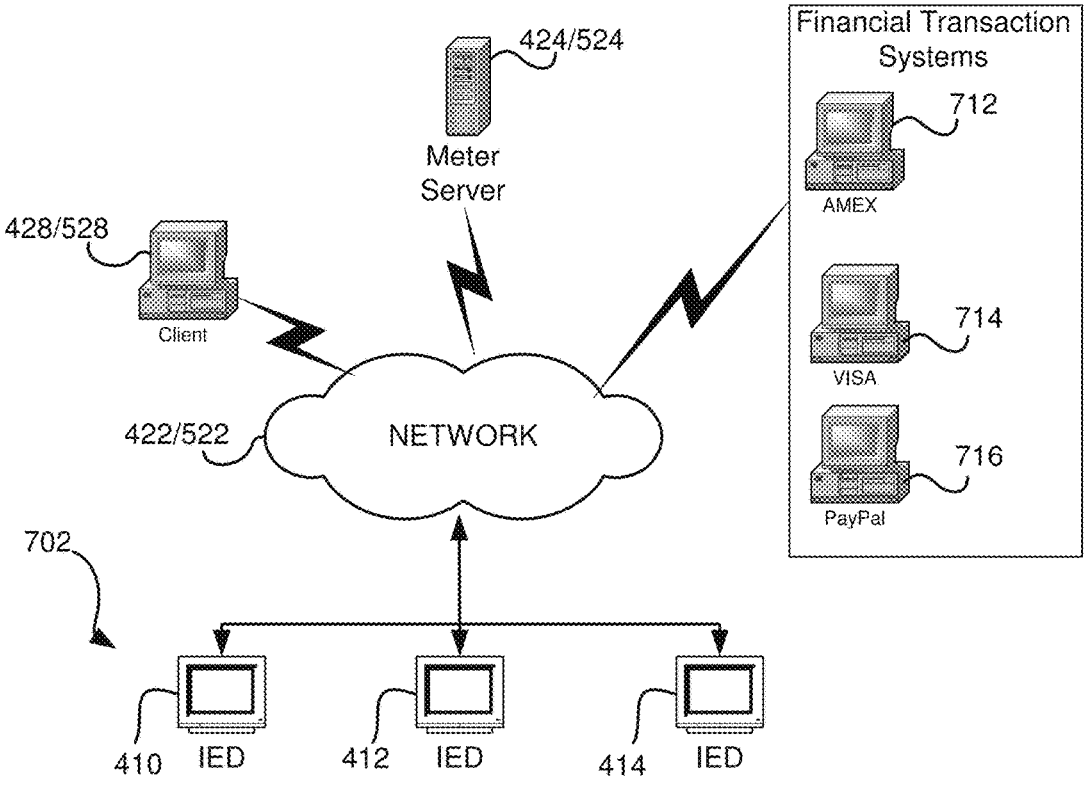
FIG. 11 illustrates a payment/credit system in accordance with an embodiment of the present disclosure.

A payment system for implementing the embodiment described above in shown in FIG. 11 in accordance with the present disclosure. Such a payment system may be improved by using a credit system 708 stored in server 424/524 to charge users for each meter 702, and the amount of time those meters 702 are enabled. The credit system 708 may be in communication via a network, e.g., 422/522, with one or more financial transaction systems including various money transfer systems 712, 714, 716. In such a system 708, a charge credit is used by each meter during a fixed period of time, and if no credits are available, then that meter is disabled by server 424/524 (e.g., by sending a signal to the meter 702 causing the meter to turn off or shut down until directed otherwise). One example may be a user that has 100 meters 702 and each credit is worth one month of access. In such an example, 100 credits would be required at the beginning of each month, and 1200 credits would be required for an entire year. Another example may be a user that has 100 meters 702, but only has 350 credits available. In such an example, at the beginning of the first three months, 100 credits would be removed from the credits available, but at the beginning of the forth month, since only 50 credits are available, access to the meters 702 would be disabled by server 424/524. Another example may be a user that has 100 meters 702 enabled, and 100 meters 702 enabled, 200 credits, and disables 50 meters 702 in the second month. In such a system, 100 credits would be used for the first month, but only 50 used for the second and third month.

Such a credit system may be improved by configuring server 424/524 to automatically charge the users billing information on a schedule, refilling the credits they have available to use for meters 702. Such an automatic renewal system is often called a subscription. One example may be the user subscription implemented by server 424/524 automatically charges the user at the beginning of each month, adding enough credits to allow access to all enabled meters 702 for that month. Another example may be the user subscription implemented by server 424/524 automatically charges the user when their available credits are insufficient to allow access to all meters 702 for the next month. Another example may be the user subscription implemented by server 424/524 automatically charges the user at the beginning of each year, adding enough credits to allow access to all enabled meters 702 for the entire year.

Such a credit system may be improved by configuring server 424/524 to automatically charge the user for sufficient credits to allow access to meters 702 which were just enabled. One example may be a user which has 50 meters 702 enabled, and which registers and enables via server 424/524 another 50 meters 702, at which time the additional credits required for the 50 meters is automatically charged by server 424/524 to the users billing information (e.g., by interfacing with system 710).

Such a credit system 708 may be improved by providing credits to a user in ways other than a billing charge, such as an administrative action, or a special code entered by the user. One example may be a user which is encouraged to adopt using credit system 708 of the Meter Data Cloud system 424/524 by providing them with 100 free credits to start playing with the system 708, enabled by an internal administrative interface. Another example may be a promotion which provides users with a code for free credits, which they enter into their account through the billing interface, and which adds credits to their credit pool.

One problem created by allowing meters 702 to self-register is that without a user entering the registration information, the server 424/524 cannot verify that the meter 702 being registered is valid. One embodiment of registration verification is to keep a list of all valid devices 702 in the Meter Data Cloud 424/524. The list of valid devices may be stored along with the list of active devices in list 706 (i.e., a database). Such a list 706 may be used to verify each meter 702 as it attempts to be registered, and if a meter 702 is not valid, the registration is rejected. One example may be when a valid meter 702 attempts to register with the Cloud Server 424/524 (i.e., a processor or communication module sends a registration request 704 to server 424/524), the server 424/524 checks the serial number of the meter 702 against the list of valid devices 706, and finding the meter 702 to be valid, allows the meter 702 to continue registration. Another example may be when an invalid meter, such as malicious host, attempts to register with the Meter Data Cloud server 424/524, the server 424/524 checks the serial number of the meter 702 against the list of valid devices 706, and not finding the meter 702 to be valid, rejects the meter 702 from continuing registration. Another example may be a valid meter 702 which has already been registered, and is now attempting to be registered again with the Meter Data Cloud server 424/524, which the server 424/524 checks the serial number against the list of valid devices 706, and finding the meter 702 to have already been registered, rejects the meter 702 from continuing registration.

One implementation creating such a list of valid devices 706 may be that each meter is added to the list 706 by an administrative process during production. One example may be a web service 718 that is called by the automatic internal manufacturing production processes when the meter 702 is constructed, and when called, the Meter Data Cloud server 424/524 adds that meter 702 to the list of valid devices 706. Another example may be a web service 718 that is called in response to a manual action by a user in production, such as signing off on the shipment of the meter 702 to a customer.

Another example may be an administrative interface 720, such as a web page, on the Cloud Server 424/524, that a user from production may manually enter meters 702 to add to the list of valid devices 706.

Such a creation of a list of valid devices 706 may be improved by configuring server 424/524 such that one or more meters 702 may be added with any such interface 720, and that a batch of meters 702 may be added at the same time. One example may be that production generates a list of meters 702 to add to the valid list 706 during production, and that such a list 706 is automatically added at the end of each month. Another example may be that a query may be provided (e.g., via server 424/524) to the production databases that lists all meters 702 produced during a time period, and the results of such a query can be uploaded to the Meter Data Cloud server 424/524.

Such a list of valid devices 706 may be improved by associating the customer that purchased the device with the device in the valid list 706. This association may be stored in database having a list of valid customers 722 within server 424/524. In such a system, a meter 702 may only be associated with a customer if the user is the customer that purchased the meter 702. One example may be a meter 702 purchased by customer ABC, then registered and associated with customer ABC by Meter Data Cloud server in list 722. In such a system, since the meter 702 has customer ABC listed as the owner of that meter 702, the Meter Data Cloud server 424/524 associates the meter 702 with that customer. Another example may be a meter 702 purchased by customer ABC, then registered and attempted to be associated with customer DEF in the Meter Data Cloud server 424/524. In such a system, since the meter 702 has customer ABC listed as the owner of that meter 702, but the user is attempting to associate the meter 702 with customer DEF, the Cloud Server 424/524 prevents the meter 702 from being associated with customer DEF. Since ownership of meters 702 can change hands, it is envisioned that the customer associated with a meter 702 in the list of valid devices 706 may be changed by an administrator.

Another solution to the onus of configuration is for an intermediate software stored in an intermediary server 724, which has awareness of all the meters 702 within a network, to perform the registration of those meters 702. The intermediary server 724 is in communication with server 424/524. An exemplary system employing such software is shown in FIG. 8. In one embodiment, a meter fleet management software is employed, e.g., on server 530, which discovers and maintains a list of meters 702, e.g., IEDs 510, 512, 514, in a network, e.g., network 516, and that registers those meters 702 for the user. One example of registration may be that once the user enters login information for the Meter Data Cloud server 424/524, the management software may take the list of all known meters 702, e.g., in network 516, and register them with the Cloud Server 424/524. Another example may be when a new device 702 is added or detected by the management software, that device is automatically registered with the Cloud Server 424/524. Another example may be a button or action presented to the user in the UI of the management software, that when performed (e.g., by engaging the button or selection the action), registers one or more selected known devices 702 with the Meter Data Cloud server 424/524.

It is envisioned that such a management software may be installed on a users server, e.g., server 530 shown in FIG. 8, to manage the fleet of meters on their network, e.g., network 516, or on a prebuilt device provided to the user, and plugged into their network. Such a standalone management device may have the same capabilities as the installed management software. It is also envisioned that such a management device may be simplified by only providing meter detection and registration functionality.

Another solution to the onus of configuration is for the meter 702 to be registered in production, before it is shipped to the customer. In such a system, this registration would configure the meter 702 with enough information that it may (e.g., via a processor and/or communication module) automatically start uploading data to the Meter Data Cloud server 424/524 from the moment it is installed, such as, but not limited to, the address of the Meter Data Cloud server 424/524, a unique identifier for the meter 702 with the Meter Data Cloud server 424/524, or the ApiKey for the meter 702 to use when uploading data to the Meter Data Cloud server 424/524.

One improvement to the production registration of meters 702 would be to provide a unique key, generated by the Meter Data Cloud server 424/524 during registration, to the customer that purchased the meter 702. Such a key may then be used by the customer to add the meter 702 to the list of meters they own in the Meter Data Cloud server 424/524, from their management interface in the Cloud Server 424/ 524. In such a system, this would allow the meter 702 to be registered, managed, and begin uploading data to the server 424/524, without any user intervention. Additionally, in such a system, it is envisioned that this would prevent users from claiming ownership and access to meters 702 and their data, to which they did not purchase and do not have legitimate access.

One method of distributing such a unique key may be by programming it into the meter 702. In such a system, the user may then query the unique key from the meter 702 using a software, such as a webpage on the meter 702, and then enter it into the Meter Data Cloud server 424/524.

Another method of distributing such a unique key may be by providing the unique key with the documentation included with the meter 702 during shipping. One example may be to print the unique key on the physical side of the meter 702. Another example may be to include a registration card with the meter 702, such as inside or on the side of the box the meter 702 ships to the customer in.

Another solution to the onus of configuration is for a processor or communication module in each meter 702 to use a single, known, Meter Data Cloud server 424/524 address for registration and uploading data to server 424/ 524. Such a known server address would remove a parameter that the user would need to configure in the meter 702 for it to integrate with the Meter Data Cloud server 424/524. One implementation of a known server address may be to hardcode a single address into a memory, processor, communication module, etc., of each of the meters 702, e.g., memories 18, 20, processors 50, 60, 70, FPGA 80 and/or communication device 24 of IED 10 shown in FIG. 1. One example may be to use the address http://meterlogcloud-data.com for all meters 702. It should be appreciated that any such http address may be used in this implementation.

A single known address may be improved by changing the known address programmed in new meters 702 over time, while still supporting the old addresses hardcoded in old meters 702. One implementation of changing addresses may be to configure multiple addresses with global DNS services to route to a single Meter Data Cloud server 424/524. One example may be a different address for each year, such as http://examplecloud-2017.com, http://examplecloud-2018.com, and http://examplecloud-2019.com.

Another implementation of changing addresses may be to use multiple sub-domains under a single domain address. One example may be to use a different sub-domain for each customer, such as http://0001.examplecloud.com, http://4971.examplecloud.com, and http://0758.examplecloud-.com, where 0001, 4971, and 0758 are sample customer codes. Another example may be to use different sub-domains for each meter type. Another example may be to use different sub-domains for each meter 702, such as http://0001.examplecloud.com, http://4971.examplecloud.com, and http://0758.examplecloud.com, where 0001, 4971, and 0758 are sample meter ids.

Another implementation of known server addresses may be to configure the known address when the meter 702 is registered.

As the need for a distributed network of data collecting devices, e.g., any of the IEDs described above, spreads, the technologies in those devices do not always keep up to pace. Many may be old and lacking the technology to interconnect on such a network; others may be small, low power devices, that haven't been given the ability to do so.

Additionally, with a plethora of meters, even when every device has the ability to push data points up to the Meter Data Cloud server 424/524 itself, network security may not allow the egress of data from so many individual devices. Adding to the complexity is the difficulty for users to find which meters have trouble pushing data on the network, without laboriously interrogating each device.

One solution to the plethora of underpowered devices is to use a single device on the same network, that can act as an intermediary between the underpowered devices, and the Meter Data Cloud server 424/524. Such an arrangement is often called fog and/or mist computing. An exemplary system is shown and described in FIG. 8.

In one embodiment, the intermediary device 530 may be a server which retrieves data point logs from meters (e.g., 510, 512, 514) which do not have the ability to push their own data points to the Meter Data Cloud server 424/524. Such an intermediary device or server 520 would then subsequently push the data point logs up to the Meter Data Cloud server 424/524 for the meters, e.g., IED 510, 512, 514. One example may be a software installed on a server 530 within the users network, that retrieves the data logs for all known devices in the network, using data pull protocols, and pushes that data up to the Meters Data Cloud server 424/524 on a schedule. Another example may be a device dedicated to collecting meter data that may be installed on a users network. Another example may be a meter itself, which in addition to performing data collection, may also collect data from other meters on the network. It should be appreciated that a users network may be as small as a private network with only 10 devices, or as large as publicly accessible meters on the Internet. It should also be appreciated that one or more such servers may be used, each handling a sub-set of meters.

Such an intermediary server may be improved by automatically discovering devices which do not have the ability to push data to the Meter Data Cloud server themselves. One example may be for the server to perform a TCP network scan over a known range of IP's, to detect meters which respond to a given meter data pull protocol, such as Modbus TCP or DNP. Another example may be for the server to advertise its location by sending a UDP broadcast on the network and listening for registration responses from meters. Another example may be for the server to listen to meter identity broadcasts, such as using UPnP. It is envisioned that such detected meters would be registered with the intermediary server, and subsequently the intermediary server would pull data points from these meters, and push them to the Meter Data Cloud server 424/524. It is also envisioned that such pull and push of data points may also be used for meters which have push capability.

In a further embodiment, the intermediary device may be a server which collects data point logs for meters which do not have such logs, by polling the meters live data points on a schedule. Such a server, e.g., server 530 would then subsequently push the collected logs up to the Meter Data Cloud server 424/524 for the meter. One example may be a server that polls the voltage, current, and power live values from all known meters every minute, stores those values local to the server, and then pushes those stored values up to the Meter Data Cloud server once a day. Another example may be a server that polls the energy live values from a meter every 15 minutes. It is envisioned that any combination of intervals and data points may be chosen for the collection and push of stored data.

Another implementation of the intermediary device may be a server which polls the meters live data points on a schedule, and immediately pushes those data points up to the Meter Data Cloud server. It is envisioned that such a poll and push of data points may be done on a rapid schedule and would not necessarily be stored by the intermediary server, though this does not preclude the possibility of storing such points. One example may be a server, e.g., server 530, that polls the voltage, current, and power live data values from all known meters every second, and pushes those same data points to the Meter Data Cloud server 424/524 every second; when the Meter Data Cloud server receives the updated live data points, it would replace the last stored live data point, ultimately providing a live updated value to the user. Another example may be a server which pulls and pushes energy live data values from the meter every second to the Meter Data Cloud server, which would then add the energy values to a list of stored historical data points. In such an example, it is envisioned that the most recent energy data point would be used by the Meter Data Cloud server as the live value for the user.

One solution to the problem of network security may be for the intermediary server, e.g., server 530, to act as a proxy for the meters, accepting the push API requests from the meters, and sending the data up to the Meter Data Cloud server for them. It is envisioned that such a proxy, having fewer egress points from the network, would be easier to configure and manage.

In one embodiment, a proxy server may be a server to which all meters on its network send the Meter Data Cloud server API requests, and which forwards all such requests to the actual Meter Data Cloud server, e.g., server 424/524. One example may be a log data status query, which the proxy server forwards unmodified to the Meter Data Cloud server, waits for the response from the server, then forwards the response to the meter. Another example may be a voltage live data push, which the proxy server forwards to the Cloud Server, and generates an immediate response to the meter, to acknowledge its receipt.

Such a proxy server may be improved by caching information from the Meter Data Cloud server, and using that cached data when responding to the meters, rather than requiring the meter to wait on a response from the server. One example may be a log data status query, which the proxy server caches the status of for the meter, and responds to the meter's request immediately, using the cached data, instead of sending any request to the Meter Data Cloud server. Another example may be a meter settings query, which the proxy server caches the settings for that meter.

In one embodiment, an exemplary cache may be for the proxy server to read meter pushes, process their contents, and update the local cache appropriately. It is envisioned that in such a system, the proxy server would be the only route that a meters information would be updated. One example may be a meter pushing log data points to the Meter Data Cloud server, which the proxy server would read the range of data being updated, and update the cache for that data point's log information. In such an example, when the meter next requested a log data status query for that data point, the proxy server may respond to the meter with that cached data.

In another embodiment, a cache may be for the proxy server to periodically query the Meter Data Cloud server for information about the meters it tracks. One example may be for the proxy server to query the meter settings every 10 minutes from the Meter Data Cloud server, updating the cache appropriately. Another example may be when the proxy server gets a log data status query from a meter, if it has not updated the cache for that data within 10 minutes, the proxy server may query the log data status from the Meter Data Cloud server and update the cache, before responding to the meter. Another example may be after the proxy server forwards a log data point push to the Meter Data Cloud server, it queries the log data status from the Meter Data Cloud server to update the local cache.

Such a proxy server may be further improved by automatically replacing or adding parameters to the API requests of the meters being forwarded to Meter Data Cloud server. One example may be the addition of authentication information, such as the ApiKey or user security information, which would reduce the need to configure each meter with such information. Another example may be replacing the authentication information sent to the proxy server by the meter, with the authentication information required by the Meter Data Cloud server. Another example may be to replace all the timestamps in the data point push request with another format, such as converting an integer representation of milliseconds since 1970 to a string representation of time. It is envisioned that any such data type conversion may be used to enable meters and Meter Data Cloud servers with differing formats to communicate. It is also envisioned that such parameter replacement and adding may be performed on the messages going from the Meter Data Cloud server to the meter.

Such a proxy server may be further improved by changing the protocol used to push data to the Meter Data Cloud server, or wrapping the protocol in a tunnel. One example may be to change a REST based JSON data point push request from the meter, to a SOAP based XML data point push request required by the Meter Data Cloud server. Another example may be to convert a HTTP push request from the meter, to a HTTPS push request to the Meter Data Cloud server. Another example may be for the proxy server to wrap the outgoing push request inside of a VPN tunnel. It is envisioned that the proxy server would reverse the protocol conversion and tunnel wrapping going from the Meter Data Cloud server to the meter.

In a further embodiment, a proxy server may be an intermediate server, e.g., server 530, which supports all the same commands as the Meter Data Cloud server, and which replicates many of the same internal features as the Meter Data Cloud server, such as, but not limited to, storing meter data points, accepting registration of meters, allowing users to log in, and responding to meter data point requests. It is envisioned that, in addition to forwarding meter data points to the Meter Data Cloud server, such an intermediate server may act as a stand-in server for the Meter Data Cloud server, providing local access to many of the same features. For example, such a stand-in server may accept meter data point pushes, store the data points locally, and respond to meter data point queries from the local information, in addition to pushing the stored meter data points to the Meter Data Cloud server for the meter.

Such an intermediate or stand-in server may be improved by post processing the raw data points pushed by the meter. One example may be for the stand-in server to analyze the voltage data point pushed by the meter every minute, generate a maximum, minimum, and average value for a 15 minute period, and push that 15 minute value to the Meter Data Cloud server, e.g., server 424/524 for the meter. Another example may be a meter that only pushes live data point values every second to the stand-in server, and the stand-in server stores a log data point value for each of those points every 15 minutes, which it then pushes to the Meter Data Cloud server. Another example may be for the stand-in server to take the voltage and current data points pushed by the meter, generate a power data point, and push the generated power data point to the Meter Data Cloud server. Another example may be for the stand-in server to combine three system change events, such as time change events, which represent a single event in the meter, but which may not be represented as a single event in the meter's internal format.

In another embodiment, raw data points may be post processed to generate limit data points off of live data points pushed by the meters. One example may be a meter which pushes voltage live data points every second, and when the stand-in server sees a voltage value that exceeds a limit configuration, such as 140 V, the stand-in server would generate a limit data point for this event and push that event to the Meter Data Cloud server. It is envisioned that such post processing may occur at some time after the meter pushed the data points, or while the stand-in server was processing the posted data points from the meter.

Another way raw data points may be post processed may be for the stand-in server to perform actions based off detecting configured conditions. One example may be read the meter settings from the meter, after seeing a system change event indicating the meter settings were changed. Another example may be to send the command to the meter to manually capture a waveform event, when it sees voltage live data point value go over a configured limit. Another example may be to collect diagnostic information about the meter, not normally pushed to the Meter Data Cloud server, such as firmware, configuration, and internal debug information, when a system error data point is detected. Such diagnostic information may then be combined with the system error data point, and pushed to the Meter Data Cloud server.

One solution to the problem of finding and configuring meters which have difficulty pushing to the Meter Data Cloud server, is for those meters to attempt to find intermediate servers that can assist in pushing the meters data points to the Cloud Server. One implementation of intermediate server discovery may be for the meter to broadcast a service discovery request and wait for an intermediate server to respond. One example may be a meter, on discovering that it cannot contact the Meter Data Cloud server, sends a UPnP service discovery request for any server that can act as a meter data point push intermediary server, e.g., server 530. It is envisioned that such a meter would continue attempting to contact the Meter Data Cloud server, until it successfully paired with an intermediary server. Another example may be for the meter to send push service request advertisement using a custom UDP broadcast, which an intermediary server, upon receipt, would use to begin pairing with the meter. Another example may be another meter, which already knows the location of the intermediary server, or an alternate address for the Meter Data Cloud server that works better, may respond to the requesting meter with the intermediary server's location, which the requesting meter may then use to register and pair with the intermediary server. It should be appreciated that other service advertisement and discovery protocol may also be used.

Another implementation of intermediary server discovery may be for the meter to scan the local network for servers that respond to Meter Data Cloud service requests. One example may be to send a cloud server version query request to every IP address in the local network, using the configured net mask of the meter. Another example may be to ping every IP address in the local network, and only send version query requests to servers which respond to the ping.

Another implementation of intermediary server discovery may be for the server to advertise that it can act as an intermediary cloud server. One example may be an intermediary server, e.g., server 503 installed on a local network, e.g., network 516, that broadcasts a UPnP advertisement, and when a new meter is connected to the network, upon determining that it cannot connect to the Meter Data Cloud server 524, receives the service advertisement, and registers itself with the intermediary server, e.g. server 530. It should be appreciated that other service advertisement protocols may also be used.

Another implementation of intermediary server discovery may be for a local network's DNS to be configured such that all named host requests for the Meter Data Cloud server, instead of going out of the network to the real Meter Data Cloud server, e.g., server 424/524, are instead directed to the internal intermediary server. It is envisioned that in such a system, the meter would then identify the contacted server as an intermediary server through interrogation. One example may be for the Meter Data Cloud server to be known to be at http://examplecloud.com, and the local network DNS has been configured to send traffic for http://examplecloud.com to the local address 192.168.0.15, which is where the local intermediary server is installed. Such an intermediary server would be configured to contact the correct global Meter Data Cloud server.

Intermediary servers may be further improved by connecting to devices, which are not accessible via the local network via out-of-band/local protocols. Such an intermediary server may then bridge the inaccessible device onto the network. One example may be a meter which communicates via Bluetooth. Another example may be a meter which communicates via ZigBee, IEEE 802.15 and/or IEEE 802.11 commonly known as WIFI. There are many more wireless telemetry systems and these and future such wireless telemetry systems are contemplated to be within the scope of the present disclosure. Another example may be a meter isolated on a serial fiber-optic bridge, set up to restrict access to the device, and isolate it from electrical faults. In another example, another meter may be coupled to an inaccessible device to bridge the device onto the network.

Meter Data—the collection, storage, and viewing of it—is quickly becoming a major issue in the Power Industry, as more and more devices are commissioned. Meters have hundreds of channels (e.g., voltage channels, current channels, etc.), with years of data, and customers have thousands of meters, resulting in trillions of data points. Additionally, as the data for multiple meters at a location are often interconnected, it is important to be able that data in parallel, preventing it from being stored separately.

Not only do users expect to be able to access each of these data points from anywhere, with increasing emphasis on security in corporate networks, many users are losing the ability to install client software to perform specialized meter data viewing. Additionally, many networks restrict the network traffic that is allowed in and out, making it difficult for data collection software to query meter data from meters.

One solution to the problem of data storage and management may be to store the meter data points for all meters 702 on a central data server, e.g., server 424/524, accessible from the Internet. In one embodiment, an exemplary central data server 424/524 may be used by meters 702 to post data points, as well as clients (e.g., 428, 528) to request those same data points. Additionally, such a central data server 424/524 is be accessible from the Internet, and includes a web server component, it is envisioned that clients may view and configure meter data points and information from web browsers in communication with the web server component of server 424/524, without installing any dedicated client applications. Additionally, such a central data server may be composed of a single server, or a collection of coupled servers, maintenance of that server would be simplified.

In one embodiment, a central data server 424/524 may be a single physical server machine, which internally stores the multitude of meter data points on one or more data servers.

In another embodiment, a central data server 424/524 may be a loosely coupled set of servers, each providing one or more component for the operation of the central data server 424/524, and for which some servers provide duplicate and redundant functionality for other servers, but which in aggregate present as a single server to the public Internet. Such a collection of servers is typically called a Meter Data Cloud server 424/524. One example of such a Meter Data Cloud server 424/524 may be a collection of servers and components that include, but are not limited to, a Web Server to present web files, a file storage for storage of data and static web resources, a Web Service provider to accept meter pushed data points and perform dynamic interactions with clients, a database to store the meter data points uploaded, a user manager to authorize user credentials during login, and a system logger to audit user actions and monitor performance. It is envisioned that such internal servers may be any combination of physical servers or virtual servers, e.g., a single physical host running at least two servers.

Referring to FIG. 12A, in one embodiment, a Meter Data Cloud Server 424/524 may be improved by distributing the functionality of each component across multiple servers, often called Load Balancing. One implementation of Load Balancing may be to partition data based on some key, such as meter, data point, or customer, across multiple internal servers. For example, in one embodiment, Meter Data Cloud server 424/524 may include a plurality of partitioned servers 808 (e.g., partitions in the server storage of 424/524). In another embodiment, server 424/524 may represent a plurality of discrete servers, where each partition server 808 (e.g., Server A, Server B, Server C, Server n) is a separate server. In either case, pushes or requests from a client, meter, or other device (e.g., shown as request 802) for data based on that key would be routed to the appropriate server 808 by a primary server 804, called the gateway server, thus reducing the load on all servers 808. It is to be appreciated that gateway server 804 may be included in server 424/525. One example may be to use the customer as a key, where the data for the meters 702 of each customer is stored on a different internal server 808, and the gateway server 804 routes the meter data posts and queries to the appropriate internal server 808. Another example may be to use meter 702 as a key, where the data for meters 702 is distributed across multiple internal servers 808, for example 100 to a server 808. It should be appreciated that, although multiple internal servers 808 provide the functionality of the component, here being data storage, to the user requesting data, it appears as a single server 424/525.

Referring to FIG. 12B, another implementation of Load Balancing may be to store duplicate copies of data on multiple internal servers 808, and where each of the internal servers 808 notifies the others (e.g., Server A notifies Servers B, C, D, etc.) when they receive an update to their data, so that they can all remain in sync. For example, a meter 702 may post new data to the Voltage AN data point, which gets routed to Load Balanced Server A. Load Balanced Server A would then notify Load Balanced Server B and C that new data is now available, such that when a user requests data (e.g., request 802), they would get the same data, regardless of if their request was routed to Load Balanced Server A, B, or C.

Figure 12C:
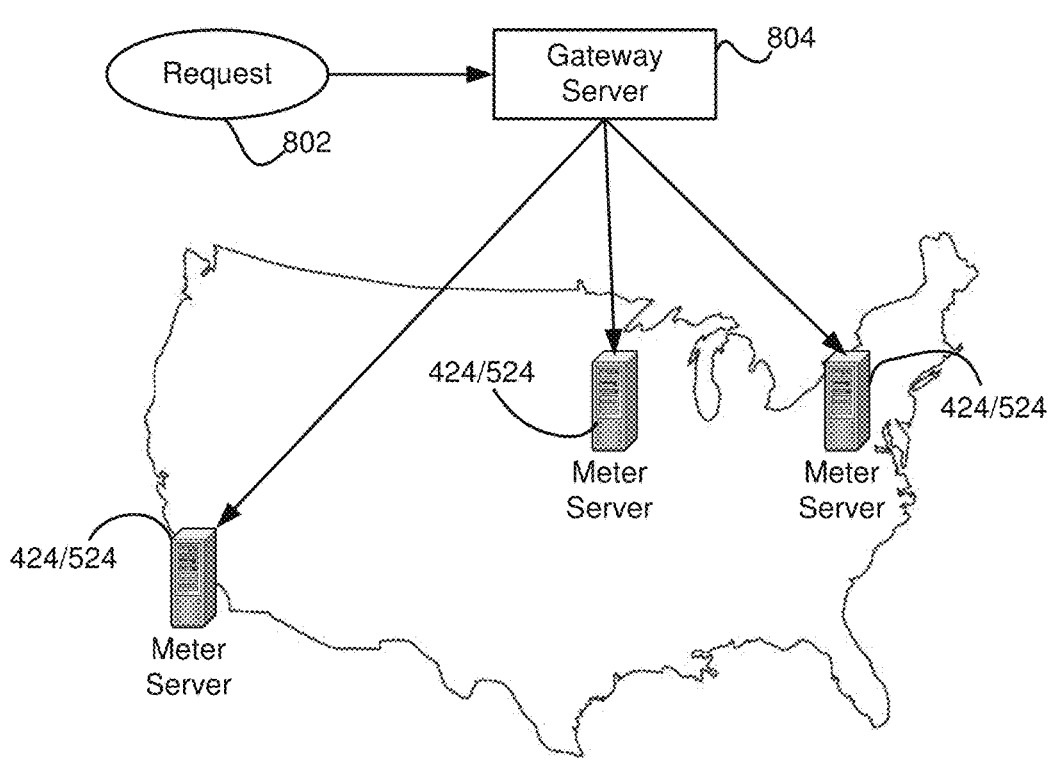
FIG. 12C illustrates load balancing of servers based on geographic location in accordance with an embodiment of the present disclosure.

Referring to FIG. 12C, another implementation of Load Balancing may be to partition data and services based off of geographical region, such that a meter 702 posting data and a user requesting data (e.g., via request 802) would be routed to the internal server 808 within server 424/525 located closest to the meter posting the data. Such Regional Load Balancing may reduce the latency of such requests 802. One example may be a North American user, which was routed to an internal server 808 within server 424/525 in the United States. Another example may be an Australian user, which was routed to an internal server 808 within server 424/525 in Australia. It is envisioned that such Regional Load Balancing may also implement other Load Balancing schemes, such as, but not limited to, partitioning based on a key, or duplication of data.

Figure 12D:
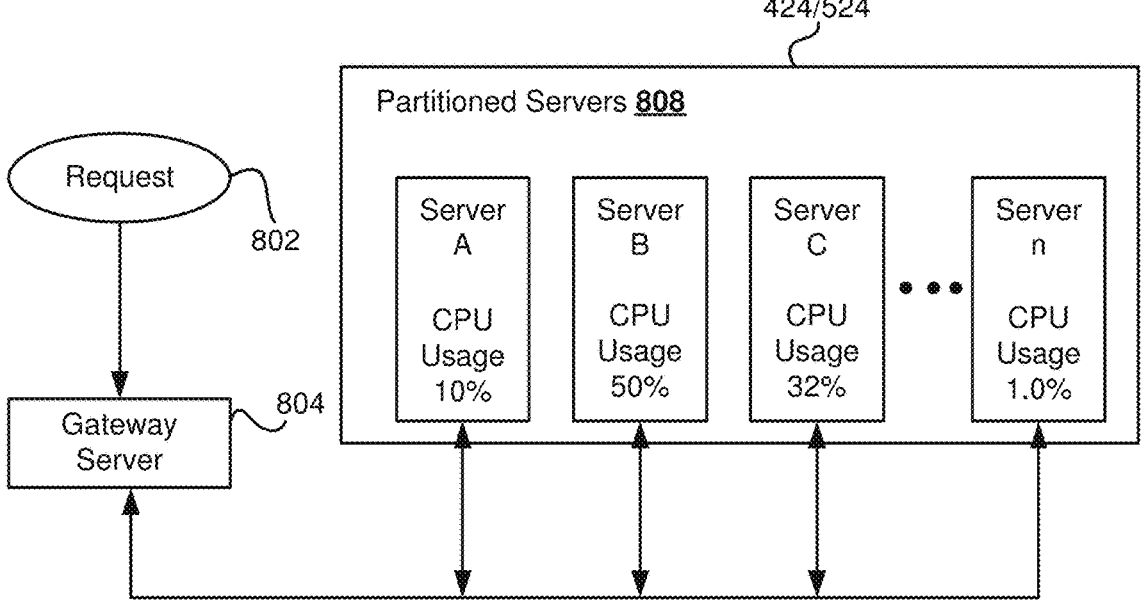
FIG. 12D illustrates dynamic load balancing of servers based on resource usage in accordance with an embodiment of the present disclosure.

Referring to FIG. 12D another implementation of Load Balancing may be for the gateway server 804 to route post and query requests 802 to the internal server 808 within server 424/525 with the least load or using the least amount of computing resources. Such Load Balancing is often called Dynamic Load Balancing. One example may be for the gateway server 804 to round robin route requests 802 to different internal servers 808. Another example may be for the gateway server 804 to measure average response times from internal servers 808, and always route requests 802 to the internal server 808 with the lowest latency. Another example may be for the gateway server 804 to measure the amount of data going in and out of each internal server 808, and route requests 802 to the internal server 808 with the lowest total throughput. Another example may for each internal server 808 to provide performance metrics, such as, but not limited to, total CPU usage, total memory usage, storage space available, data 1/O throughput to gateway server 804, which the gateway server 804 can use to determine the internal server 808 with the least load. It is envisioned that Dynamic Load Balancing may be applied to any service component, including the web server, web services, data storage, databases, or even the gateway service itself.

Such Load Balancing may be improved by adding or removing internal servers 808 as conditions change. One example may be for additional internal database servers 808 to be added when the number of meters 702 registered with the Meter Data Cloud server 424/524 exceed the space already allocated. Another example may be for additional web service processing internal servers 808 to be added when the average latency across all such servers 808 is too high. Another example may be to reduce the number of web servers serving web pages after an extended period of low traffic. It is envisioned that such changes may be performed either as a manual action by an administrative user, or as an automatic process triggered by a monitoring component of the Meter Data Cloud server 424/524.

Another implementation of a Meter Data Cloud server may be to implement a dedicated Meter Data Cloud server 424/524 for each customer. In such a system, each Meter Data Cloud server 424/524 would have separate internal servers 808, separate gateway servers 802, separate data, separate users, and separate addresses for the Meter Data Cloud server 424/524. One example may be Customer A, which uses Cloud Server A. When a new customer, Customer B, is added to the system, a new Cloud Server B would be installed and enabled, such that Customer B may only access Cloud Server B, and Customer A may only access Cloud Server A.

In one embodiment, to overcome the problem of storing a vast multitude of meter data points is to associate (where the association is performed by server 424/524) a unique identifier which is associated with all meter information, here called a UID, i.e., unique identifier. It is envisioned that such a UID may be used to partition storage and queries for the meter data, thereby improving storage and query performance. One implementation of a UID may be to use the serial number of the meter 702, which is generated when the meter 702 is constructed. One example may be Meter A with the serial number 0123456789, and Meter B with serial number 0987654321. When Meter A posts data to the Meter Data Cloud server 424/524, a processor and/or communication module of the meter 702 sends the UID A along with the data, which the Meter Data Cloud server 424/524 may use to store the data in a database dedicated to Meter A. Similarly, when a processor and/or communication module of Meter B posts data to the Meter Data Cloud server 424/524, UID B would be used to store the data. Then, when a user requests the data for Meter A, the user would use UID A, and the Cloud Server 424/524 would only access and return the data for Meter A, and not Meter B.

Another implementation of a UID may be for the Meter Data Cloud server 424/524 to generate a new UID for each meter 702 that is registered with the Meter Data Cloud server 424/524. One example may be when a processor and/or communication module of Meter A, with serial number 0123456789, registers with the Meter Data Cloud server 424/524, the Cloud Server 424/524 generates UID {C7609EC5-C5BA-4D22-ABDC-B940AB4COBA6}, which is returned to Meter A for subsequent data point posts. It is envisioned that such a Meter Data Cloud server 424/524 is configured to provide a service to correlate meters 702 by designation, serial, and generated UID.

Such a UID may be improved by allowing the physical meter 702, and thus the serial number, associated with the UID to be changed. When server 424/524 presents data to the user, the presentation is configured to have the appearance of continuity, even though the physical meter 702 associated with that UID has changed. One example may be Meter A1, which uses UID A, and has uploaded data for all of the year 2017. At the end of 2017, when Meter A1 fails, and must be replaced with Meter A2, Meter A2 is programmed with UID A, and the configuration of Meter A is changed in the Cloud Server 424/524 to indicate that it is using a new physical meter. Meter A2 then uploads data for 2018 to UID A, and to the user querying data for Meter A, it appears as if Meter A has continuous data for 2017 and 2018.

Such a UID may be extended to be used for all objects in the Meter Data Cloud server 424/524, including Customers, Users, as well as Meters 702. One example may be for User A, associated with Customer A, to be given UID A {F5AD170F-AD83-4343-B40B-202D852AA2F3}, and User B, also associated with Customer A, to be given UID B {F47CCF15-A907-4A37-831A-AE7A1227EC0B}. In such an example, server 424/524 is configured such that User A would only be able to access the information associated with UID A, and User B would only be able to access the information associated with UID B, and both would be able to access information associated with Customer A, which has UID C {527D2640-48EE-4A3F-A0B1-53E2AB09EA09}. Server 424/524 is configured such that neither User A, nor User B would have access to information associated with Customer B, which has UID D {C90662B3-7187-4252-AEAD-B32D277D1FF1}.

In one embodiment, the UID may restrict what data a user can query. Such UID's may be improved by configuring server 424/524 to associate UID's with each other, thereby allowing UID's that are associated to access each others data. One example may be for User A to be associated with Customer A, and Customer A to be associated with Meter A, B, and C, whereby User A would have access to Meter A, B, and C's data. Another example may be for User B and User C to be associated with Customer B, and User B to be associated with Meter D, E, and F. In such an example User B would have access to Meter D, E, and F, but not to User C.

Such associated UID's may be improved by configuring server 424/524 such that associated UID's are blocked for certain other UID's, i.e., meter access may be assigned or restricted to users that might otherwise have access. It is envisioned that such blocked UID's may be used by server 424/524 to prevent users from accessing meters 702 which they otherwise might have access. One example may be User A, which is associated with Customer A, which is associated with Meters A, B and C. However, association with Meter A and C has been blocked by server 424/524 for User A, and thus User A can only access Meter B.

Such UID's may be improved by configured server 424/524 to enable UID's to be changed, without affecting the continuity of data stored in server 424/524 for that object. It is envisioned that such a change may be used by server 424/524 to prevent access by a rogue device or user, which has gained access to the UID. One example may be Meter A, with UID A1; when UID A1 is hijacked by a rogue device, the user generates UID A2 for Meter A, associating all of Meter A's data in the database with the new UID A2, and reconfigures Meter A to use the UID.

Such a Meter Data Cloud server 424/524 may be improved by allowing multiple types of client applications to use and view the meter data points collected by the Meter Data Cloud server 424/524. In one embodiment, multiple client applications may host multiple web servers with the Meter Data Cloud server 424/524, each providing different functionality to the user. One example may be a web server that provides a log viewer for viewing the meter historical data points. Another example may be a web server that generates and displays location reports to the user, such as, but not limited to, energy usage aggregations, fault reports, EN51060 reports, waveform graphs and monthly data summaries. Another example may be a web server that allows the user to configure and generate energy or other commodity usage bill reports for the data collected by selected meters 702. This allows the system to generate usage bill and/or reports on the energy or other commodity usage at each circuit being measured. Another example may be a web server that provides data query and analysis summary files for other applications that wish to consume and use the meter data.

It is envisioned that the web server could also display other critical data like meter failures, system events, meter failure data tampering attempts or other types of critical data about not only the circuit but the health or tampering attempts of the meter. The system can also bring back data regarding other types of data. This data can include pictures of tampering attempts wherein the meter takes a picture and send that data to the web server direct or through the gateway. This provides more advanced security in that the meter photographs images of a password fail attempts. The system can also be used to transmit video up to the web server to allow the energy management system to operate as a security system. Additional capabilities may include the ability to look at infrared temperatures of equipment and use that data to send up temperature of system apparatus.

Additionally, the above information can be combined to provide a comprehensive view of a circuit and a facility. Thus, infrared apparatus temperatures combined with ambient temperatures, load and other circuit characteristics to provide a complete picture of the electrical circuit above and beyond the traditional electrical a parameters.

In another embodiment, multiple client applications may be web servers hosted on other Meter Data Cloud servers 424/524, or on individual servers, that access the meter data through web services provided by the Meter Data Cloud server 424/524. One example may be Client Application A, which generates reports, and Client Application B, which provides a data viewer, both of which query the data from the single Meter Data Cloud server 424/524.

In a further embodiment, multiple client applications may be individual applications installed on a computer or phone, that access the meter data through web services provided by the Meter Data Cloud server 424/524. One example may be Client Application A, which displays meter data on a phone, and Client Application B, which displays meter data on a PC, both of which query the data from the single Meter Data Cloud server 424/524.

In one embodiment, as will be described in greater detail below, a Meter Data Cloud server 424/524 may be improved by including a service that analyzes the data points stored for a multitude of meters, and determines trends and predictions about the conditions of the data and meters, based off that data. Such analysis is often called the training phase of Machine Learning. It is envisioned that such a Machine Learning service may then be applied by server 424/524 to new data points being posted to the Meter Data Cloud server 424/524, using the analysis generated previously, to provide predictions about the condition of unrelated data and meters. One example may be analyzing the measured data points by meters 702 to identify the conditions that occur right before a fault on the power grid. Another example may be analyzing the energy usage for an entire year, correlated to the weather information, to estimate the usage for any particular meter in the near future.

As meters have hundreds of channels, with years of data, and customers have thousands of meters, this can result in trillions of data points. With that many points, not only is there a speed problem searching and querying data, but storing the data can become prohibitively expensive.

One solution to the storage of a vast multitude of data points is to optimize the method of storage for time series data. Time series data is data points which are associated with a particular time, where each time point is greater than the previous time point, and for which the time the data point occurs is significant. One example of time series data is a historical log of Voltage AN, where the data point is recorded every 15 minutes. Another example of time series data is a Power Quality log, where each record occurs later in time then the previous record.

One implementation of a time series optimization may be to use a non Structure Query Language (SQL) (NoSQL) database specifically designed for time series data, such as InfluxDB, Graphite, RRDtool, or eXtremeDB.

Another implementation of a time series optimization may be to use a fixed layout table in a conventional database, i.e., fixed table SQL Db, such as PostGreSQL, MySQL, MariaDb, SQLServer, or Oracle Db. A fixed layout table is one in which all the data points are known beforehand, and the table is specifically constructed to match the known data points. Additionally, a single timestamp is associated with each collection of data points at any particular point in time. One example may be a system where the only data points recorded are Voltage AN, Voltage BN, Voltage CN, Current A, Current B, and Current C, and each of those points are known to occur at the same time. In such a system, a fixed table which associates a timestamp with the six channels may be constructed, which would minimize the impact of the timestamp on inserts, queries, and storage.

Another implementation of a time series optimization may be to use an indexed table for each data point series being stored, e.g., table channels, where indexed tables are database tables for which one or more of the fields in the table are tracked, such that a search for any particular value does not need to look at every record in the table. One example of an indexed data point table may be a table which only stores Voltage AN data point values, for all meters, wherein the index is applied to the meter key and timestamps within the table. Another example may be a table which only stores data points for Meter A, for all data points, wherein the index is applied to the channel id and timestamps within the table. Another example may be a table which only stores Watt Received values for Meter A, wherein the index is applied to the timestamps within the table. It should be appreciated that in such an implementation, a multitude of tables would be used to cover all the data points and meters required to be stored in the database.

Another implementation of a time series optimization may be to use a custom data file that stores the value of the data point to be recorded at an offset in the file that represents the timestamp of the data point record. Such a file is here called a Positional Encoded Timestamp file. One example may be a file that stores Voltage AN for Meter A as double values for a day, where each sequential position in the file represents one second within that day. Another example may be a file that stores Current A, Current B, and Current C for Meter B as a cluster of double values for a year, where each sequential position in the file represents 15 minutes within that year. It is envisioned that querying a range of values from such a file would only require computing the file offset as $(((time\_search-file\_time\_start)/store\_interval)*datapoint\_storage\_size)$. It is envisioned that such a file may be stored on a file system, or as a blob in a database entry.

In a further embodiment, a time series optimization may be to split database tables based off ranges of key values, such that internally the values are stored in separate locations, improving storage distribution and search speeds, but that a consistent table view is presented to the client querying data. Such a split in tables is often called Sharding. One example may be to split data tables up by year, such that any one query would only need to search one year worth of data. Another example may be to split data tables up by data point. Another example may be to split data tables up my meter. While sharding may be implemented transparent to the client querying data, it should be appreciated that it may also be implemented such that the client would have to query an explicitly different table to find the requested data.

Another solution to the problem of data storage is to compress the data stored, reducing the amount of space it takes up in total. In one embodiment, a common lossless compression algorithm is employed, such as DEFLATE or the variants of LZ, and compress the data in each record. One example may be a SQL table that stores data point records as a pair of timestamp and binary blob, where the blob contains a compressed array of doubles, where each entry in the array represents a different data point being stored. Another example may be a waveform event data point, where the waveform samples array associated with the event is compressed before being stored.

In another embodiment, the compression may be to compress the entire table or file used to store the data points, using common lossless compression algorithms. One example may be to compress the Voltage AN data point table for Meter A. Another example may be to compress the Watt-Hour Delivered positional encoded timestamp file for 2017/11/05 for Meter B, on 2017/11/06.

Another implementation of compression may be to use contextual replacement based encoding for each data point. One example may be to encode frequency as a single byte, which has a value from 0 to 255, instead of a double, which is 8 times as large, by storing the frequency as a value from 58.80 Hz to 61.20 Hz, where each value in the byte represents 0.01 Hz. Another example may be to store voltage as a single byte, by storing the value as the change from the previous record value, where each value in the byte represents 0.01 V.

In one embodiment, the problem of data storage is overcome by down sampling the data stored, i.e., reducing the actual number of records stored. One implementation of down sampling may be to reduce the number of values stored to a minimum interval. One example may be a Voltage AN data point, stored every minute, may be reduced to only keep every 15 minute value. Another example may be an Interval Watt-Hour data point, stored every 15 minutes, may be reduced to only keep a value every hour, where that value is the sum of the 15 minute data point values during that hour. Another example may be a Power Quality data point that only allows 20 events in a single day, and any event that occurs after that limit is reached is discarded. Another example may be a Waveform data point that only allows 2 events in a single minute, with a maximum of 20 events in a single day, and any event that occurs after either of those limits is reached is discarded. Another example may be to only allow a maximum waveform sample resolution of 256 samples per cycle, and to down sample the waveform samples of any waveform event which exceeds this resolution. Another example may be a Waveform Event, which down samples the sampling rate of the samples, based on the amount of harmonic noise detected within the waveform, where more noise allows a higher sampling rate, and less noise forces a lower sampling rate. It is envisioned that such down sampling may be performed by the device posting the data (e.g., a meter, IED, etc.), by the server receiving the data, by the service storing the data, or by a process at a later date, after the data has been stored at full resolution.

Down sampling may be improved by having variable down sampling rules over time, such that the newest data has the most resolution, and the oldest data has the least resolution. One example may be to allow the Voltage AN data point to be stored at up to a one second interval for the current week, a one minute interval for the last month, a 15 minute interval for the last year, and a one hour interval for the previous years. Another example may be for Power Quality data points to allow any number of events for the last month, and before that, to only retain one event per day, with the greatest magnitude and duration.

Another solution to the problem of data storage is to move old data, that users do not have a need to view as frequently, to a secondary data storage, here called Cold Storage, such that the recent data, here called Live data, is responsive to user requests. In one embodiment, Cold Storage may be a second database, with the same format as the primary database, that is used to store old data points, where the server has a process that moves data over a certain age limit to the Cold Storage. One example may be for the server to insert the last month of data point records to the Cold Storage at the end of the month, and delete those same data point records from the Live Storage.

Another implementation of Cold Storage may be to use a second database, in a different format from the primary database, where the format is optimized to reduce storage space. One example may be to use a position encoded timestamp file that is compressed, for each month of data older than 1 month. Another example may be to combine all the data points for a day into a structure array, convert that to a byte array, compress that array, and store that compressed blob as an entry in the Cold Storage database.

Another implementation of Cold Storage may be to use a second database, where the data points are down sampled when they are transferred to the Cold Storage. One example may be a Voltage AN data point, which is down sampled to every 15 minutes when transferred. Another example may be an Interval Watt-Hour data point, which is summed and down sampled to every hour when transferred.

Another implementation of Cold Storage may be to analyze and store an overview of the data points being transferred. One example may be when a 15 minute Voltage AN data point is transferred to Cold Storage, the max, min, and average value for the day may be stored instead of any single value. Another example may be for the count of Current A 3rd order Harmonic values which exceed 3% in a day to be stored. Another example may be to collect the magnitude of Power Quality events that occurred in a month into bins, such as 0% to 10% of fullscale, 10% to 20%, etc. It is envisioned that such analyzed values may also be stored in the Live Storage, in addition to the regular data points.

Another implementation of Cold Storage may be to transfer all the data for a meter which has been disabled or removed to Cold Storage, and restore it to Live Storage when that meter is re-enabled. One example may be Meter A, which has 2 years of Voltage AN, Waveform, and Power Quality data points. When Meter A is disabled, all data associated with Meter A is transferred to Cold Storage, and when that meter is re-enabled, all data associated with Meter A in Cold Storage is transferred to Live Storage.

Cold Storage may be improved by using a storage medium which prioritizes low cost and maximum size, over speed. It should be appreciated however that low speed is not a requirement, only an acceptable condition. One example of cheap storage may be to use low RPM hard drives, such as a hard disk drive (HHD), for Cold Storage, and a fast solid state drive (SSD) for Live Storage. Another example of cheap storage may be to use a disk backup tape for the Cold Storage. Another example of cheap storage may be to use a write once storage media, such as CD, DVD, or Blue Ray disk.

Cold Storage may be improved by automatically loading the Cold Storage data into the Live Storage when the server detects that a client is requesting the data covered by the Cold Storage. It is envisioned that this would simplify data requests, such that they would only need to ever request data from the Live Storage. One example may be a request for Voltage AN values for two years ago, which have been transferred to Cold Storage, and which are transferred to Live Storage when that data is requested.

Another solution to the problem of data storage is to copy recent data, frequently accessed data, and static data, to very fast locations, often called Hot Storage, such that requests for such data respond as fast as possible. One example may be current live Voltage AN data point for Meter A, which represents the Voltage AN value that Meter A is reading at that moment. Another example may be the settings for Meter A, such as serial number and meter designation, which are frequently requested, but rarely change. Another example may be the Current B data point values for the last 15 minutes.

One implementation of Hot Storage may be to use database tables which only contain the recent, frequently accessed, and static data. It is envisioned that by storing a limited sub-set of the total data queryable, higher performance would be achieved. One example may be to only store the last 15 minutes of Voltage AN data points in the Voltage AN Hot Table, and to delete any value over 15 minutes. Another example may be to store the current values of all data points for Meter A in a single table, where each data point value is replaced as a new value comes in. Another example may be to use a positional encoded timestamp file, where the positional encoding is a circular buffer of the last 15 minutes, and the values are replaced in the file. Another example may be to use a database table which has positions for the last 15 minutes, and that cycles through updating those positions, rather than inserting and deleting records. It should be appreciated that the data stored in such Hot Storage tables are copies of the data stored in the regular Live Storage tables.

Another implementation of Hot Storage includes using prebuilt responses to common requests, such that the data storage would not need to be queried at all, and the response may be sent as is, or with little modification. One example may be that meter settings for Meter A may be stored in a JSON file, such that any request for that data just send that prebuilt file in response. Another example may be that the information about the data points stored, such as a list of registered data points and the time range of that data, may be exported to a prebuilt JSON file to use for any requests.

Another implementation of Hot Storage may be to include a memory cache of values, such that read and write times are as short as possible. One example may be to store all the current readings for a meter in structure in memory, and that memory structure may be used whenever a user queries the current readings from the server. Another example may be to store a positional encoded timestamp file for the current day in memory, as well as storing it in a database. Another example may be to store live analysis values, such as, but not limited to, max, min, average, sum, harmonic frequency analysis, thd, or cost, in memory, and to allow the user to query these computed data points, even though they are not stored in the database.

Another implementation of a cache may be to use a distributed cache system, such as, but not limited to, Memcached, Redis, or Couchbase, to cache any value that the server sees requested frequently. One example may be a set of data points for Meter A for the month of March, which the server sees has been requested twice in a single minute, may be stored in the cache, to be queried directly until that cache value expires. Another example may be two distributed cache servers, Cache A, and Cache B, which is stored with Server A, where Cache A is closer to the requesting User A then the main Server A. In such a system, Cache A may cache responses to User A, so that when User B requests data, Cache A would already have the data ready to respond, and the request would not need to go to Server A. In such a system, Cache B would provide caching for requests from Cache A, and for users closer to Server A then Cache A.

It is to be appreciated that the data may be stored based on locality of time, e.g., where a customer, meter, or server is located, or stored based on UTC time.

One solution to the problem of managing a multitude of meters 702 is for all communications with, and configuration of, the meter 702 to be done by leaving a message on the Meter Data Cloud server 424/524, which a processor and/or communication device of the meter 702 periodically queries, and either performs the requested action, or posts the requested response back to the server 424/524. For the purposes of the present disclosure such a protocol will be referred to as a Server Hosted Command Protocol. It is envisioned that with such a protocol, meters 702 may have dynamic IP addresses, and no user would need to detect that address to communicate with the meter 702.

Figure 13A:
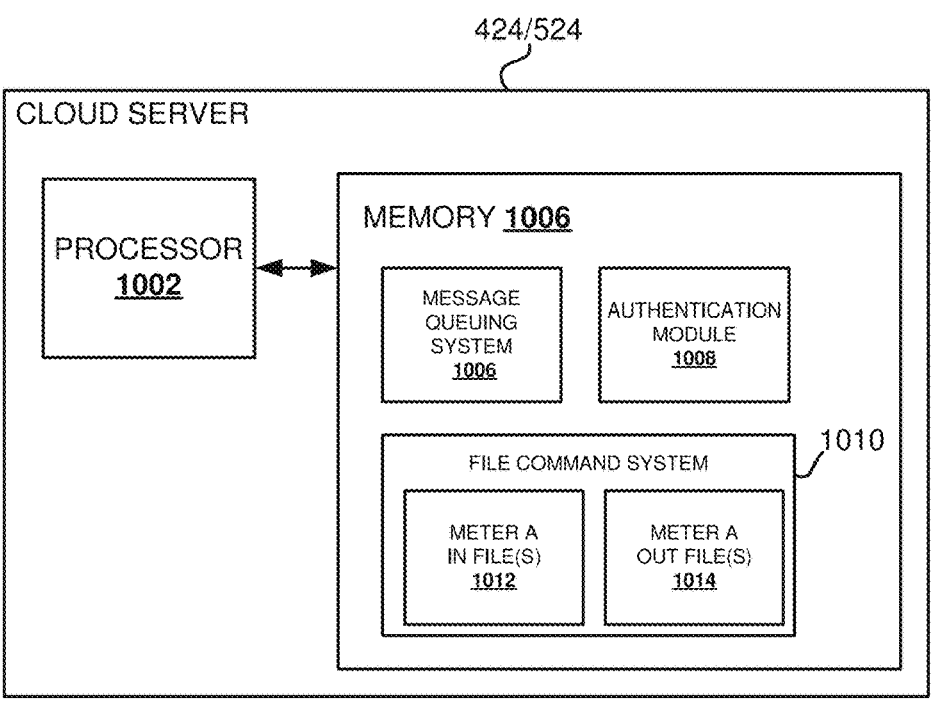
FIG. 13A is a block diagram of a server implementing a Server Hosted Command Protocol in accordance with an embodiment of the present disclosure.
Figure 13B:
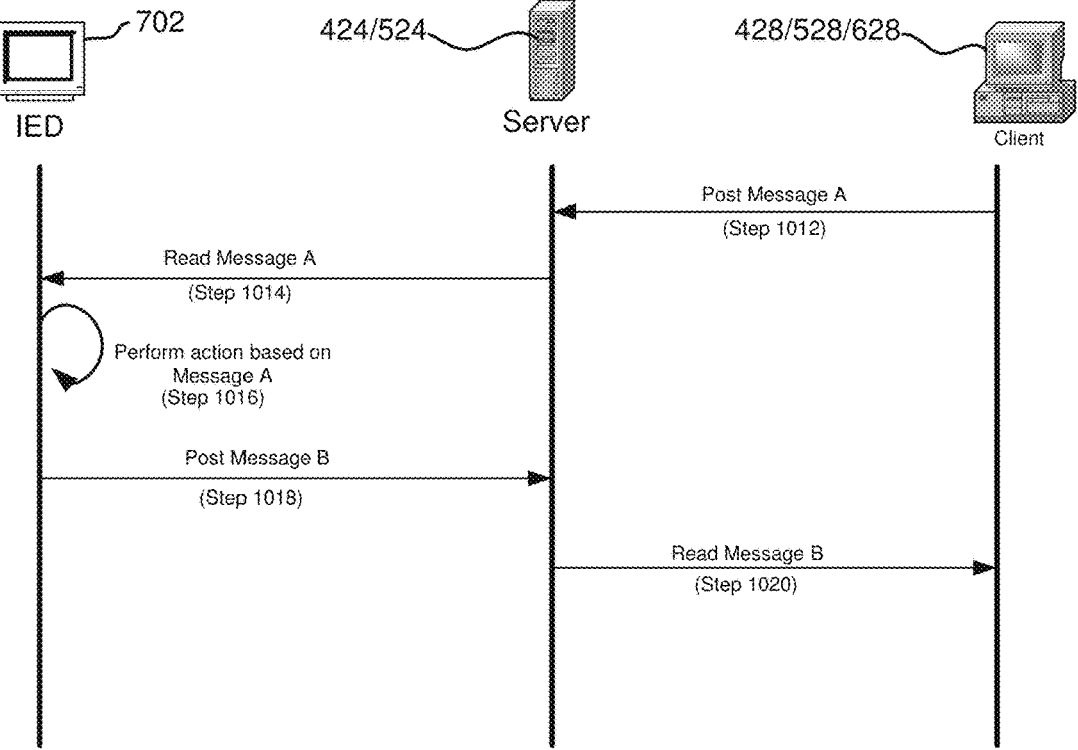
FIG. 13B illustrates server hosted command protocol exchanges in accordance with an embodiment of the present disclosure.

Referring to FIG. 13A, an embodiment of Cloud Server 424/524 is shown implementing a Server Hosted Command Protocol. As shown in FIG. 13A, server 424/524 includes at least one processor 1002 and at least one memory 1006. A message queuing system 1006, authentication module 1008, and file command system 1010 may be stored in memory 1004 and executed by processor 1002. In one implementation of a Server Hosted Command Protocol, Meter Data Cloud server 424/524 uses a message queueing system 1006, such as, but not limited to, Advanced Message Queuing Protocol (AMPQ), Message Queuing Telemetry Transport (MQTT), Rabbit Message Queuing (RabbitMQ), or a custom HTTP web service, wherein a processor and/or communication device of the meter 702 periodically queries the message queue 1006 for new commands and data requests, and a user posts requests into the queue 1006. In such a system, the meter 702 would respond to the user by posting a message to the queue 1006 for the user. Referring to FIG. 13B, one example may be a meter's programmable settings may be updated by User A (e.g., client 428/528/628) posting Message A, which contains the settings to be changed, along with the update programmable settings command, to the Message Queue A 1006 on server 424/524, (step 1012). In step 1014, a processor and/or communication module of the Meter A would read Message A, and update Meter A's settings, or perform any other action based on Message A, in step 1014. After updating Meter A's settings, the processor or communication module of Meter A, e.g., IED 702, would post success with Message B to Message Queue A, in step 1018. User A would subsequently read Message B to be notify that the updating of Meter A's settings were successful, in step 1020. It is to be appreciated that in such a queuing system, the user or the server writes a command, e.g., as a message, to a message queue. This may occur automatically (e.g., the server detecting an event on a meter), or at a user's action (e.g., a user requests a reset). No command is sent to the meter. Instead, the meter queries the server periodically for any messages for the meter in the message queue, i.e., the server never tells the meter it has a message, it only responds when the meter requests if it has any messages. In one embodiment, the message sent to the message queue includes a special command, e.g., a reset, update, etc., where the meter and/or server would need to parse from the message. In certain embodiments, the meter and/or server may have at least one additional processor to parse the command from the message.

Another example may be to send Message C, which contains a Modbus TCP message for a processor of Meter A to process and generate a response to. In this example, since the message includes a Modbus TCP message/command, the meter may interpret the message using a built-in Modbus engine.

Another implementation of a Server Hosted Command Protocol may be for the Meter Data Cloud server 424/524 to store commands to and from the meter 702 in files on the server 424/524 using a file command system 1010, which users and meters 702 may read and post to exchange information. One example may be an arrangement where each meter 702 has an "in" file stored in a corresponding database 1012, which users post messages to, to send messages to via communication with server 424/524 the meter 702, and an "out" file stored in a corresponding database 1014, which meters 702 post messages to via communication with server 424/524, to send responses to the user. It is to be appreciated that is this example, the queue is a file system rather than a queuing software as described above.

A Server Hosted Command Protocol may be improved by requiring that the server, often called the Command and Control, or CnC, server, be strongly authenticated before any commands are executed, and prove that the server is a legitimate CnC server. It is envisioned that such authentication may prevent malicious servers, pretending to be the CnC server, from erroneously executing commands on the meter. One example may be for the meter to require the CnC server to provide an authorized Digital Certificate stored in authentication module 1008, before executing any commands. Another example may be for the meter to perform a handshake with the CnC server, such as requesting files in a particular order. It is to be appreciated that the authentication module 1008 may perform various methods of either authenticating the meter or authenticating itself to a meter.

By collecting large amounts of data related to a single meter and/or to a large plurality of meters (e.g., a plurality of meters disposed in a particular geographic location, a particular building, a facility or even worldwide), automated data analysis may be performed to generate meter condition and trend predictions. In one embodiment of automated data analysis, a system with an algorithm is provided with a set of known data, often called a training set, which the algorithm analyzes to provide an optimal or correct solution, often called learning from the data. Such an algorithm, using the learned solution, is then applied to a set of data novel to the algorithm, to determine how well the new data matches with the known data, and to predict new information about that data set. For the purposes of the present disclosure, such a system will be referred to as a machine learning algorithm or artificial intelligence (AI). One example may be video system where the algorithm is trained with images of birds, and then applied to a video feed to notify a user whenever a bird is detected near a particular device, such as a power line, and ignore non-bird objects near the device, such as a floating piece of paper. It should be appreciated that such detection does not perform an exact pixel match between images; however, in certain embodiments the detection does perform a pixel match.

Figure 14:
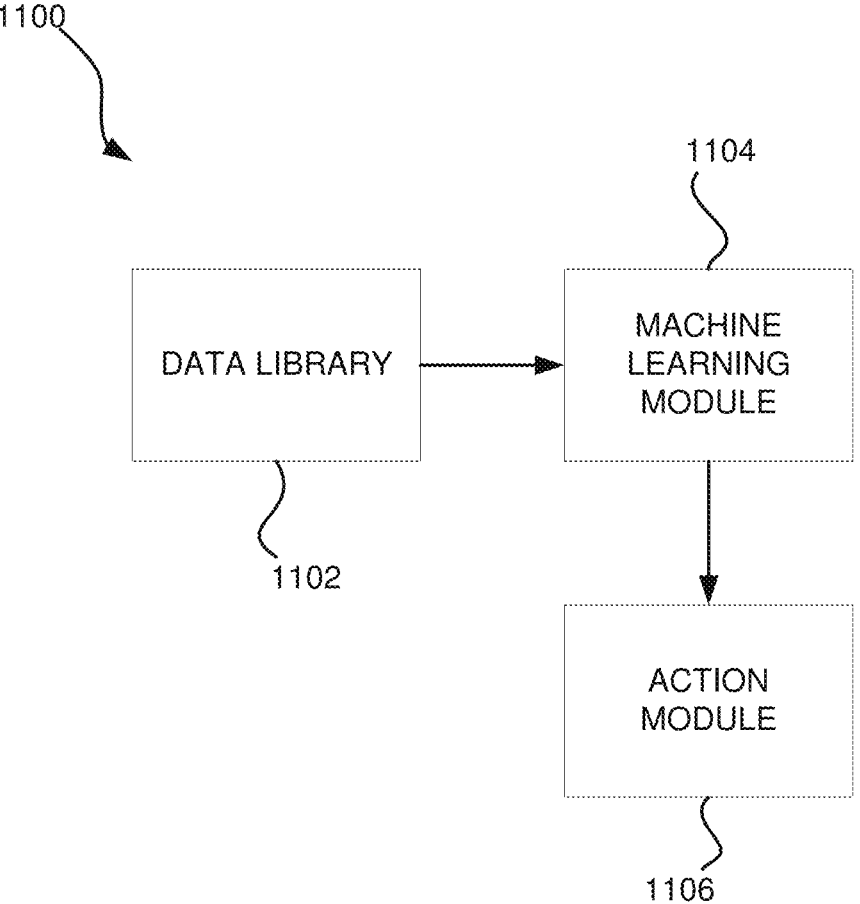
FIG. 14 illustrates a machine learning and analysis system in accordance with an embodiment of the present disclosure.

In the context of the present disclosure, the machine learning algorithm and automated data analysis may be implemented in a system 1100 shown in FIG. 14, also known as an artificial intelligence (AI) system. System 1100 includes a data library 1102 for storing data samples, machine learning module 1104 for executing one or more machine learning algorithms or functions on data samples received from library 1102 and outputting a prediction and/or recommendation based on the received samples, and an action module 1106 for receiving the output (e.g., predictions and/or recommendations) from machine learning module 1104 and performing an action based on the output. It is to be appreciated one or more components of system 1100 may be implemented in any of the IEDs described above, where data library 1102 may be incorporated in one or more memories of the IED and modules 1104, 1106 may be software (e.g., stored on one or more memories of the IED) executed by one or more processors of the IED. Alternatively, one or more components of system 1100 may further be incorporated in one or more servers, e.g., servers 424, 426, 524, 530, 628, 630, and/or the Meter Data Cloud server, described above. The server incorporating system 1100 may be in communication with one or more IEDs via an internal network or an external network. In this way, actions performed by module 1106 based on inputs from module 1104 may include communication signals (including alerts, notifications, control signals for controlling one or more IEDs or components coupled to the IEDs, and/or any other types of communications) via networks 422, 522, 622, 416, 516, 616. It is to be appreciated that the data in data library 1102 may be received from Meter Data cloud server, one or more IEDs, or any other sources. In one embodiment, each of the IEDs may provide various data to a server including library 1102, such as server 424, 524, etc. In another embodiment, various data may be collected from each of the IEDs by an aggregator, such as server 630, 630, and then provided to a server such as servers 424, 524 including system 1100.

One machine learning algorithm that may be used by module 1104 is one which takes a set of input values from library 1102, transfers those values though a connected graph of nodes, here called a network, where each node applies a summation function between its inputs, and applies a weighting function on the output, to generate a set of output values to be provided to action module 1102. In such a network, during the training phase, the value of the weighting function is adjusted to make the known input set match the known output set. Such an algorithm is often called an Artificial Neural Network, or ANN. One example of an Artificial Neural Network may be a set of 7 inputs provided to module 1104 by library 1102, which include 3 voltage phases, 3 current phases, and frequency readings, an interior network of 20 connected nodes, and a single output value outputted by module 1104 that gives the noise on a power distribution system monitored. If the noise distribution is above a predetermined threshold, action module 1106 may send a communication signal to one or more clients indicating the noise distribution. It is to be appreciated that the communication signal may be, but is not limited to, an e-mail, a text message, a tweet, etc. Another example may be a set of 60 voltage inputs received from library 1102, one for each minute in the previous hour, and two output values outputted by module 1104, one that predicts the likelihood of a fault in the next 10 minutes, and the other the magnitude of the fault. If the likelihood of the fault is above a predetermined threshold and/or the predicted magnitude is above a predetermined threshold, action module 1106 may send a communication signal to one or more clients, e.g., via an email, text message, voice message, etc. Alternatively, the action module 1106 may send a control signal to one or more IEDs and/or control devices to turn off or shut down at least one load that is associated to a location of the fault. In certain embodiments, the action module 1106 may send the communication signal and control signal substantially simultaneously to alert the user of the client of the shutdown. Alternatively, the communication signal may be sent first with a predetermined time delay before sending the control signal, so a user may have the predetermined time to rectify the fault before the shutdown of equipment.

Another algorithm that may be used by module 1104 is one that applies a second algorithm to compute the error contribution of each node in an Artificial Neural Network, often called the loss function, and then applies the determined loss function to adjust the weighting function of each node. Such an algorithm is often called a Backpropagation, and can be used by module 1104 to adjust the network to find the local optimal solution to an input-output problem.

Another algorithm that may be used by module 1104 is one that layers Artificial Neural Networks together, such that the set of outputs from one layer are the inputs to the next layer, with one or more layer between the initial input and final output, often called hidden layers, and that each layer can be trained individually to improve the overall performance. Such a layering of networks will be referred to as a Deep Learning, or a Deep Neural Network. One example may be a network where the first layer is trained to classify noise introduced into a power line from an input set of harmonics, which is fed into a second layer that identifies possible sources of such noises, which is fed into a third layer that identifies the most likely source. Some exemplary sources may be noise of natural origins (electrostatic interference and electrical storms), electromagnetic interference (e.g., from currents in cables along the power distribution system), radio frequency interference (e.g., from radio system radiating signals which interact with eh power distribution system), and/or devices which produce spike in voltage, current, or harmonics (e.g., large electrical motors being switch on, lighting circuits, converters or drive systems, etc.). If the level of noise is above a predetermined threshold, action module 1106 may send a communication signal to one or more client devices indicating the source of the noise and that action may need to be taken. If the source of the noise is a device, action module 1106 may send a control signal to the device or a device (e.g., an IED) the controls the noise generating device to turn of the noise generating device. Another example may be one that performs the same identification described above, but combines the final input with another input layer (e.g., a fourth layer) that uses the original harmonic information to identify the likelihood that that device (e.g., the device causing the noise) will fail, and in what timeframe the device will fail. The identified likelihood may be outputted by module 1104 to module 1106. If the identified likelihood is above a predetermined threshold, module 1106 send an alert (e.g., via network 422, 416, 522, 516, 622, 616) to a client (e.g., user computer, monitoring system, etc.) to identify the device likely to fail and to service and/or replace the device. Furthermore, action module 1106 may send a control signal directly to one of the IEDs or another controlling device to cause the device that is likely to fail to be shut down.

Another algorithm that may be used by module 1104 is one in which nodes in layers are only connected to the nearest, but which stack nodes in a layer to a configured depth, and in which take a small condensed output of a previous layer as input to all nodes depth-wise in the layer, but only a small segment width and breadth wise, thus giving spatial locality to the input. Such a layer will be referred to as a Convolutional Layer, and such an algorithm a Convolutional Neural Network, and would improve performance for inputs where spatial locality is significant. One example may be to use as input from library 1102 a series of waveform samples across all voltage and current channel inputs, and as output of module 1104 the probability of various causes of the waveform trigger. In such an example, the temporal nature of a series of waveform samples would benefit from the spatial arrangement of a Convolutional Neural Network, as would the temporal interconnection between the various channel inputs. Each subsequent convolution layer would identify sub-features in the waveform, and how each channel inter-relates, until a final output identification is given to action module 1106. The identified cause(s) of the waveform trigger may be communicated by action module 1106 to one or more client devices. If the identified cause can be corrected via a software update to or restart of one of the IEDs, action module 1106 may send one or more control signals to the IEDs to cause a software update or restart to correct the cause of the identified waveform trigger.

Another algorithm that may be used by module 1104 is one in which the outputs of some nodes are fed as inputs to previous layers, adjusting algorithm parameters, thereby adjusting the result over a temporal sequence of input sets during detection. Such an algorithm is often called a Recurrent Neural Network. One example may be a sequence of voltage, current, and frequency values (i.e., measured by one or more IEDs) inputted to module 1104 via library 1102 to predict what the energy usage will be in the next interval. The predication may be outputted to action module 1106 and action module 1106 may communicate the predicted energy usage to one or more clients. Action module 1106 may be configured to communicate the predicted energy usage to the one or more clients if the predicted energy usage is above a predetermined threshold. Action module 1106 may further be configured to send a control signal to a client, one or more IEDs, or a control facility, etc., to shut off one or more loads if the predicted energy usage is above the predetermined threshold. Thereafter, if the predicted energy usage falls below the predetermined threshold, action module 1106 may send a control signal to cause the loads to continue to consume power. It is to be appreciated that the predetermined threshold may be selected by any machine learning algorithm or function described herein. For example, the predetermined threshold may be based on load shedding parameters including, but not limited to, time of day, designation of equipment as essential or non-essential, real-time pricing issued by a utility, etc.

In another embodiment of a Recurrent Neural Network employed by module 1104, some components are composed of a value storage, and three functions that regulate the values input, output, and the update of the value storage. Such an arrangement may be used to augment the long term temporal retention of events input to a Recurrent Neural Network, and is often called a Long Short-Term Memory components. One example may be where module includes a Recurrent Neural Network using Long Short-Term Memory nodes to take a series of power values over the course of a predetermined time interval (e.g., a day) as input from library 1102, and use the data to predict the power conditions in the next hour. Another example may be that module 1104 takes a series of events recorded by a meter or IED as input, such as system events, or security events, over the course of the day, to detect or predict attempts at intrusion or tampering (e.g., of one or more IEDs at a facility) by a malicious user. Action module 1106 may use the detected attempts of intrusion or tampering to send one or more alerts to one or more clients indicative of the detected attempts of intrusion or tampering. Action module 1106 may further use the detected attempts of intrusion or tampering to increase a security state (e.g., require more factors of authentication at an IED or facility) to reduce the risk of intrusion or tampering until the intrusion or tampering is otherwise dealt with.

Another algorithm that may be used by module 1104 is one that starts with a set of randomized solution functions, picks the solution that best maps the input to the output, often called selection, creates a set of random changes to that solution, often called mutations, and test those solutions. This cycle of selection and mutation, which is repeated until an optimal solution to the problem is found, will be referred to as a Genetic Algorithm, or an Evolutionary Algorithm.

In addition to the various algorithms described above, the module 1104 may employ other algorithms or functions including, but not limited to, linear regression, logistic regression, linear discriminant analysis, classification and regression trees, naïve bayes, k-nearest neighbors, learning vector quantization, support vector machines, bagging and random forest, boosting and Adaboost, etc.

One set of data stored in library 1102 that may be used as input to such algorithms in module 1104 may be a meter's or IED's live readings. One example may be to use electrical parameters, such as, but not limited to, the voltage, current, and frequency channels measured by one or more meters. Another example may be to use the instantaneous power computed by one or more meters. Another example may be to use the accumulated energy or interval energy computed by one or more meters. Another example may be to use the internal temperature of each meter, measured by each meter.

Another set of data stored in library 1102 that may be used as input to such algorithms in module 1104 may be a meter's or IED's computed readings. One example may be where module 1104 uses the harmonics or THD (total harmonic distortion) readings computed by one or more meters over a time domain, from voltage, current, and frequency channels measured by the one or more meters. Another example may be where module 1104 uses the interharmonic computed by the meter or IED as input from library 1102. Another example may be where module 1104 uses the phase angle readings computed by the meter or IED.

Another set of data that may be stored in library 1102 and used as input to such algorithms in module 1104 may be external measurements which have been input into the meter or IED, either digitally, such as pulse counters, or analog, such as analog inputs. One example may be a water, gas or steam flow counter, which feeds pulses into the meter to count. Another example may be a pressure sensitive mat, motion sensor, or infrared light beam trip line, which count traffic through a door or hallway, and feed pulses into the meter to count. Another example may be a temperature probe, which converts a measured range of temperature into a defined output range of DC Voltage, which is fed into an analog input in the meter to measure.

Another set of data that may be stored in library 1102 and used as input to such algorithms in module 1104 may be a history of the live readings. One example may be a history of voltages over the last hour, with each input point a one-minute interval over that hour. Another example may be the 15 minute interval energy values over the course of a day.

Another set of data that may be stored in library 1102 and used as input to such algorithms in module 1104 may be waveform signatures of triggered events or faults occurring on the power distribution system, such as Power Quality and Digital Input events, recorded by one or more meters or IEDs. Exemplary Power Quality and Digital Inputs events may include, but are not limited to, transients such as a surge or spike, interruption of supply voltage or load current, sag or undervoltage, swell or overvoltage, waveform distortion, voltage fluctuations, etc. Based on the waveform signatures measured by the one or more IEDs and other data in library 1102 (e.g., live readings of the power distribution system measured by the one or more IED and sent to library 1102), module 1104 predicts at least one type of fault likely to occur in a predetermined future time interval and a number of predicted future occurrences of the predicted at least one type of fault in the predetermined future time interval. One example may be to store in library 1102 the time, duration, magnitude, and triggering channel and use this data as inputs to module 1104 for each event. Another example may be to store in library 1102 statistical analysis, such as max, min, average, and sum, of components of an event, such as duration, magnitude, and channel, of events which occur within a time period, such as a minute, an hour, or a day, and use this data as inputs to module 1104. Another example may be to store in library 1102 the time domain and magnitude of each event over a period, such as a minute, an hour, or a day, broken into discrete inputs in the time domain, such as seconds, minutes, or hours, as inputs to module 1104.

Another set of data that may be stored in library 1102 and used as input to such algorithms in module 1104 may be the samples of a Waveform Event recorded by each meter or IED. One example may be where module 1104 uses each sample in the recorded waveform event as a set of inputs. Another example may be where module 1104 uses the computed RMS voltage or current, over a sub-segment of the event, such as a quarter-cycle, half-cycle, or full-cycle, as a set of inputs. Another example may be where module 1104 uses the harmonics or interharmonics, computed from the samples of one or more cycles, as a set of inputs.

Another set of data that may be stored in library 1102 and used as input to such algorithms in module 1104 may be System Events recorded by the meter or IED. One example may be to store in library 1102 the time, and type of event as inputs for each event. Another example may be to store in library 1102 the count and statistical distribution of events over the course of a period of time, such as an hour, or a day, as an input set to module 1104.

In any of the examples above, each of the data stored in library 1102 and inputted to module 1104 may be used by module 1104 to make predictions and/or recommendations as to faults, energy usage, device failure, etc. and then by action module 1106 to send communications indicating the predictions and/or send control signals to a client or IED to cause a desired change (e.g., a shutoff of a component or IED, a restart, etc.) based on the predictions.

Another set of data that may be stored in library 1102 and used as inputs to such algorithms in module 1104 may be Security Logs of login and secure action attempts to a meter. One example may be where module 1102 uses the temporal sequence of successful and failed login attempts to detect intrusion attempts. When an intrusion attempt is detected, action module 1106 may send an alert to one or more clients and/or send a control signal to increase a security state (e.g., require additional points of authentication for access to an IED or facility and/or shut down an IED or facility).

Another set of data that may be stored in library 1102 and used as inputs to such algorithms in module 1104 may be an internal analysis of the meters computation. One example may be where module 1104 uses the free compute cycles of the meter, measured current, and internal temperature, to predict the likelihood that the mechanical components of the meter will fail. If the likelihood of failure is above a predetermined threshold, module 1106 may send an alert to one or more clients to replace the mechanical component. Another example may be where module 1104 uses the max, min, and mean times to perform a known function, within a period, within the meter, to analyze the efficiency of the meters firmware implementation. Module 1104 may output a value (e.g., a percentage, score, etc.) associated with the efficiency of the meters firmware implementation to action module 1106. In one embodiment, if the value is below a predetermined threshold, action module 1106 may send an indication to one or more clients (e.g., service personnel) that a meter's firmware implementation is underperforming. In another embodiment, if the value is below a predetermined threshold, action module 1106 may send a recommendation one or more clients (e.g., a users computer) to install a different firmware implementation on the meter.

Another set of data that may be stored in library 1102 and used as inputs to such algorithms in module 1104 may be the latency of communications between one or more meters and the Cloud Server (e.g., servers 424, 426, 524, 530, 630, etc.). One example may be for each meter to measure the instantaneous, average, max, and min times it takes for the Cloud Server to respond to a data point post request. These measurements are reported by each meter to the Cloud Server and stored in library 1102. Module 1104 is configured to use these inputs to assess the health of the communication network and/or the communication capability of each meter or IED, e.g., by determining or predicting network health as a percentage and/or communication capabilities of each meter as a percentage. If any of the determined percentages fall below a predetermine threshold, action module 1106 is configured to send a communication signal to one or more clients indicating that a network and/or communication capabilities of an IED requires servicing.

Another set of data that may be stored in library 1102 and used as inputs to such algorithms in module 1104 may be the network traffic to and from one or more meter. One example may be to use the source IP address and timing of requests to each meter as inputs to module 1104. Another example may be to use the total data throughput within a period of time, such as a minute, an hour, or a day, as input to module 1104. Another example may be to use a statistical analysis of the types and destinations of requests over a period of time, as input to module 1104. Module 1104 may use any of this data to determine if an issue exists with network traffic and output a value indicative of the network traffic to action module 1106. Based on the value outputted to action module 1106, module 1106 may send a communication signal to one or more client devices and/or send a control signal to one or more IEDs to correct the issue. For example, action module

1106 may, via a control signal, reboot, update, or shut down one of the IEDs to correct the network traffic issue.

Another set of data that may be stored in library 1102 and used as inputs to such algorithms in module 1104 may be live data recorded by other devices. One example may be to use weather data, such as temperature, wind speed, humidity, air pressure, and precipitation, for a particular location, requested by the Cloud Server as input to module 1104. Another example may be a pedestrian traffic counter that measures the traffic in a building, fed into the Cloud Server to be stored in library 1102 and input to module 1104. Another example may be a pulse counter on doors and windows, that measure how often they are opened, and for what durations, where the measurements of the pulse counter are stored in library 1102 and input to module 1104. Another example may be motion sensors in a building, that measure the frequency and duration of activity, where the measurements of the sensors are stored in library 1102 and input to module 1104. Another example of data that may be stored in library 1102 and used by module 1104 is the heating and cooling conditions in a building, including temperature, heating and cooling activity and duration, and boiler temperature. Another example of data that may be stored in library 1102 and used by module 1104 is the state and duration of building lights in rooms and outside the building being on.

Another set of data that may be stored in library 1102 and used as inputs to such algorithms in module 1104 may be user configured information. One example may be the geo-location of a meter or facility. Another example may be facility information, such as number of employees, number of residents, square footage of the facility, or number of rooms in the facility. Another example may be the ratings of the CTs connected to the current inputs of each meter. Another example may be an install date of peripheral hardware, such as CTs (i.e., current transformers) and PTs (i.e., potential transformers). Another example may information relative to peripheral hardware, such as rated lifespan and model of hardware. This information may be used by module 1104 to determine various correlations in making predictions and/or recommendation.

It is to be appreciated that the algorithms (or functions) stored in module 1104 may be trained using any one of various training methods, such as, but not limited to, supervise, unsupervised, q-learning, temporal difference learning, stream, etc.

One application of system 1100 may be to predict energy usage for one or more meters, locations, or facilities in the future based on data stored in library 1102 and to use action module 1106 to send communications to one or more clients communicating these predictions and/or send control signals to one or more facilities or IEDs to prevent and/or act upon one of these predictions. In one embodiment, based on data stored in library 1102, module 1104 predicts the energy usage of a location for every 15 minute interval in the next hour. In another embodiment, based on data stored in library 1102, module 1104 predicts the total energy usage and cost of a facility or building, for the next month. Action module 1106 may be configured to receive the predicted energy usages from module 1104, and if the predicted energy usages for a given future time frame (e.g., the next 15 minutes, the next day) is above a predetermined threshold, module 1106 send a notification or alert to one or more clients warning of an expected increased demand. Action module 1106 may further send a control signal to shut off or otherwise limit one or more of the loads which are predicted to cause energy consumption above the predetermined threshold. If the predicted energy usages are below a second predetermined threshold, action module 1106 may send a communication signal to one or more clients that additional energy may be consumed by a load or action module 1106 may send a control signal to cause additional energy to be consumed by a load. In this way, action module 1106 may use the predictions of module 1104 to perform load balancing across a network.

In one embodiment, the multitude of historical meter data stored in library 1102 is used to train a machine learning algorithm, or function, in module 1104, such that module 1104 can identify common energy usage types, to predict the energy usage for each of those types, and applies the trained algorithm to the live readings of each meter, thereby predicting the future energy usage. It is envisioned that such an implementation would benefit from a temporally aware algorithm, such as a Recurrent Neural Network. Action module 1106 may send an alert or notification to one or more clients if the predicted future usage is above or below a predetermined threshold and/or send one more control signals to IEDs or facilities based on the predicted future usage, as described above.

Another implementation may apply the trained algorithm to the historical readings of each meter stored in library 1102 as input to module 1104, such that each input to the algorithm in module 1104 is a historical time slice, thereby enabling module 1104 to predict the future energy usage. Thereafter, action module 1106 may send an alert, notification, and/or control signal based on the predicted future usage, as described above. One example of the time slice may be the 15 minute interval values over the last two hours, resulting in 8 inputs, and may have one output that predicts 15 minutes in the future. Another example may be the daily values for the last year, resulting in 365 inputs, and may have 96 outputs that predicts the energy usage for every 15 minutes in the next day.

Another implementation may be where module 1104 takes the outputs of other trained sets, such as one based on the historical readings (e.g., voltage, current, frequency, etc.) of meters, and one based on the live readings of the meter, along with information about the environment to predict the energy usage for a predetermined future time interval. Action module 1106 may then use the predicted energy usage to send an alert, notification, or control signal, as described above. One example may be a historical input set of meter data that is used by module 1104 to compute daily interval predictions and combine the predictions with the live readings of the meter, along with the current weather conditions, such as temperature, precipitation, and humidity, to predict the energy usage for the next day. Another example may be where module 1104 uses the historical input set of meter data, coupled with another historical input set of real time pricing for one or more locations of one or more meters, and combines it with live meter environmental conditions, to both predict energy usage for the next day, predict real time pricing costs for the next day, as well as make recommendations as to when the ideal periods within the predetermined future time interval to lower and increase usage are to reduce costs. The predictions and recommendations may be sent to one or more clients by action module 1106, where the trend prediction may be presented as a graph. Action module 1106 may further use the predictions to send one or more control signals to IEDs and/or facilities (e.g., the control signals are sent to client devices within each of the facilities having control of various loads) to turn on and off loads increase or decrease energy usage in a way that lowers cost.

Another application of machine learning system 1100 may be to use module 1104 to predict faults for one or more meters, locations, and/or facilities in the future. One example may be where module 1104 predicts the likelihood of different kinds of power quality faults in the next hour, based on trends in the live meter readings. Based on the predictions, action module 1106 may warn one or more users (e.g., via sending communication signals) when the likelihood of a fault occurring within the next minute exceeds a limit. Another example may be where action module 1106 uses the likelihood predicted by module 1104 to send a command to one or more clients, IEDs, a facility, etc. that may mitigate the fault, such as flipping a relay or other control device that temporarily disconnects the faulting line. Another example may be where action module provides the user (via one or more communication signals to the user's client device) with a way to explore the likelihood of various types of faults due to a proposed future action. For example, the user may, via a UI (e.g., UI server 426) input various proposed future actions, and module 1104 take the proposed future actions as input to predict the likelihood of various types of faults due to the proposed actions. The predicted likelihood of fault may then be communicated to the user via action module 1106. In this way, the user may test various scenarios to avoid fault occurrences.

One implementation may take as input via library 1102 to module 1104 the history of power quality events, as well as the live power quality readings of the meter. One example may be where module 1104 uses the history of power quality events, coupled with the historical readings, of various meters as training sets, then applies the temporal sequence of live readings in the prediction of events. Based on the events predicted by module 1104, actions module 1106 may send communications signals to one or more clients indicating the predicted event. Action module 1106 may also send one or more control signals to prevent the event (e.g., to an IED or a facility to shut off a component, turn off one or more loads, etc.)

Another implementation may also take as input via library 1102 to module 1104 the surrounding conditions. One example may be to store the conditions of connected wiring, CTs, PTs, and other connected hardware. It is to be appreciated that such hardware conditions may either be a value entered by a user or predicted by another algorithm. Another example may be to store the environmental conditions, such as temperature, pressure, and humidity in library 1102.

Another implementation may be to use the fault predictions made by module 1104 for individual meters as inputs to module 1104 for the fault prediction for the location that those meters are at. One example may be a tenant building, where each floor is measured by a meter, and the fault likelihood of the entire building, which is fed by the same main line, is predicted by module 1104 by using the individual floor's fault likelihood. As described above, action module 1106 may then communicate the fault likelihood by sending communication signals to clients or take action to prevent the fault likelihood by sending one or more control signals to IEDs, facilities, etc.

Another implementation may use the predicted demand for a location determined by module 1104 as one of the inputs to module 1104 for fault prediction for one or more meters. It is envisioned that a spike in demand may lead to faults, as power generators struggle to keep up with the usage. One example may be a demand spike due to a hot day, as air conditioners are turned on.

Another implementation may use the most recent fault conditions recorded by unrelated meters, that are in the same geo-location, as inputs to module 1104 for the fault prediction for one or more meters meter. It is envisioned that when faults occur in an inter-connected power grid, those faults can have cascading effects spreading from the point of failure. One example may be sag in voltage due to a power line being interrupted by a falling tree, which causes other paths in the inter-connected power grid to compensate, possibly triggering other faults. Based on the most recent fault conditions recorded by unrelated meters that are in the same geo-location, module 1104 predicts a fault for one or more meters (other than the unrelated meters) and action module sends a communication signal indicated the predicted failure of the meters and/or sends a control signal to an IED, facility, etc., to attempt to prevent the fault to the one or more meters.

Another implementation may use the historical readings and power quality events of a meter as input to module 1104 to classify which fault scenario a given meter belongs to and subsequently use the classified fault scenario to determine which fault prediction algorithm is best for that meter. It is envisioned that each meter installation would have different environmental conditions, but that these conditions would fall within limited groups of similarities, and that these environmental conditions are unlikely to change after installation. One example may be a residential meter, which is exposed to neighborhood upstream faults, such as seasonal brownouts, and simple downstream faults, such as short circuits. Another example may be a meter in a manufacturing building, which is primarily exposed to downstream faults caused by the machinery used in the manufacturing. Another example may be an office building in the neighborhood of a large energy consumer, such as a steel manufactory or super collider, which inject large amounts of noise on the upstream signal. It is to be appreciated that such lists are not meant to be exhaustive.

Another implementation may where module 1104 takes a proposed action to the meter or grid, as input from a user (e.g., inputted via a UI coupled to system 1100), along with other fault predictive inputs, and output the likelihood of that action causing a fault. The action module may provide the likelihood to a client device (e.g., including a UI used by a user to input proposed actions). In this way, a user may test proposed actions using system 1100 to predict the likelihood of a given proposed action causing a fault. One example of a proposed action may be a planned meter downtime, wherein the user disconnects the meter from the power grid, temporarily shutting off power. Another example of a proposed action may be power line service, wherein that segment of the power grid may be shut down temporarily, increasing the load on other segments.

Another application of machine learning system 1100 may be use module 1104 for the determination of the cause of faults, after they have occurred. One example may be where module 1104 determines based on data stored in library 1102 the likelihood that a fault was of any particular type, such as, but not limited to, a downstream short circuit, an upstream brownout, an upstream short circuit, upstream noise on the power line, or in-rush current caused by devices downstream. Another example may be where module 1104 determines the likelihood came from a particular source, such as, but not limited to, manufacturing loads, a power line drop out, air conditioner usage, or downstream wiring. Another example may be where module 1104 identifies where a fault might have occurred, in relation to the meters in a facility. In any of these determinations, action module 1106 may send communication signals to one or more client devices indicating the determined causes, locations, and/or likelihoods. Action module 1106 may further send control signals (e.g., software updates, restart signals, shutoff signals) to IEDs and/or facilities to correct and/or prevent the causes from occurring. In some embodiment, module 1106 sends the communication signals and/or control signals if the determined likelihood is above a predetermined threshold.

One implementation may store in library 1102 and take as input a waveform event, including the triggering channel and time, and the waveform samples recorded. One example may be a waveform event composed of 6 sample channels, Voltage AN, BN, CN, Current A, B, and C, where the trigger was a sag on Voltage BN, and the samples for Voltage BN show a dip for a couple of cycles, and a surge in the corresponding Current B samples 20 milliseconds later.

Another implementation may store in library 1102 and take as input to module 1104 waveform events from multiple devices in a similar geo-location. One example may be a set of 10 meters in a facility, which all see a fault at slightly different times, and which identify the geo-location of the fault by the time delay. Another example may be a set of 20 meters in a residential neighborhood, which are used together to refine the likelihood of any particular fault type.

Another implementation may store in library 1102 and take as input to module 1104 the surrounding conditions. One example may be to use the conditions of connected wiring, CT's, PT's, and other connected hardware as data stored in library 1102 and as input to module 1104. It is envisioned that such hardware condition may either be a value entered by a user or predicted by another algorithm. Another example may be to use the environmental conditions, such as temperature, pressure, and humidity as data stored in library 1102 and as input to module 1104.

Another application of machine learning system 1100 may be to use module 1104 for the detection of security threats to one or more meters or to the networks the meters are coupled to. One example may be where module 1104 detects an intrusion by analyzing the pattern of security login attempts stored in library 1102. In another example, module 1104 detects a malicious user by analyzing images transmitted from the IED or meter using facial and/or Iris recognition to determine if the user is authorized or not. An exemplary IED or meter having image capture capabilities is disclosed and described in commonly owned co-pending U.S. application Ser. No. 16/040,683, the contents of which are hereby incorporated by reference. Images received from at least one IED or meter may be stored in library 1102 and processed by module 1104 to determine if the user is authorized or not. Another example may be where module 1104 performs network probing detection, which might indicate a malicious host on the network, by analyzing the attempts to query the meter. In either case, action module 1106 may use the detected securing threat or detected probing to send one or more alerts or notifications to one or more clients and/or send one or more control signals to IEDs, facilities (e.g., to shut off a compromised port, network, IED, etc.) to prevent the threat or probe detected.

In another embodiment, system 1100 is used to determine and predict component wear percentage. One example may be where module 1104 computes the estimated remaining life of a related hardware component, such as, but not limited to, connected wiring, CT's, PT's, or relays based on samples provided via module 1102. When the estimated remaining life of any of the hardware components is below a predetermined threshold value, action module 1106 may send an alert to one or more one or more clients (e.g., users or technicians) indicating the hardware component requires replacement or repair. Another example may be where module 1104, based on sample data from library 1102, computes the wear percentage and efficiency of related hardware components, which may impact the efficiency of the whole system, and may impact the likelihood of faults in the future. If the wear percentage and/or efficiency calculated by module 1104 for any hardware component is below a predetermined threshold value, action module 1106 may send a communication to one or more one or more clients (e.g., users or technicians) indicating the hardware component requires replacement or repair.

One implementation may take as input to module 1104 the live readings of the meter, along with the settings of the related hardware component stored in library 1102. One example may be a relay, which the meter counts each time the meter triggers that relay to flip, and which the user has entered the model and install date. Another example may be a PT, which the user has entered the model, install date, rated lifespan, and rated voltage range, and which the voltage the meter measured, which goes through that PT, is used.

Another implementation may take as input to module 1104 external measurements of the condition of the hardware device stored in library 1102. One example may be a temperature probe placed on the inside of a network switch, and which feeds an analog temperature signal to the analog input of the meter, the temperature signal is stored in library 1102. Another example may be an infrared temperature camera pointed at a CT, which measures the peak temperature of the outside, and feeds that temperature as an analog signal to the analog input of the meter and stores the temperature signal in library 1102.

In another embodiment, module 1104 to provide recommendations to users, based on the detected conditions within the meters or IEDs belonging to the users, where the conditions are stored in library 1102. One example may be where action module 1106 sends a communication to one or more clients to recommend changing hardware components which are predicted by module 1104 to be near end of life. The recommendation may be sent by action module 1106 when the expected life remaining for the component is below a predetermined threshold. Another example may be where action module 1106 recommends (e.g., via a communication sent to one or more clients) upgrading a meter that is predicted by module 1104 to be near end of life. Another example may be where action module 1106 notifies users when a security threat is detected by module 1106. Another example may be where action module 1106 notifies users when module 1104 determines that their predicted usage or demand would exceed a certain limit. Another example may be where action module 1106 notifies users when faults occurred in a similar geo-location as their meter or facility, where the similarity is determined by action module 1106. Another example may be to module 1104 to identify when the current measured by a given meter is too high, and to use action module 1106 to recommend that the user lower usage if the current is above a predetermined threshold.

Referring to FIG. 15, a method for using machine learning system 1100 is shown in accordance with the present disclosure. In step 1202, a plurality of data samples are stored in data library 1102. As described above, the data samples may be received from various sources (e.g., IEDs, clients, etc.). In step 1204, machine learning module 1104 receives data samples from the data library 1102. In step 1206, machine learning module processes the data samples in accordance with at least one machine learning algorithm (e.g., stored in a memory of server 424/524). In step 1208, based on the processing of the data samples received, machine learning module outputs at least one recommendation and/or prediction (e.g., a predicted energy usage, a predicted fault, a recommendation to increase or decrease energy consumption by a load, etc.) In step 1210, action module 1106 receives the at least one recommendation and/or prediction from machine learning module 1104. In step 1212, action module 1106 performs at least one action based on the recommendation and/or prediction. For example, the action may include sending a communication signal to at least one client device (e.g., a user's computing device, a service personnel's computing device, etc.) including the recommendation and/or prediction. The action may include sending a control signal to at least one client device and/or one or more IEDs, where the control signal is generated based on the recommendation and/or prediction. For example, the control signal may include increasing or decreasing the energy consumption of a load, turning on or off a load, rebooting, shutting down, and/or updating one or more IEDs, etc.

In another embodiment of the present disclosure, a machine learning load predicter is provided that predicts what a particular load will be over a predetermined period of time, e.g., the next 30 days, to try and predict a way to help an end user save money.

Figure 17:
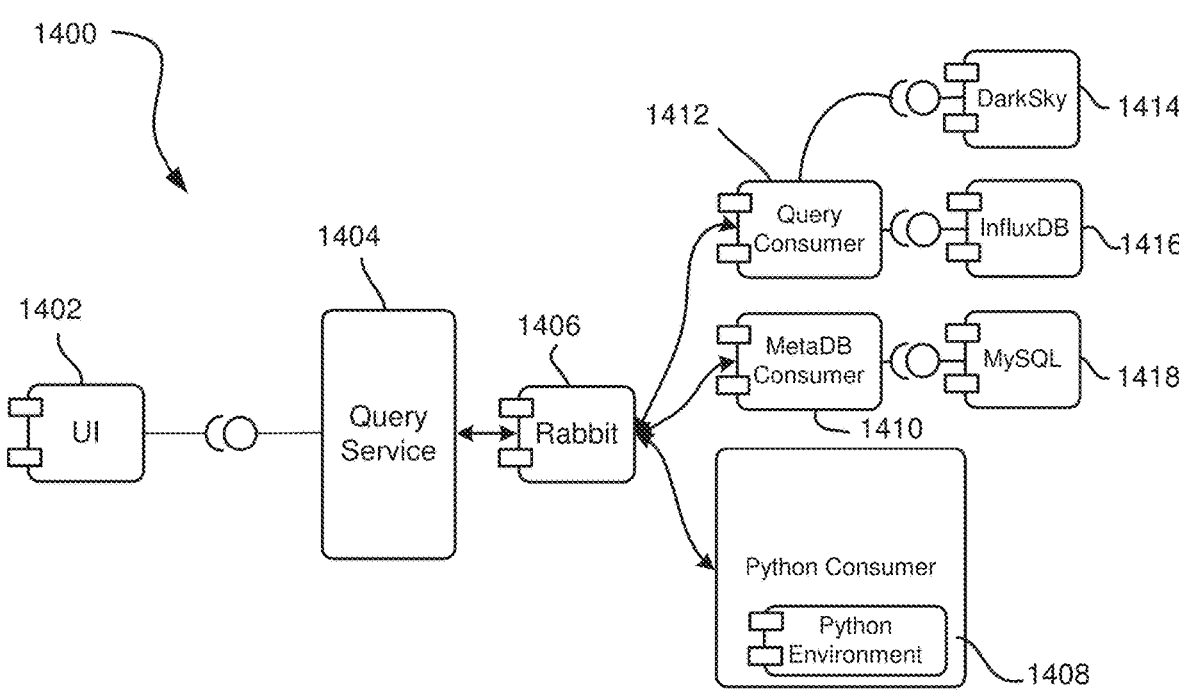
FIG. 17 illustrates a load predictor in accordance with an embodiment of the present disclosure.

FIG. 17 illustrates a load predictor 1400 in accordance with an embodiment of the present disclosure. The load predictor 1400 includes a user interface (UI) 1402 configured to receive input from a user, e.g., a load prediction request for a particular load. A query service 1404, e.g., a web service, is provided for receiving the request and forwarding the request to a queuing manager 1406, e.g., message-queuing software or message broker RabbitMQ. The queuing manager 1406 forwards the request to a Python Machine Learning (ML) Module or Library 1408 that includes machine learning logic. The queuing manager 1406 also provides the request to metadata consumer 1410 and query consumer 1412. The metadata consumer 1410 extracts metadata from the request, for example, meter information, such as, but not limited to, serial number, meter name and type, channel for meter history, facility location, user information, and any other relevant relational information. Database 1418, e.g., MySQL, stores the metadata extracted by metadata consumer 1410. It is to be appreciated that database 1418 also stores information related to a model used to fulfill the load prediction request (as will be described in greater detail below). The query consumer 1412 interacts with a time series database 1416, e.g., InfluxDB, to extract meter data relating to the request, e.g., voltage for a particular channel. The query consumer 1412 further interacts with an API client 1414, e.g., Dark Sky weather information, to retrieve weather information for a particular location, e.g., historical and future weather conditions. It is to be appreciated that a location for the meter may be determined by the facility the meter is in, thereby knowing the location of the facility provides the location of the meter. In one embodiment, each meter may have a location device, e.g., a GPS device or chip, that may determine the location of the meter and provide the location information to the appropriate server or device. The meter data and weather information are then provided to the ML module 1408 which uses the information to predict the future load. It is to be appreciated that some or all of the meter data and/or weather information may be provided to ML module 1408 via queuing manager 1406.

In one embodiment, the present disclosure uses Elastic Net regularization to build out a model for load prediction. Prediction may be based on meter log information for the last 12 months, the last week to 10 days of data logs, and various bits of weather information, e.g., temperature (min, max and average) humidity, pressure, wind speed, etc. It is to be appreciated that different periods of time for the data logs may be employed, e.g., 10-14 days of data logs, 12 months of data logs, where each period of data logs may be weighted differently in the load prediction model of the present disclosure. The system of the present disclosure builds a model based on the logic inside the data, i.e., based on independent variables the method looks for a dependency. In one embodiment, the model is built by weighting the last year of data logs as X, the last 10-14 days of data logs as double X, the weather data as Y, and the future weather data as YY. In one embodiment, the weather data is dated stamped or coded so the algorithm may distinguish between prior weather data and future weather data. Regularization is applied to the generated module to try and not over fit the model to the training data (i.e., where the model fits well with training data, but generates poor prediction data when the input differs even slightly from the training set). Regularization adds 'noise' to the model before optimizing it. In one embodiment, Lasso (an algorithm that uses L1 regularization) and Ridge (an algorithm that uses quadratic L2 regularization) are used for regularization and they are the 'noise'. Both of these algorithms are then used to get a hybrid regularization method, which is used with Elastic Net, i.e., ElasticNet uses a linear combination of L1 and L2.

With Elastic Net, a set of independent variables are used to model a dependent variable, also known as a Target Variable. Independent Variables are inputs which may or may not be related to each other, but which influence the Dependent Variable, or output. This set of independent input variables are then collected into a Data Set. For example, a Dependent Variable may be Energy in the Interval, and the Independent Variables may be Temperature, Wind Speed, Humidity, Length of Daylight, and the Day of the Week. In such an example, Energy in the Interval would depend on the values and trends of the input Independent Variables. Intuitively, the temperature influences the energy usage, due to air conditioning and other factors, but there need not be an obvious correlation for the Target to be generated. It should be appreciated that any Target variable can be modeled, such as the wear on a device. It should also be appreciated that any Independent variable can be used, even if there is not an intuitive correlation, such as the number of times a door is opened in a building in a day. It should also be appreciated that an Independent and Dependent Variables can be rearranged in another model. For example, Temperature could be the variable dependent on Energy in the Interval in another model. As another example, Humidity could be dependent on Temperature and Energy in the Interval.

Figure 18:
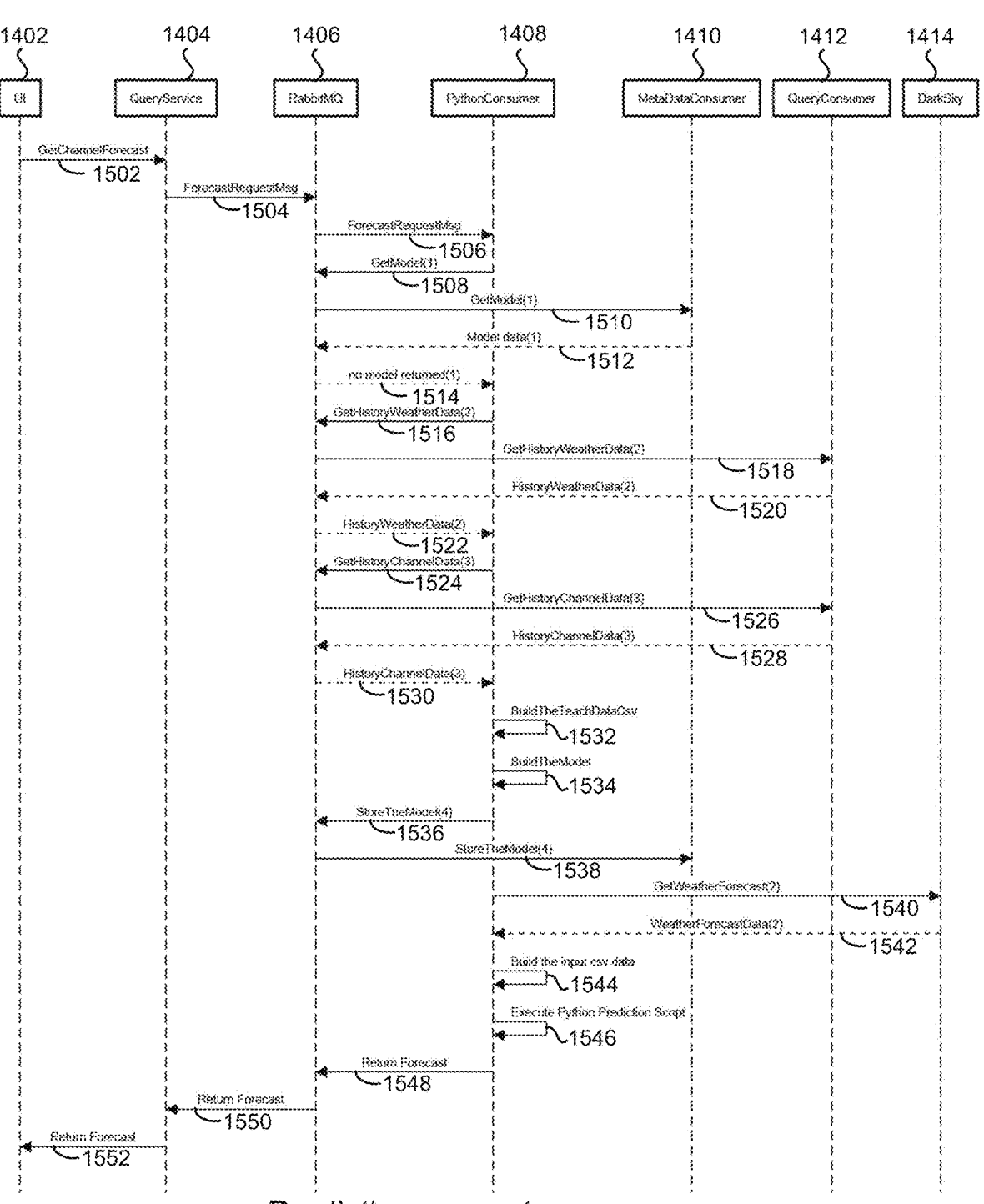
FIG. 18 illustrates a prediction request sequence where no previous model exists in accordance with an embodiment of the present disclosure.
Figure 20:
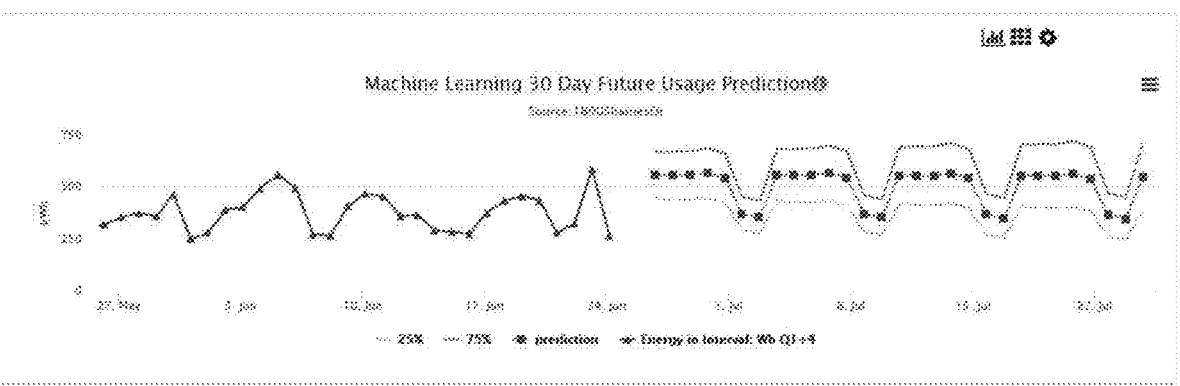
FIGS. 20, 21, and 22 are screen shots of future load usage predictions in accordance with an embodiment of the present disclosure.
Figure 21:
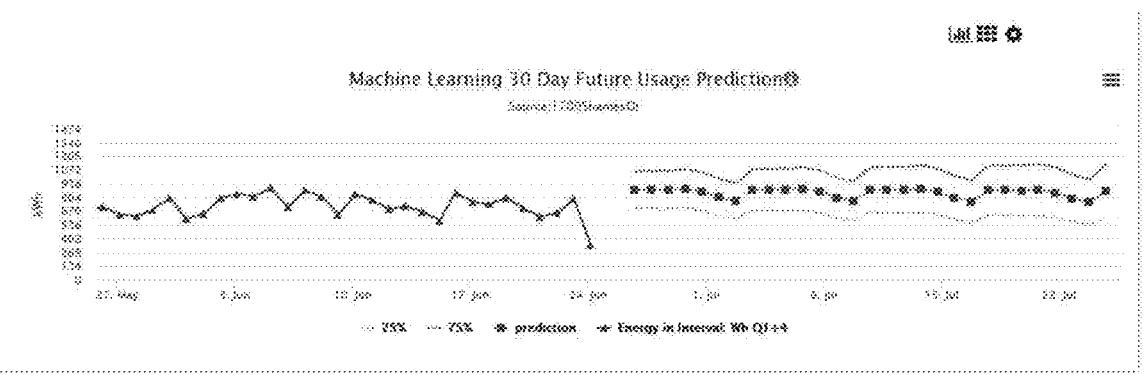
Figure 22:
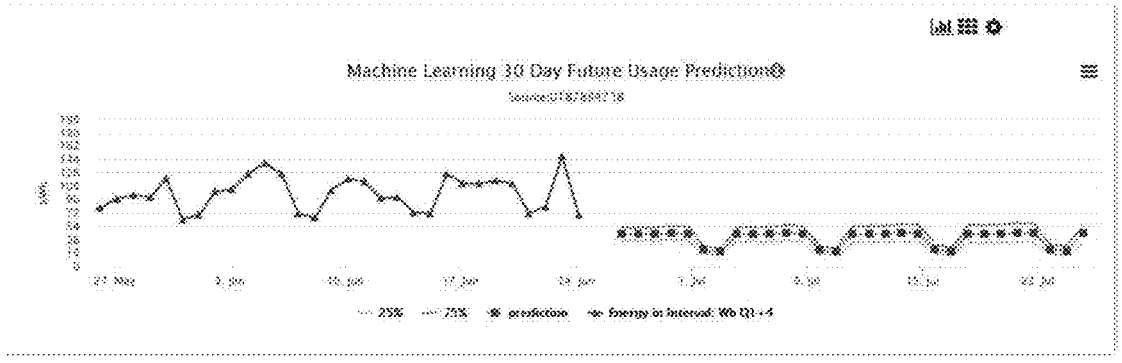

Referring to FIG. 18, the model is built by ML module 1408 the first time when going to the meter chart via the UI 1402 on the web. The UI 1402 makes a call (step 1502) to the query service 1404, e.g., to get forecast data, which sends (step 1504) the query to the queuing manager 1406, e.g., RabbitMQ which is a queuing solution that takes that message request. The ML module 1408, which is responsible for building the model, gets this request (step 1506) from the queuing manager 1406 and requests via queuing manger 1406 (step 1508) a previously generated model stored in metadata consumer 1410 (step 1510). Metadata consumer 1410 responds (step 1512) via queuing manager 1406 (step 1514) to ML module 1408 that no previously stored model exists. The Query Consumer 1412 then gets one or more requests from ML module 1408 via queuing manger 1406 (steps 1516, 1518 and 1524, 1526) to get the historical weather information for the meter location that is already stored, and then goes to the time-series database 1418 and requests the log and channel information for that specific meter. With this information all returned (steps 1520 and 1528) by the Query Consumer 1412 via the queuing manager 1406 (steps 1522 and 1530) to ML module 1408, the ML module 1408 formats and processes the data (step 1532) and creates and builds the model (step 1534). Once the model is built, a request is made (steps 1536, 1538) to the metadata consumer 1410 to store that model. A call is then made (step 1540) to a third party API weather provider 1414, e.g., DarkSky, by ML module 1408 to get the future weather information for that facility location where the meter is located. When the future weather information is returned (step 1542), ML module 1408 formats and processes the data (step 1544) and runs a prediction script (step 1546) using that information and already known previous information in the model (which already has channel, history, and past weather data) to generate a forecast prediction of the load. ML module 1408 returns the forecast prediction (step 1548) to queuing manager 1406, which sends (step 1550) the forecast prediction to the query service 1404. The query service 1404 sends (step 1552) the forecast prediction back to the UI 1402 as well as the lower and upper bound (e.g., in the form of a chart). Referring to FIG. 20, an exemplary forecast prediction generated by ML module 1408 (including an upper and lower bound for the prediction is) and provided to UI 1402 to be displayed to a user is shown in FIGS. 20, 21 and 22. The 25% boundary means that it is a 25% probability that the actual value intersects this boundary. The 75% means it is a 75% probability that the actual value will stay under this line. Between the upper and lower bounds, the prediction of the load is provided. In one embodiment, the prediction for a particular day is the average of the 25% boundary and the 75% boundary. In another embodiment, the prediction is determined by calculating the mean absolute error (MAE), i.e., the mean vertical distance between the two points.

Figure 19:
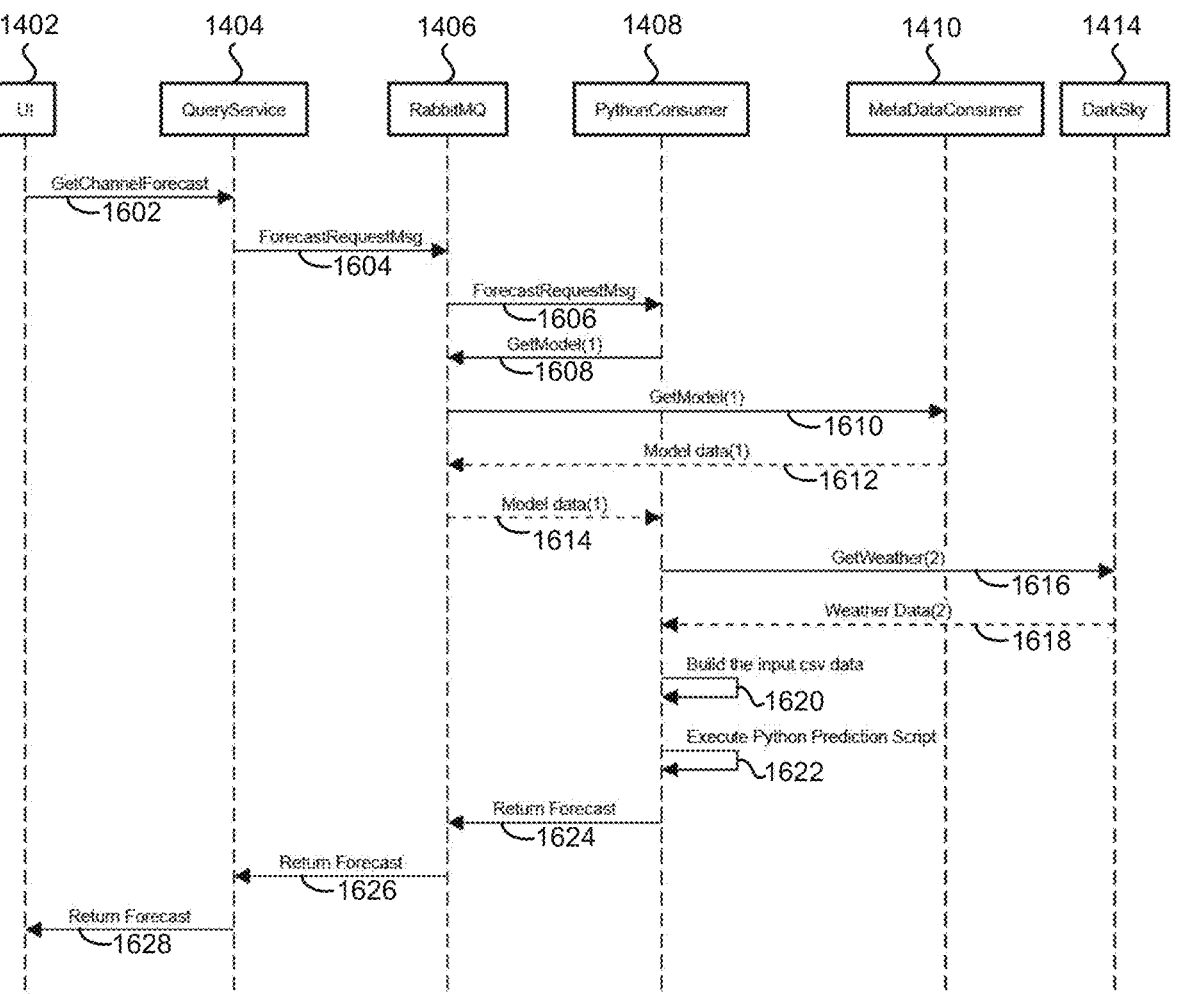
FIG. 19 illustrates a prediction request sequence employing a previously built model in accordance with an embodiment of the present disclosure.

Referring to FIG. 19, after the model is built and stored in metadata consumer 1410, the next time a request (step 1602) is made via UI 1402 and the request is forwarded to ML module 1408 via query server 1404 and queuing manager 1406 (steps 1604, 1606) for an existing model, ML module 1408 sends a request via queuing manager 1406 (steps 1608, 1610) to metadata consumer 1410 for the existing model. Metadata consumer 1410 then responds to the request and provides (steps 1612, 1614) the existing model via queuing manager 1406 to ML module 1408. Since the existing model has already been previously generated, ML module 1408 only needs to request (step 1616) updated weather data from the third party API weather provider 1414, e.g., DarkSky, to update the prediction logic with more weather data. After the third party API weather provider 1414 responds (step 1618) with the updated weather data, ML module 1408 processes and formats the data (step 1620) and runs the prediction script (step 1622) using that updated data and data already known in the model (which already has channel, history, and past weather data) to generate a forecast prediction of the load. ML module 1408 then returns the forecast prediction (step 1624) to queuing manager 1406, which sends (step 1626) the forecast prediction to the query server 1404. The query server 1404 sends (step 1628) the forecast prediction back to the UI 1402 as well as the lower and upper bound (e.g., in the form of a chart). Referring to FIGS. 20, 21 and 22, an exemplary forecast prediction generated by ML module 1408 (including an upper and lower bound for the prediction is) and provided to UI 1402 to be displayed to a user.

It is to be appreciated that in FIG. 19, if the ML module 1408 determines after step 1614 that the existing model is older than a specified allotted time period (e.g., where the time period is determined based off training data of prior days and other information stored in the system of the present disclosure), ML module 1408 determines that the model will be built again and will invalidate the current model (i.e., delete from metadata consumer 1410) since it is out of date.

The load prediction may be used to allow a user to commit a load shed event in advance of the actual demand interval. For instance, traditionally, when a particular load exceeds an alarm, then a load shedding event will occur. In accordance with the techniques of the present disclosure, the user will be warned well into the future, e.g., by e-mail, text message, etc., sent by system 1400 and well before the alarm condition ever occurred. This will allow the user to shed at least one load proactively to a peak demand as opposed to reactively after an alarm was set. Another possibility is that a user may be able to buy future contracts for electricity at that time based on the predictions of system 1400 so that the energy purchase could hedge the cost of the electricity during the peak demand situation predicted by the systems and methods of the present disclosure. Even if they cannot shed at least one load because the processes are mandatory, the user will have time to proactively shop for lower cost electricity contracts to minimize their high demand condition.

In one embodiment, the load predictor 1400 transfers the load prediction to a load shedding module or a device incorporating a load shedding algorithm. In one embodiment, the load shedding module or device may simply shutdown a load if the load prediction exceeds a predetermined threshold. In another embodiment, the load shedding module or device may shutdown a load when the load prediction exceeds a predetermined threshold and it is within a predetermined period of the day. The load shedding device may monitor at least one or more IEDs or meters. A user may designate or assign load shedding priorities to specific meters, for example, loads with a lower priority (e.g., non-essential loads) may be shed before loads with a higher priority (e.g., essential loads such as life support systems). When the load shedding device receives the load prediction from the load predictor 1400, the load shedding device may automatically begin to shed determined loads, i.e., shutdown the load, based on predetermined priorities without human intervention. It is to be appreciated that the load predictor 1400 and the load shedding module or device may be incorporated into a single device, such as a server (e.g., server 434/524, or any other server), or may be disposed among several components and/or computing devices.

An additional result of the prediction may be to use back up generation to reduce load based on the prediction. To date, demand response uses back up generation after an alarm has been triggered. If the generator doesn't start or a failure occurs, the end user is tied to only having to accept the high demand charge. With the prediction, the end user is given time to test their systems and make sure that the back up load shedding generation will be functional at the time it was needed. The above results are illustrative and there are many other ways to implement an active result of the prediction. These other methods are envisioned by the present disclosure.

In another embodiment, a boosting method is employed (e.g., in system 1400) using an autoregressive integrated moving average (ARIMA) model or another time series algorithm and ElasticNet. Boosting is a method of vertical stacking different types of algorithms. This is especially helpful for time-series data to handle the slow changes in behavior and predict from the last point of time. An ARIMA model can be used to forecast future time steps and is built for time series information. It takes an index of time steps to make predictions as arguments. This is more of a moving average similar to what you may find in a stock quote. ARIMA is a time-series algorithm, it would be applied in vertical boosting after Elastic Net was already done. For example, standard regression models like Elastic Net take a set of input variables to generate an output. ARIMA and autoregressive algorithms in general, use a series of observed output values, such as a time-series, as part of the input, to better predict a non-stationary output value, i.e., one where the output is influenced by its previous values.

In a further embodiment, an algorithm may be used (e.g., in system 1400) which learns from the input data, rather than just generating a model to be applied at a later time. Such an algorithm is called a learning algorithm and may be used to find complex dependencies and behaviors in sequences. For example, a Neural Network class of algorithms may be used. As another example, a Deep Neural Network algorithm could be used, which is a special class of Neural Networks which layer multiple Neural Networks together to better predict and classify input to output. As another example, a Genetic Learning Algorithm could be used.

In one embodiment, a convolutional neural network (CNN) with long-short-term memory (LSTM), often referred to as CNN+LSTM, may be employed in system 1400. While ARIMA can be used to model series data with respect to its previous input, it requires that series data to have clear trends and correlations to the input. A CNN+ LSTM improves over this by learning from the history of the series data. This allows it to model and account for hidden influences, which affect the output, but may not be related to the independent input variables. For example, a model which predicts Energy based on Temperature, Daylight, Day of Week, and previous Energy, may not account for the hidden factor of human influence. While once identified, it could be modified to use specific factors, such as work schedule, employee count, or timing of lights being on or off, this would require specific intervention. A CNN+LSTM would have the ability to learn from and predict these influences, without specific intervention.

In another example, the systems and methods of the present disclosure (e.g., system 1400) may figure out if there was a high energy peak on the weekend, then there will be lower usage on Wednesday and perhaps more complex logic. In one implementation, the logic may be a Python script executed by ML module 108. In another example, the logic may use the TensorFlow API and stack, Facebook™ prophet or another time series forecaster.

Figure 23A:
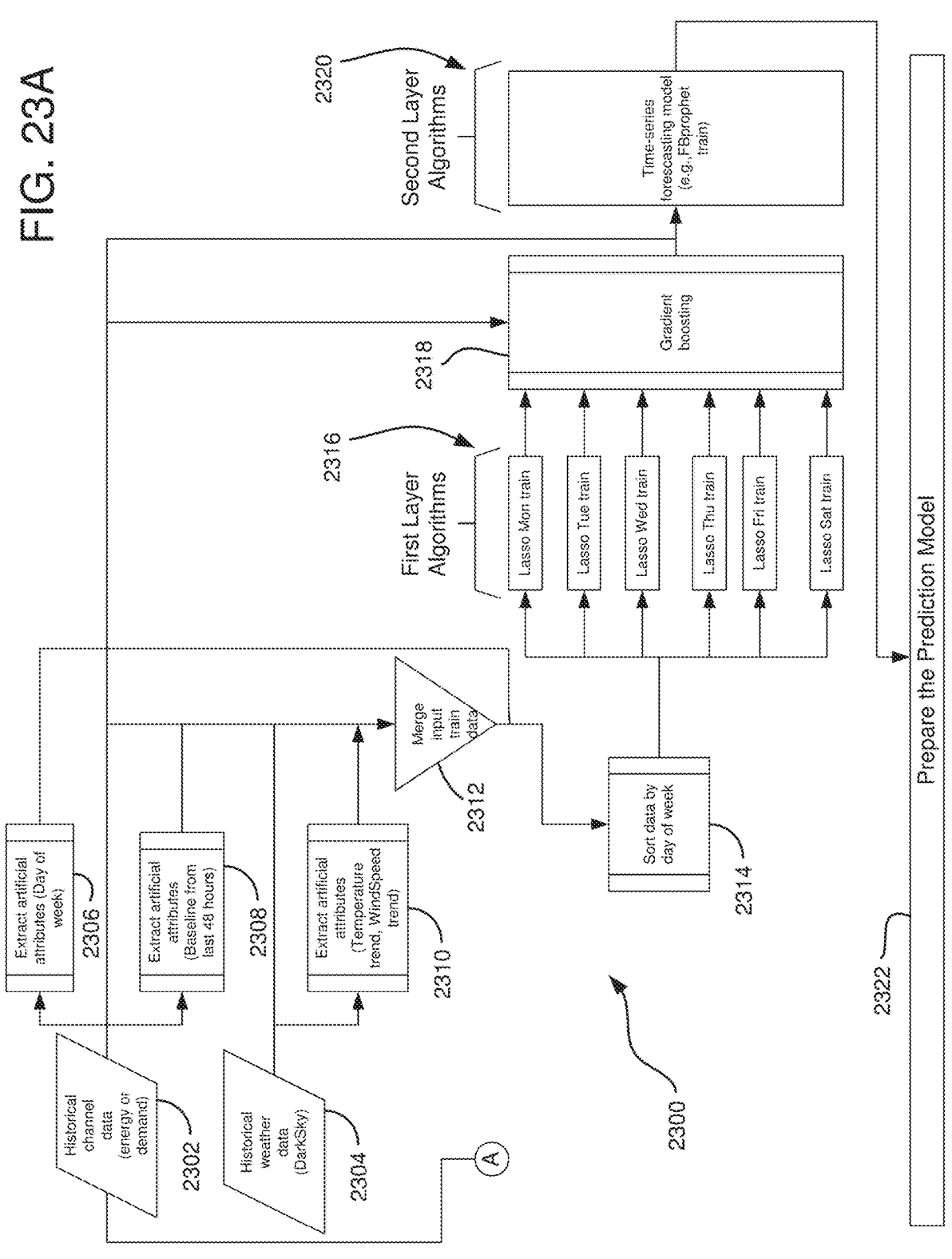
FIGS. 23A-B illustrate a method for building a prediction model in accordance with an embodiment of the present disclosure.
Figure 23B:
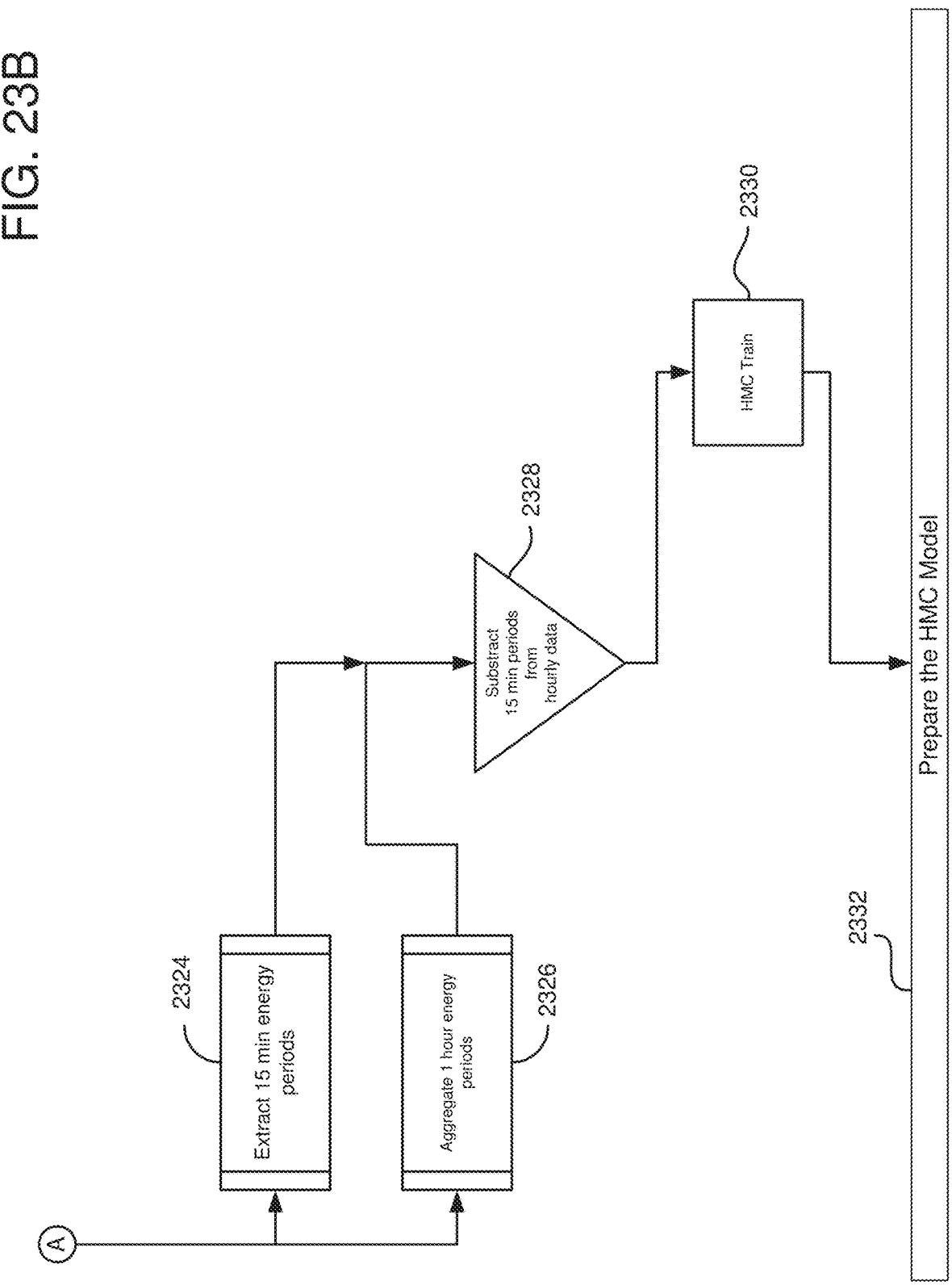

In a further embodiment, a method 2300, algorithm logic, for preparing a training model for prediction is provided in FIG. 23. Initially, historical channel data 2302, e.g., energy or demand of a particular channel of at least one meter) and historical weather data 2304 is received by system 1400. In step 2306, artificial attributes, e.g., day of the week, are extracted from the historical channel data 2302 and, in step 2308, a baseline of values from the last 48 hours is also extracted from the historical channel data 2302. In step 2310, artificial attributes of the historical weather data 2304 is extracted, e.g., temperature trends, windspeed trends, humidity trends, etc. Next, in step 2312, the extracted attributes from the historical channel data 2302 and the historical weather data 2304 then merged, for example, the historical energy values are merged with the temperatures associated at the same time and day as when the energy values were measured. Then, the merged data is sorted by day of the week, in step 2314.

In step 2316, a regression analysis is performed on the sorted and merged data for each day of the week. An exemplary algorithm used for the regression analysis is a least absolute shrinkage and selection operator (LASSO) algorithm. The results of the regression analysis then goes through gradient boosting which basically coverts a weak learner (i.e., only slightly correlated to a true classification) to a strong learner (i.e., better correlated to a true classifi- cation), in step 2318. The gradient boosting takes the output of the first layer algorithm (i.e., the LASSO algorithm), subtracting from the expected output, and pushes the output to the second layer algorithm, e.g., a time-series forecasting model algorithm. Gradient boosting fits a sequence of weak learners on different weighted training data. It starts by predicting original data set and gives equal weight to each observation. If a prediction is incorrect using the first learner, then it gives lower weight to observations which have been predicted incorrectly. Being an iterative process, gradient boosting continues to add learner(s) until a limit is reached in the number of models or accuracy. By monitoring the test error at each stage in the construction of the prediction model, the method may determine when to stop iteratively boosting the output.

In step 2320, the time-series forecasting model algorithm, e.g., fbprophet, creates the training model which is then stored in the ML module 1408.

During the build process where the training model is built, while the energy prediction model is being built, a Hybrid Monte Carlo algorithm (also known as Hamiltonian Monte Carlo and HMC for short) is also being built. From the historical channel data acquired in step 2302, 15 minute energy periods (since the data is measured in 15 minute increments) is extracted, in step 2324. Then the energy periods are aggregated and averaged into 1 hour periods as well, in step 2326. This allows the system to have the 15 minute periods and the aggregated period. Next the 15 minute intervals are subtracted from the aggregated hourly data, in step 2328. Then, in step 2330, the 3 inputs from steps 2324, 2326 and 2328 are processed and trained with HMC to create the HMC model. The HMC model is then stored in ML module 1408.

Figure 24B:
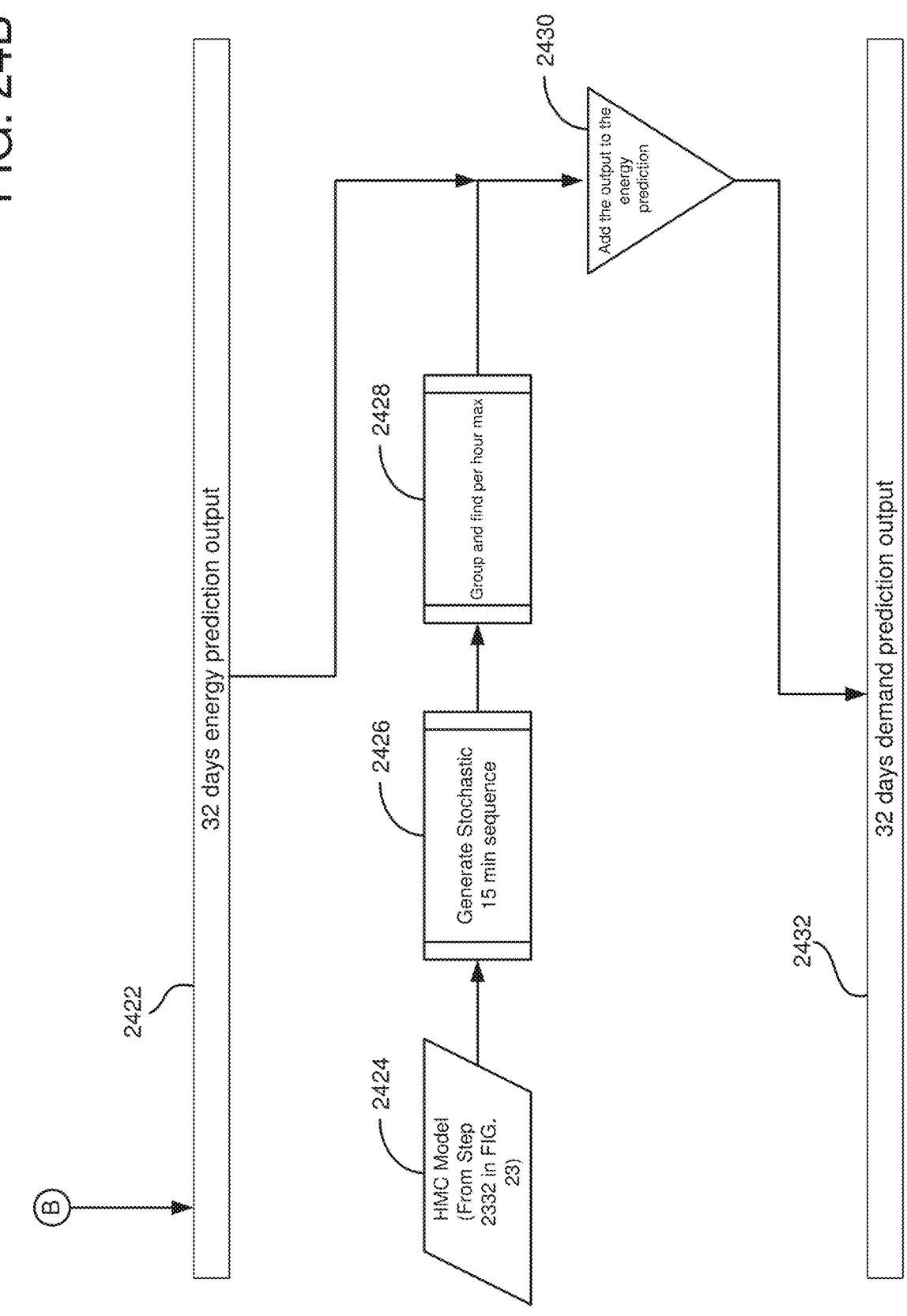

Once the training model is built, the training model may be employed for predicting future results. Referring to FIG. 24, a method 2400, algorithm logic, for predicting future values, e.g., energy or demand, is provided. Initially, 32 days of future datapoints 2402 is entered as a request to system 1400 and predicted weather data 2404 is received by system 1400. Additionally, the last baseline from the training data 2407 and the last weather trends from the training data 2409 are received by system 1400. It is to be appreciated the last baseline from the training data 2407 and the last weather trends from the training data 2409 are generated from the latest training model that was built.

In step 2408, a baseline of values from the last 48 hours is also extracted. In step 2410, artificial attributes of the predicted weather data 2404 are extracted, e.g., temperature trends, windspeed trends, humidity trends, etc. Next, in step 2412, the extracted attributes from the future data points 2402, the predicted weather data 2404, the last baseline from the training data 2407 and the last weather trends from the training data 2409 are then merged. It is to be appreciated that cumulative values are taken partially from the training steps above, described in relation to FIG. 23, so that the method has cumulative data in addition to hourly data, so cumulative for the month or day etc. This allows for prediction to be done hourly, daily, weekly, monthly etc. Then, the merged data is sorted by day of the week, in step 2414.

In step 2416, a regression analysis is performed on the sorted and merged data for each day of the week. An exemplary algorithm used for the regression analysis is a least absolute shrinkage and selection operator (LASSO) algorithm. The results of the regression analysis then goes through gradient boosting, as described above. In step 2420, the time-series forecasting model (previously built and described in relation to FIG. 23) uses the data output from the gradient boosting to create an energy prediction output for the next 32 days. Once the prediction is created, the consumer 1408 stores the prediction for that meter in the Influx database 1416, in step 2422. It is to be appreciated that the stored prediction values may be employed to gen- erate the views shown in FIGS. 20, 21 and 22.

Additionally, the system 1400 may predict demand for a particular load(s) associated to a meter(s). In step 2424, the HMC model training data stored in step 2332 is retrieved and the data is used to generate a stochastic 15 min sequence, in step 2426. In step 2428, the data is grouped and the max per hour is found and then, in step 2430, this output is added to the energy prediction already created by the time-series forecasting model (in step 2422) and the peak demand is predicted, e.g., for 32 days, in step 2432. It is to be appreciated that the peak demand is predicted in the HMC model based off the training data the HMC model received earlier (e.g., in step 2330) and then applied to the prediction done (e.g., in step 2422) by the time series forecasting model (e.g., FB prophet) on energy usage. So after the time series forecasting model generates the 32 days of prediction, the HMC model which already attempted to predict the demands over 15 minute periods will apply them to the next 32 days of energy usage, and then, the peak demand is determined from that time.

It is to be appreciated that while the system 1400 can predict demand throughout the whole day, the system 1400 may predict the peak demand for a particular day and at what time the peak demand will happen. It is further to be appreciated that the 15 min sequence may be adjustable, for example, to make a more precise prediction. For example, if the predetermined interval is adjusted to a 10 minute sequence, the peak demand may be predicted to be within an 10 minute interval.

Figure 25:
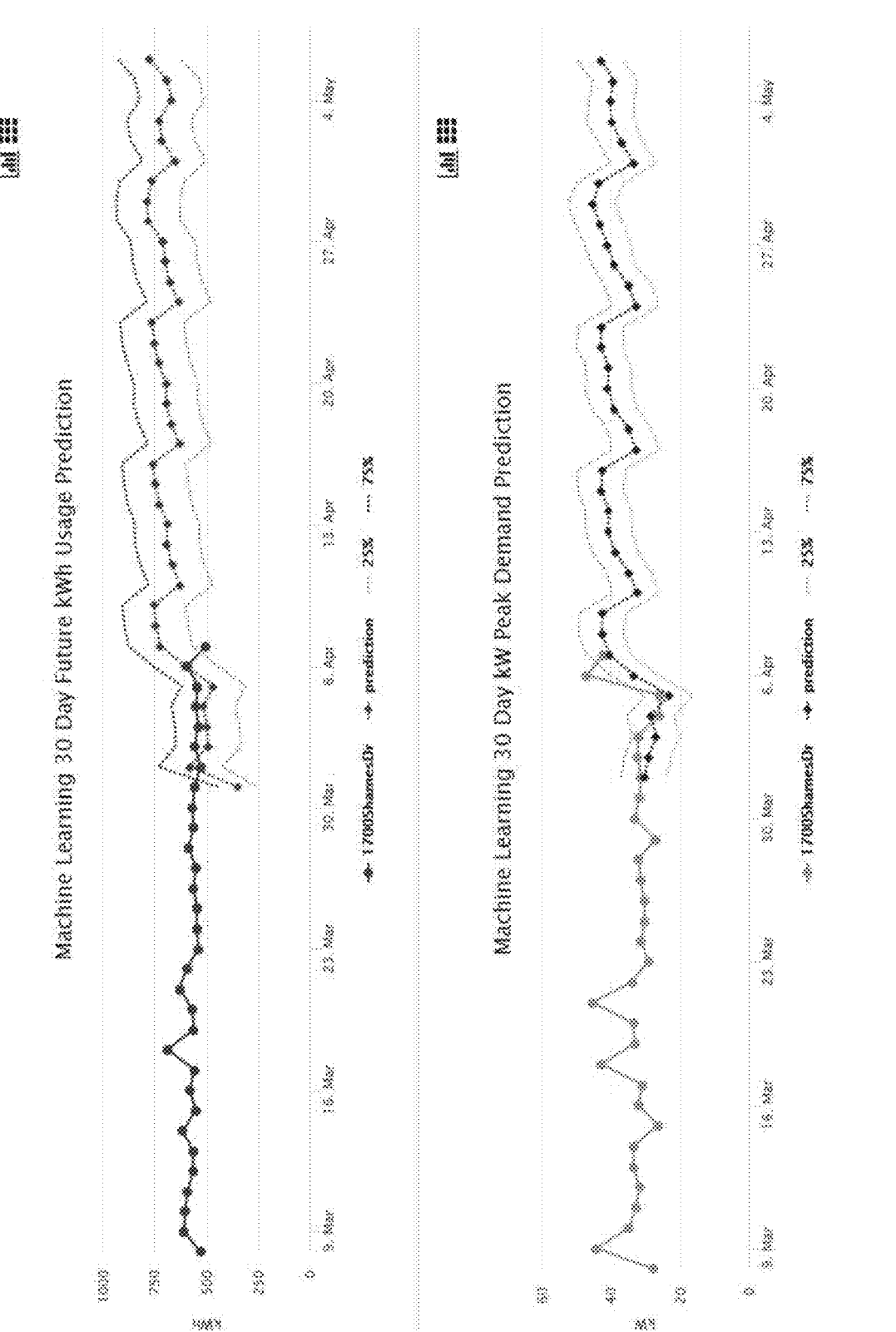
FIG. 25 illustrates screen shots of future load usage predictions along with corresponding future demand predictions in accordance with an embodiment of the present disclosure.
Figure 26:
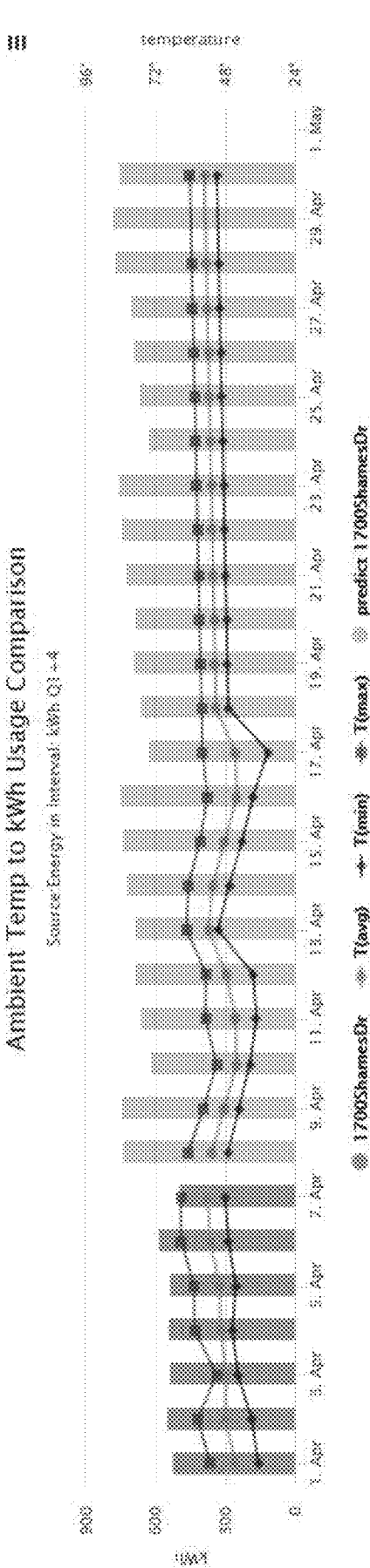
FIG. 26 is a graph illustrating ambient temperature to kWH usage in accordance with an embodiment of the present disclosure.

In various embodiment, the system 1400 may provide the predictions to UI 1402 to be displayed to a user. For example, FIG. 25 illustrates screen shots of future load usage predictions along with corresponding future demand predictions in accordance with an embodiment of the present disclosure. The data and/or predictions generated by system 1400 may be visualized to a user in various formats and graphs. For example, FIG. 26 is a graph illustrating ambient temperature to kWH usage in accordance with an embodi- ment of the present disclosure.

Figure 27:
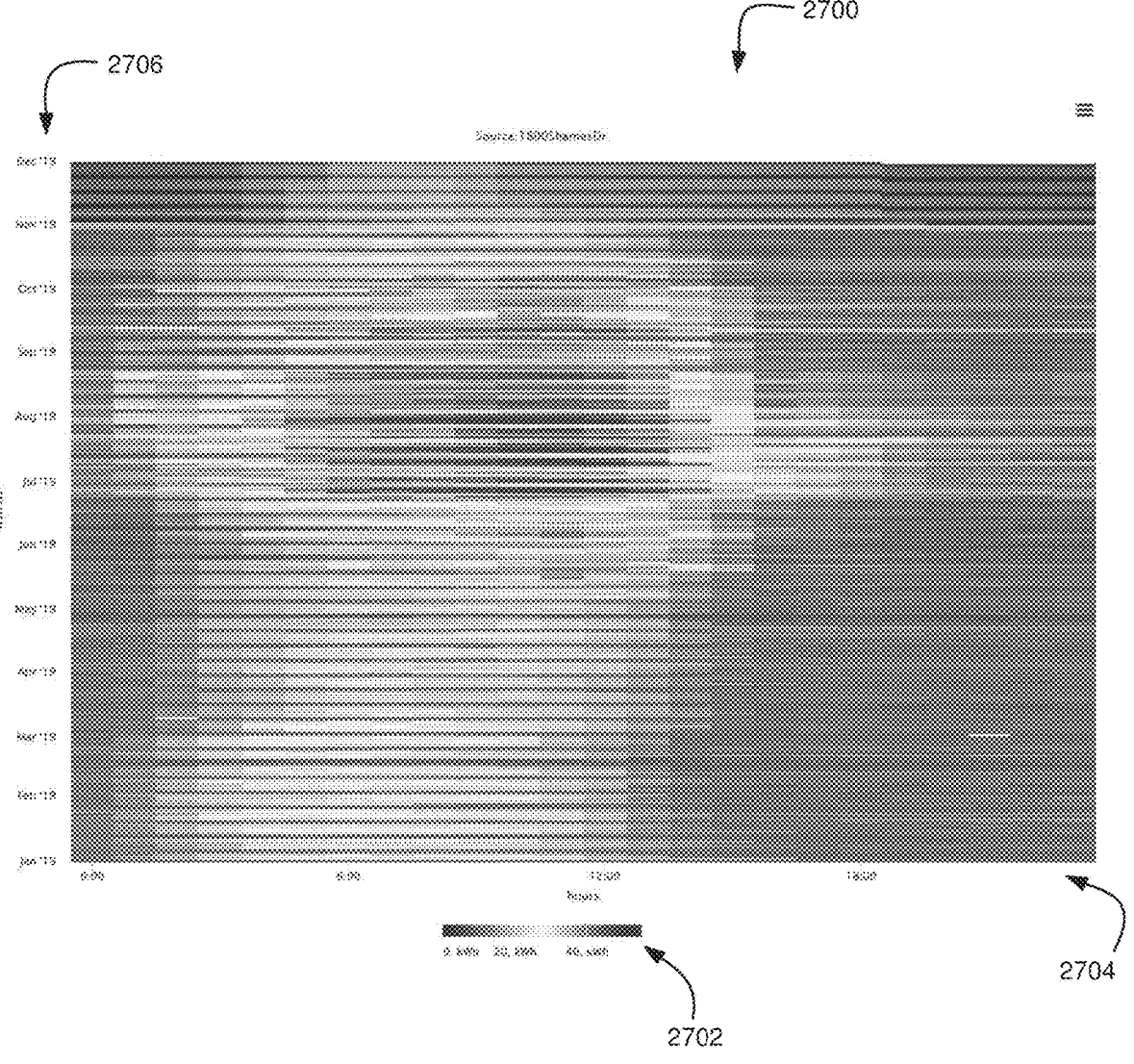
FIG. 27 illustrates a heatmap of energy usage for a meter in accordance with an embodiment of the present disclosure.

In one embodiment, the energy usage for a particular meter over an adjustable period of time may be illustrated as a heatmap, as shown in FIG. 27. In this embodiment, a scale 2702 of varying colors is associated with varying levels of usage and the heatmap 2700 includes an x-axis 2704 indi- cating time of day and a y-axis 2706 indicating days of the year. Usage by color is then displayed on the heatmap 2700 in the appropriate location, e.g., 8:00 am on Jul. 1, 2019. The heatmap may predict the usage for a predetermined number of days out from the current date and will show the predicted usage in the heatmap.

It is to be appreciated that various combinations of the above described algorithms may be employed. For example, in one embodiment, a regression analysis algorithm (e.g., Lasso) may be employed with a time series forecasting model (e.g., Facebook prophet). In another exemplary embodiment, a regression analysis algorithm (e.g., Lasso) may provide an output to a gradient boosting algorithm, which in turn provides an output to a hybrid Monte Carlo algorithm which then provides an output to a time series forecasting model (e.g., Facebook prophet). The present disclosure contemplates various combinations of the above described algorithms to predictions for energy usage and demand.

It is to be appreciated one or more components of system 1400 and/or the load prediction techniques described above may be implemented in any of the IEDs described above, e.g., in one or more memories and/or processors of the IEDs. Alternatively, one or more components of system 1400 and/or the load prediction techniques described above may further be incorporated in one or more servers, e.g., servers 424, 426, 524, 530, 628, 630, and/or the Meter Data Cloud server, described above. One or more components of the system 1400 and/or the load prediction techniques described above may further be implemented in a computing device, such as computing device 1302, described above.

The server or device incorporating system 1400 may be in communication with one or more IEDs and/or client devices via an internal network or an external network.

It is to be appreciated that the data used and stored in system 1400 (e.g., in databases 1416, 1418) may be received from Meter Data cloud server, one or more IEDs, or any other sources. In one embodiment, each of the IEDs may provide various data to a server including system 1400, such as server 424, 524, etc. In another embodiment, various data may be collected from each of the IEDs by an aggregator, such as server 630, 630, and then provided to a server such as servers 424, 524 including system 1400.

It is to be appreciated that system 1400 may be included in system 1100. For example, one or more of the components of system 1400 (e.g., ML module 1408) may be included in machine learning module 1104. One or more of the components of system 1400 (e.g., databases 1114, 1116) may be included in data library 1102. Action module 1106 may use load predictions from ML module 1408 to perform one or more actions.

Figure 16:
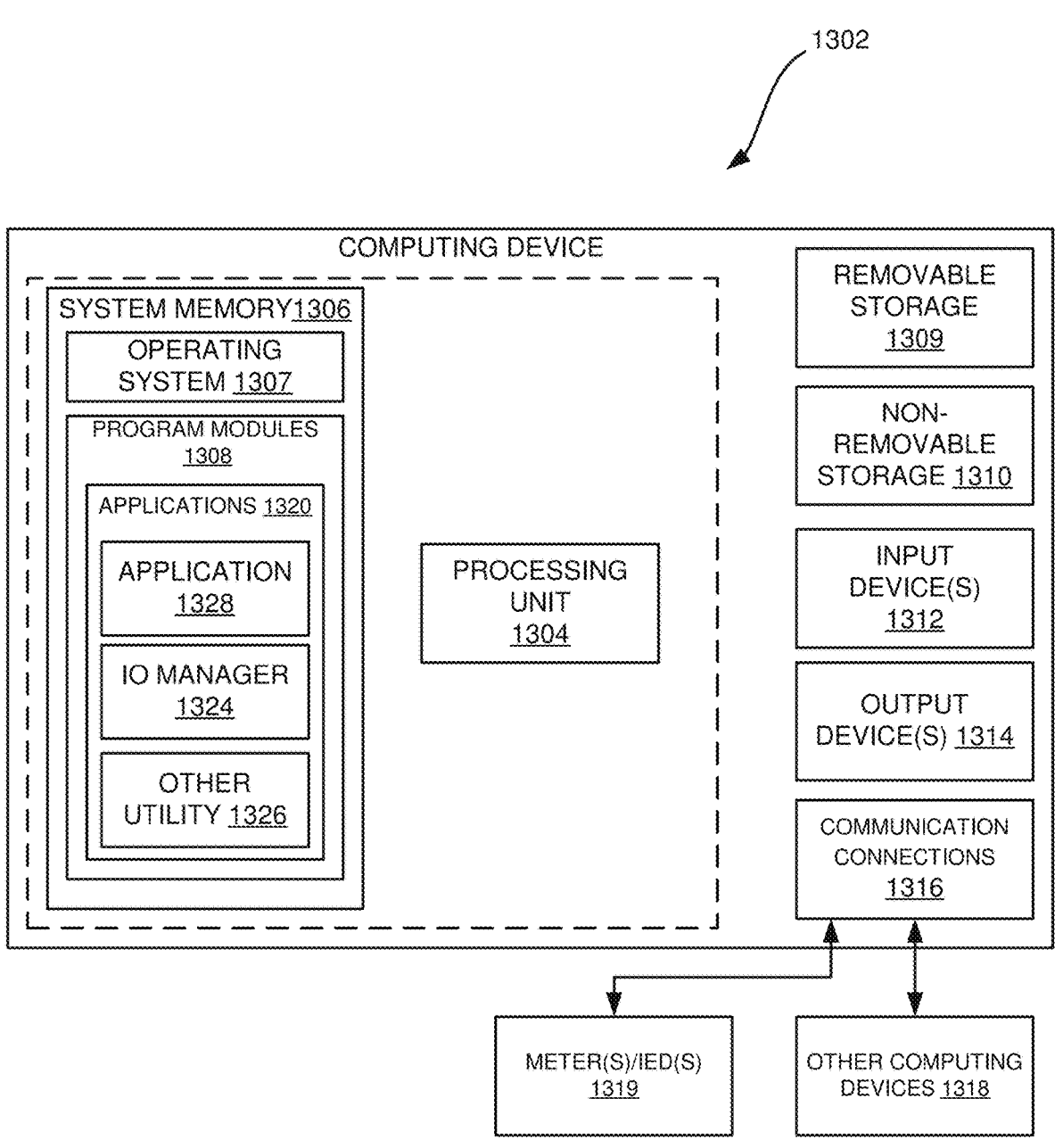
FIG. 16 is a block diagram of an exemplary computing device in accordance with an embodiment of the present disclosure.

FIG. 16 is a block diagram illustrating physical components of a computing device 1302, for example a client computing device (such as client 428/528/628), a server (such as Meter Data Cloud server 424/524), or any other computing device, with which examples of the present disclosure may be practiced. In a basic configuration, the computing device 1302 may include at least one processing unit 1304 and a system memory 1306. Depending on the configuration and type of computing device, the system memory 1306 may comprise, but is not limited to, volatile storage (e.g., random access memory), non-volatile storage (e.g., read-only memory), flash memory, or any combination of such memories. The system memory 1306 may include an operating system 1307 and one or more program modules 1308 suitable for running software programs/modules 1320 such as IO manager 1324, other utility 1326 and application 1328. As examples, system memory 1306 may store instructions for execution. Other examples of system memory 1306 may store data associated with applications. The operating system 1307, for example, may be suitable for controlling the operation of the computing device 1302. Furthermore, examples of the present disclosure may be practiced in conjunction with a graphics library, other operating systems, or any other application program and is not limited to any particular application or system. This basic configuration is illustrated in FIG. 16 by those components within a dashed line 1322. The computing device 1302 may have additional features or functionality. For example, the computing device 1302 may also include additional data storage devices (removable and/or non-removable) such as, for example, magnetic disks, optical disks, or tape. Such additional storage is illustrated in FIG. 16 by a removable storage device 1309 and a non-removable storage device 1310.

As stated above, a number of program modules and data files may be stored in the system memory 1306. While executing on the processing unit 1304, program modules 1308 (e.g., Input/Output (I/O) manager 1324, other utility 1326 and application 1328) may perform processes including, but not limited to, one or more of the stages of the operations described throughout this disclosure. For example, one such application 1328 may implement the machine learning algorithm or artificial intelligence system 1100 shown and described in relation to FIGS. 14 and 15 and/or the load predictor system 1400 shown and described in relation to FIGS. 17-22. Other program modules that may be used in accordance with examples of the present disclosure may include electronic mail and contacts applications, word processing applications, spreadsheet applications, database applications, slide presentation applications, drawing or computer-aided application programs, photo editing applications, authoring applications, etc.

Furthermore, examples of the present disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip (SOC) where each or many of the components illustrated in FIG. 16 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the computing device 1302 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the present disclosure may be practiced within a general purpose computer or in any other circuits or systems.

The computing device 1302 may also have one or more input device(s) 1312 such as a keyboard, a mouse, a pen, a sound input device, a device for voice input/recognition, a touch input device, etc. The output device(s) 1314 such as a display, speakers, a printer, etc. may also be included. The aforementioned devices are examples and others may be used. The computing device 1304 may include one or more communication connections 1316 allowing communications with other computing devices 1318 (e.g., intermediate servers 530/630) and/or meters/IEDs 1319 (e.g., IEDs 10/410/

412/414/510/512/514/610/612/614/702). Examples of suitable communication connections 1316 include, but are not limited to, a network interface card; RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1306, the removable storage device 1309, and the non-removable storage device 1310 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1302. Any such computer storage media may be part of the computing device 1302. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is to be appreciated that the various features shown and described are interchangeable, that is a feature shown in one embodiment may be incorporated into another embodiment. It is further to be appreciated that the methods, functions, algorithms, etc. described above may be implemented by any single device and/or combinations of devices forming a system, including but not limited to meters, IEDs, servers, storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

What is claimed is:

1. A power distribution meter system comprising:
a plurality of intelligent electronic devices (IEDs) each IED having,
a housing,
at least one sensor disposed in the housing and configured to measure at least one parameter of an electrical distribution system and output a signal indicative of the at least one measured parameter,
at least one analog-to-digital converter disposed in the housing and configured to receive the output signal and convert the output signal to a digital signal,
one or more IED processors configured to execute a plurality of instructions, the IED processors configured to determine energy parameters of the electrical distribution system based on the at least one measured parameter, and
a communication device configured to connect the IED to an IED network;
an intermediary server in communication with the plurality of IEDs via the IED network and in communication with an external network, the intermediary server having one or more intermediary processors and associated intermediary server memory; and
a meter cloud server in communication with the intermediary server via the external network,
wherein the intermediary server transmits one or more data logs to the meter cloud server, the one or more data logs containing data representing the energy parameters from one or more of the plurality of IEDs, and
wherein the intermediary server is configured to modify requests from the IEDs being forwarded to the meter cloud server, and
wherein the intermediary server is configured to receive log data status information from the meter cloud server, store the log data status information in the intermediary server memory, and respond to a log data status query from the one or more IEDs with the stored log data status information.

2. The power distribution meter system of claim 1, wherein the intermediary server retrieves the one or more data logs using a pull protocol.

3. The power distribution meter system of claim 1, wherein the IEDs are not capable of pushing data to the meter cloud server.

4. The power distribution meter system of claim 1, wherein the intermediary server is configured to automatically discover IEDs on the IED network.

5. The power distribution meter system of claim 4, wherein the automatic discovery includes performing a TCP network scan.

6. The power distribution meter system of claim 4, wherein the automatic discovery includes broadcasting a message over the IED network and receiving registration responses.

7. The power distribution meter system of claim 1, wherein the intermediary server is separated from the external network by a firewall.

8. The power distribution system of claim 1, wherein the intermediary server receives setting data for the IEDs and caches the setting data for response to the IEDs.

9. The power distribution meter system of claim 1, wherein the intermediary server is configured to modify authentication information in the requests from the IEDs being forwarded to the meter cloud server.

10. The power distribution meter system of claim 1, wherein the intermediary server is configured to modify a format of data in the requests from the IEDs being forwarded to the meter cloud server.

11. The power distribution meter system of claim 1, wherein the intermediary server is configured to modify messages from the meter cloud server to the IEDs.

12. A power distribution meter system comprising:
a plurality of intelligent electronic devices (IEDs) each IED having,
a housing,
at least one sensor disposed in the housing and configured to measure at least one parameter of an electrical distribution system and output a signal indicative of the at least one measured parameter,
at least one analog-to-digital converter disposed in the housing and configured to receive the output signal and convert the output signal to a digital signal to form a data point, and
a communication device configured to connect the IED to an IED network;
an intermediary server in communication with the plurality of IEDs via the IED network and in communication with an external network, the intermediary server having one or more intermediary processors and associated intermediary server memory; and
a meter cloud server in communication with the intermediary server via the external network,
wherein the intermediary server is configured to receive one or more data points from each of the IEDs, to form data logs for each respective IED, and to transmit the data logs for each respective IED to the meter cloud server, and
wherein the intermediary server is configured to modify requests from the IEDs being forwarded to the meter cloud server, and
wherein the intermediary server is configured to receive log data status information from the meter cloud server, store the log data status information in the intermediary server memory, and respond to a log data status query from the one or more of the plurality of IEDs with the stored log data status information.

13. The power distribution meter system of claim 12, wherein the intermediary server polls voltage, current, and power values from all known meters at a set interval and stores those values in a data log.

14. The power distribution meter system of claim 12, wherein the intermediary server is configured to generate a limit data point for received data that exceeds a threshold value.

15. The power distribution meter system of claim 12, wherein the intermediary server is configured to collect diagnostic information from the IEDs.

16. The power distribution meter system of claim 12, wherein the intermediary server is configured to automatically discover IEDs on the IED network.

17. The power distribution meter system of claim 12, wherein the intermediary server is separated from the external network by a firewall.

18. The power distribution system of claim 12, wherein the intermediary server receives setting data for the IEDs and caches the setting data for response to the IEDs.

19. A method of compiling data for a power distribution meter system comprising:
obtaining one or more data points relating to a measured parameter of a power distribution system using a plurality of intelligent electronic devices (IEDs);
compiling at least a subset of the one or more data points into one or more data logs;
transferring the one or more data logs from the IEDs over an IED network to an intermediary server;
transferring the one or more data points from the intermediary server to a meter cloud server over an external network;
receiving, by the intermediary server, an API request from one of the plurality of IEDs addressed to the meter cloud server;
modifying the API request to form a modified request;
forwarding the modified request to the meter cloud server,
receiving, by the intermediary server, log data status information from the meter cloud server and storing the log data status information in memory;
responding, by the intermediary server, to a log data status query from one of the plurality IEDs with the stored log data status information.

20. The method of claim 19, wherein modifying the API request includes adding authentication information.

* * * * *